United States Patent
DeJonge et al.

(10) Patent No.: US 12,300,996 B2
(45) Date of Patent: May 13, 2025

(54) DIRECT-CURRENT POWER DISTRIBUTION IN A CONTROL SYSTEM

(71) Applicant: Lutron Technology Company LLC, Coopersburg, PA (US)

(72) Inventors: Stuart W. DeJonge, Riegelsville, PA (US); Chen Ming Wu, Emmaus, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 183 days.

(21) Appl. No.: 18/200,726

(22) Filed: May 23, 2023

(65) Prior Publication Data

US 2023/0299587 A1   Sep. 21, 2023

Related U.S. Application Data

(63) Continuation of application No. 17/477,463, filed on Sep. 16, 2021, now Pat. No. 11,677,245.
(Continued)

(51) Int. Cl.
*H02J 1/14* (2006.01)
*E06B 9/68* (2006.01)

(52) U.S. Cl.
CPC .................. *H02J 1/14* (2013.01); *E06B 9/68* (2013.01); *E06B 2009/6809* (2013.01); *H02J 2310/52* (2020.01)

(58) Field of Classification Search
CPC . H02J 1/14; H02J 2310/52; H02J 7/34; E06B 9/68; E06B 2009/6809; H05B 47/00
See application file for complete search history.

(56) References Cited

U.S. PATENT DOCUMENTS

| | | | |
|---|---|---|---|
| 5,248,919 | A | 9/1993 | Hanna et al. |
| 7,391,297 | B2 | 6/2008 | Cash et al. |

(Continued)

FOREIGN PATENT DOCUMENTS

| | | |
|---|---|---|
| FR | 2865864 A1 | 8/2005 |
| WO | 2020099152 A1 | 5/2020 |
| WO | 2020181011 A1 | 9/2020 |

OTHER PUBLICATIONS

Moog Inc. (n.d.). Power drive units. https://www.moog.com/products/actuators-servoactuators/actuation-technologies/aircraft-mechanical/power-drive-units.html#:~:text=A%20Power%20Drive%20Unit%20converts,torque%20and%20speed%20summed%20configurations. (Year: NA) (Year: NA).*

(Continued)

*Primary Examiner* — Daniel Cavallari
(74) *Attorney, Agent, or Firm* — Flaster Greenberg P.C.

(57) ABSTRACT

A control system may include a direct-current (DC) power bus for charging internal energy storage elements in control devices of the control system. For example, the control devices may be motorized window treatments configured to adjust a position of a covering material to control the amount of daylight entering a space. The system may include a bus power supply that may generate a DC voltage on the DC power bus. For example, the DC power bus may extend from the bus power supply around the perimeter of a floor of the building and may be connected to all of the motorized window treatments on the floor (e.g., in a daisy-chain configuration). An over-power protection circuit may be configured to disconnect the bus power supply if a bus current exceeds a threshold for a period of time.

20 Claims, 18 Drawing Sheets

Related U.S. Application Data

(60) Provisional application No. 63/105,033, filed on Oct. 23, 2020, provisional application No. 63/078,976, filed on Sep. 16, 2020.

(56) References Cited

U.S. PATENT DOCUMENTS

| | | |
|---|---|---|
| 8,009,042 B2 | 8/2011 | Steiner et al. |
| 8,199,010 B2 | 6/2012 | Sloan et al. |
| 8,228,184 B2 | 7/2012 | Blakeley et al. |
| 8,288,981 B2 | 10/2012 | Spira et al. |
| 8,410,706 B2 | 4/2013 | Steiner et al. |
| 8,451,116 B2 | 5/2013 | Steiner et al. |
| 9,679,696 B2 | 6/2017 | Bhutani et al. |
| 2003/0191546 A1 | 10/2003 | Bechtel et al. |
| 2006/0085100 A1* | 4/2006 | Marin-Martinod ....... H02J 1/08 701/1 |
| 2008/0092075 A1 | 4/2008 | Jacob et al. |
| 2013/0030589 A1 | 1/2013 | Pessina et al. |
| 2017/0123390 A1 | 5/2017 | Barco et al. |
| 2017/0327242 A1* | 11/2017 | Lopez ................. H04B 3/548 |
| 2017/0356243 A1 | 12/2017 | Feldstein |
| 2019/0032404 A1 | 1/2019 | Chacon et al. |
| 2022/0341259 A1 | 10/2022 | Chacon et al. |

OTHER PUBLICATIONS

Drive systems. (n.d.). https://www.ksb.com/en-global/centrifugal-pump-lexicon/article/drive-systems-1116402 (Year: NA) (Year: NA).*

* cited by examiner

DIRECT-CURRENT POWER DISTRIBUTION IN A CONTROL SYSTEM

CROSS-REFERENCE TO RELATED APPLICATIONS

This application is a continuation of Non-Provisional U.S. patent application Ser. No. 17/477,463, filed Sep. 16, 2021, which claims the benefit of Provisional U.S. Patent Application No. 63/078,976, filed Sep. 16, 2020 and Provisional U.S. Patent Application No. 63/105,033, filed Oct. 23, 2020, the disclosures of which are incorporated herein by reference in their entirety.

BACKGROUND

A typical window treatment, such as a roller shade, a drapery, a roman shade, and/or a venetian blind, may be mounted in front of a window or opening to control an amount of light that may enter a user environment and/or to provide privacy. A covering material (e.g., a shade fabric) on the window treatment may be adjusted to control the amount of daylight from entering the user environment and/or to provide privacy. The covering material may be manually controlled and/or automatically controlled using a motorized drive system to provide energy savings and/or increased comfort for occupants. For example, the covering material may be raised to allow light to enter the user environment and allow for reduced use of lighting systems. The covering material may also be lowered to reduce the occurrence of sun glare.

SUMMARY

A control system may include a power bus for charging (e.g., trickle charging) internal energy storage elements in control devices of the control system. For example, the control devices may be motorized window treatments configured to adjust a position of a covering material to control the amount of daylight entering a space. The system may include a bus power supply that may generate a direct-current (DC) voltage on the power bus. The bus power supply may generate a bus current to power one or more devices connected to the power bus. The bus power supply may comprise an over-power protection circuit configured to disconnect the bus power supply (e.g., a power converter of the bus power supply) from the power bus. For example, the over-power protection circuit may be configured to disconnect the bus power supply if the bus current exceeds a threshold for a period of time. In some examples, the bus power supply may be configured with a plurality of thresholds, where each threshold has a different, associated time limit. The power bus may extend from the bus power supply around the perimeter of a floor of the building and may be connected to all of the motorized window treatments on the floor (e.g., in a daisy-chain configuration). Wiring the power bus in such a manner may dramatically reduce the installation labor and wiring costs of an installation, as well as decreasing the chance of a miswire.

Each control device may be configured to control when the internal energy storage element charges from the bus voltage. For example, each control device may be configured to determine when to charge the internal energy storage element from the bus voltage in response to a message received via a communication circuit. Each control device may be configured to transmit a message including a storage level of the internal energy storage element. The storage level of the internal storage element may be a percentage of a maximum capacity (e.g., 60% of the maximum storage capacity) or a percentage of a maximum voltage, or a preset voltage level of the internal storage element.

A drive unit (e.g., a motor drive unit, such as a drive unit for a motorized window treatment) may be used in a power distribution system, where the power distribution system may comprises the bus power supply and a plurality of drive units. The drive unit may include a power limiting circuit that is configured to conduct current from a power bus and generate a supply voltage. The drive unit may include a load circuit (e.g., a motor drive circuit) that is configured to receive the supply voltage and control power delivered to an electrical load. The drive unit may include a control circuit that is configured to determine an allocated amount of power that the drive unit can consume from the power bus based on an amount of power required by the drive unit, a cumulative total power required by the plurality of drive units, and the power capability of the bus power supply. The control circuit may be configured to control the power limiting circuit to consume the allocated amount of power from the power bus. For example, the control circuit is configured to determine a proportional amount of power for the drive unit based on the amount of power required by the drive unit and the cumulative total power required by the plurality of drive units, and may be configured to determine the allocated amount of power based on the proportional amount of power for the drive unit and a power capability of the bus power supply. The control circuit may be configured to determine the cumulative total power required by the plurality of drive units based on a magnitude of a current conducted by the plurality of drive units onto the power bus.

The drive unit may also include an internal energy storage element that is configured to store enough power for multiple operations of the load circuit. In such examples, the amount of power required by the drive unit may be based on an amount of power required by the load circuit to power the electrical load and a voltage across the internal energy storage element.

The bus power supply may be configured to provide the bus voltage on the power bus during an on portion of a periodic time period, and configured to not provide the bus voltage on the power bus during an off portion of the periodic time period. In such instances, the control circuit may be configured to measure a magnitude of the bus voltage across the power bus during the off portion of the periodic time period, where the magnitude of the bus voltage across the power bus may indicate the cumulative total power required by the plurality of drive units.

For example, the control circuit may be configured to conduct a power-requirement current onto the power bus during the off portion of the periodic time period, where a magnitude of the power-requirement current may be proportional to the amount of power required by the drive unit. The control circuit may be configured to measure a magnitude of the bus voltage across the power bus during the off portion of the periodic time period. The control circuit may be configured to calculate a proportionate amount of the power capability of the bus power supply that the drive unit can consume during the next on portion of the periodic time period based on the power required by the drive unit and the magnitude of the bus voltage across the power bus during the off portion of the periodic time period. The control circuit may be configured to control the power limiting circuit to consume the allocated amount of power from the power bus during the next on portion of the periodic time period, where the allocated amount of power may be determined based on the proportionate amount that the drive unit can consume multiplied by the power capability of the bus power supply. In some examples, the control circuit may be configured to determine the amount of power required by the drive unit based on a power required by the drive unit to power the electrical load, charge an internal energy storage element of the motor drive unit, and a standby power consumption of the motor drive unit.

The control circuit may be configured to signal the required amount of power of the drive unit to the bus power supply prior to controlling the power limiting circuit to consume the allocated amount of power from the power bus.

The drive unit may be part of a system that includes a plurality of drive units and a bus power supply that includes a power converter that is configured to generate the bus voltage on the power bus, where the bus power supply may have a power capability that defines a maximum amount of power that the bus power supply can deliver over the power bus. The bus power supply may be characterized by a nominal power capability that defines a nominal power threshold at or below which the bus power supply may supply power indefinitely to the plurality of drive units, wherein the nominal power threshold may be less than the maximum amount of power defined by the power capability of the bus power supply. The bus power supply may be configured to continuously supply power to the power bus at or below the nominal power threshold without interruption or disconnection by an over-power protection circuit of the bus power supply. The bus power supply may be configured to supply power to the plurality of drive units at one or more increased power capabilities that are greater than the nominal power capability for up to, but not longer than, respective predetermined increased-power time periods.

The bus power supply may include a power converter circuit and an over-power protection circuit. The over-power protection circuit may be configured disconnect the bus voltage from the power bus in response to a magnitude of an output power of the power converter circuit exceeding a first increased-power threshold for more than a first increased-power time period, and may be configured to disconnect the bus voltage from the power bus in response to the magnitude of the output power of the power converter circuit exceeding a second increased-power threshold for more than a second increased-power time period.

The bus power supply may include a variable resistor, and the bus power supply may be configured to adjust a variable resistance of the variable resistor to adjust the allocated power calculated by each of the motor drive units on the power bus. An increase of the variable resistance may cause the control circuit of each of the plurality of drive units to determine that the cumulative total power required by the plurality of drive units has increased.

A load control system for controlling a plurality of electrical loads may include a bus power supply and a plurality of drive units (e.g., motor drive units). The bus power supply may include a power converter. The bus power supply may be configured to generate a bus voltage on a power bus during an on portion of a periodic time period, and configured to not generate the bus voltage on the power bus during an off portion of the periodic time period. The bus power supply may have a power capability that defines a maximum amount of power that the bus power supply can deliver over the power bus.

A drive unit may include a power limiting circuit that is configured to conduct current from the power bus and generate a supply voltage. The drive unit may include an internal energy storage element and/or a load circuit. The load circuit may be configured to receive the supply voltage and control power delivered to an electrical load. The drive unit may include a control circuit that is configured to determine an amount of power required by the drive unit to power the electrical load and charge the internal energy storage element. The control circuit may be configured to conduct a power-requirement current onto the power bus during the off portion of the periodic time period. A magnitude of the power-requirement current may be proportional to the amount of power required by the drive unit. The control circuit may be configured to measure a magnitude of the bus voltage across the power bus during the off portion of the periodic time period. The control circuit may be configured to calculate a proportionate amount of the power capability of the bus power supply that the drive unit can consume during the next on portion of the periodic time period based on the power required by the drive unit and the magnitude of the bus voltage across the power bus during the off portion of the periodic time period. The control circuit may be configured to control the power limiting circuit to consume the proportionate amount of power from the power bus during the next on portion of the periodic time period. The allocated amount of power may be determined based on the proportionate amount that the drive unit can consume multiplied by the power capability of the bus power supply. The magnitude of the bus voltage across the power bus may represent the cumulative total power required by the plurality of drive units.

A bus power supply, which may be used in a load control system for controlling a plurality of electrical loads, may include a power converter circuit and an over-protection circuit. The power converter circuit may be configured to generate a DC bus voltage on a DC power bus of the load control system. The over-current protection circuit may be configured to disconnect the power converter circuit from the power bus in response to a magnitude of a bus current of the power bus exceeding a first current threshold for a first time period or exceeding a second current threshold for a second time period. In some examples, the over-current protection circuit may be configured to render a controllably conductive device non-conductive to disconnect the power converter circuit from the power bus. For example, the controllably conductive device may include two field-effect transistors (FETs) in an anti-series configuration. The first current threshold may be smaller than the second current threshold, and the first time period may be longer than the second current threshold.

The over-current protection circuit may include a first comparator that is configured to compare the bus current to the first current threshold, and a second comparator that is configured to compare the bus current to the second current threshold. The over-current protection circuit may also include a first timer that is configured to determine whether the first time period has elapsed, and a second timer that is configured to determine whether the second time period has elapsed. The over-current protection circuit may include a latching circuit configured to disconnect the power converter circuit from the power bus. The over-current protection circuit may be further configured to disconnect the power converter circuit from the power bus instantaneously when the bus current exceeds an instantaneous trip current.

A bus power supply, which is configured to provide a bus voltage to a plurality of devices, may include a first controllable switching circuit and a second controllable switching circuit. The second controllable switching circuit may be coupled between a junction of the first controllable switching circuit and circuit common through a sense resistor. The bus power supply may include a control circuit that is configured to render the first controllable switching circuit conductive and render the second controllable switching circuit non-conductive for an on portion of a periodic time period to provide the bus voltage on the power bus during the on portion of the periodic time period, and render the first controllable switching circuit non-conductive and render the second controllable switching circuit non-conductive for an off portion of the periodic time period to not provide the bus voltage on the power bus during the off portion of the periodic time period. The control circuit may be configured to measure a total amount of voltage across the power bus during the off portion of the periodic time period, and determine a total power requirement of the plurality of devices based on the measurement.

The bus power supply may include a first power connector for receiving an input voltage from an external power supply, and a second power connector that is configured to be connected to the power bus, wherein the bus is configured to be electrically coupled to the plurality of devices. The first controllable switching circuit may be coupled between an output of a power converter and the second power connector. The second controllable switching circuit may be coupled between a junction of the first controllable switching circuit and the second power connector and circuit common through the sense resistor. The second controllable switching circuit and the sense resistor may be coupled in parallel between the terminals of the second power connector. The external power supply may include an alternating-current power source for generating an AC main line voltage.

The sense resistor may include a variable resistor. The control circuit may be configured to adjust a variable resistance of the variable resistor to adjust an amount of power that the bus power supply can deliver over the power bus during the on portion of the periodic time period. In some examples, the bus power supply may include a power converter circuit, and the bus power supply may have a power capability that defines a maximum output power of the power converter circuit. In such examples, the control circuit may be configured to adjust the variable resistance of the variable resistor to adjust a magnitude of the output power of the power converter circuit. The control circuit may be configured to adjust the variable resistance of the variable resistor to adjust the total power requirement of the plurality of devices. The bus power supply may be characterized by a nominal power capability that defines a nominal power threshold at or below which the bus power supply may supply power indefinitely to the plurality of devices. The bus power supply may be configured to adjust the variable resistance of the variable resistor to allow the plurality of devices to consume a magnitude of power on the power bus that is greater than (e.g., and/or less than) the nominal power threshold.

The bus power supply comprises a current source, and the bus power supply may be configured to conduct current onto the power bus during the off portion of the periodic time period to adjust an amount of power consumed by the plurality of devices.

The bus power supply may be configured to supply power to the plurality of devices at one or more increased power capabilities that are greater than the nominal power capability for up to, but not longer than, respective predetermined increased-power time periods. For example, the bus power supply may include an over-power protection circuit that is configured to disconnect the bus voltage from the power bus in response to an over-power condition. The first controllable switching circuit may be coupled between an output of the over-power protection circuit and the power bus. The bus power supply may continuously supply power to the power bus at or below the nominal power threshold without interruption or disconnection by the over-power protection circuit of the bus power supply. The bus power supply may include a power converter circuit. The over-power protection circuit may be configured disconnect the bus voltage from the power bus in response to a magnitude of an output power of the power converter circuit exceeding a first increased-power threshold for more than a first increased-power time period, and may be configured to disconnect the bus voltage from the power bus in response to the magnitude of the output power of the power converter circuit exceeding a second increased-power threshold for more than a second increased-power time period.

A bus power supply may include a power converter circuit configured to generate a power supply voltage, and an over-current protection circuit configured to receive the power supply voltage from the power converter circuit and provide the bus voltage on the power bus. The over-current protection circuit may be configured to disconnect the power converter circuit from the power bus in response to a magnitude of the power supply voltage exceeding a first power threshold for a first period of time, and/or disconnect the power converter circuit from the power bus in response to the magnitude of the power supply voltage exceeding a second power threshold for a second period of time, wherein the first power threshold is smaller than the second power threshold, and the first time period is longer than the second time period. The over-current protection circuit may be configured to disconnect the power converter circuit from the power bus instantaneously when the magnitude of the bus current exceeds a maximum power threshold.

DETAILED DESCRIPTION

Figure 1:
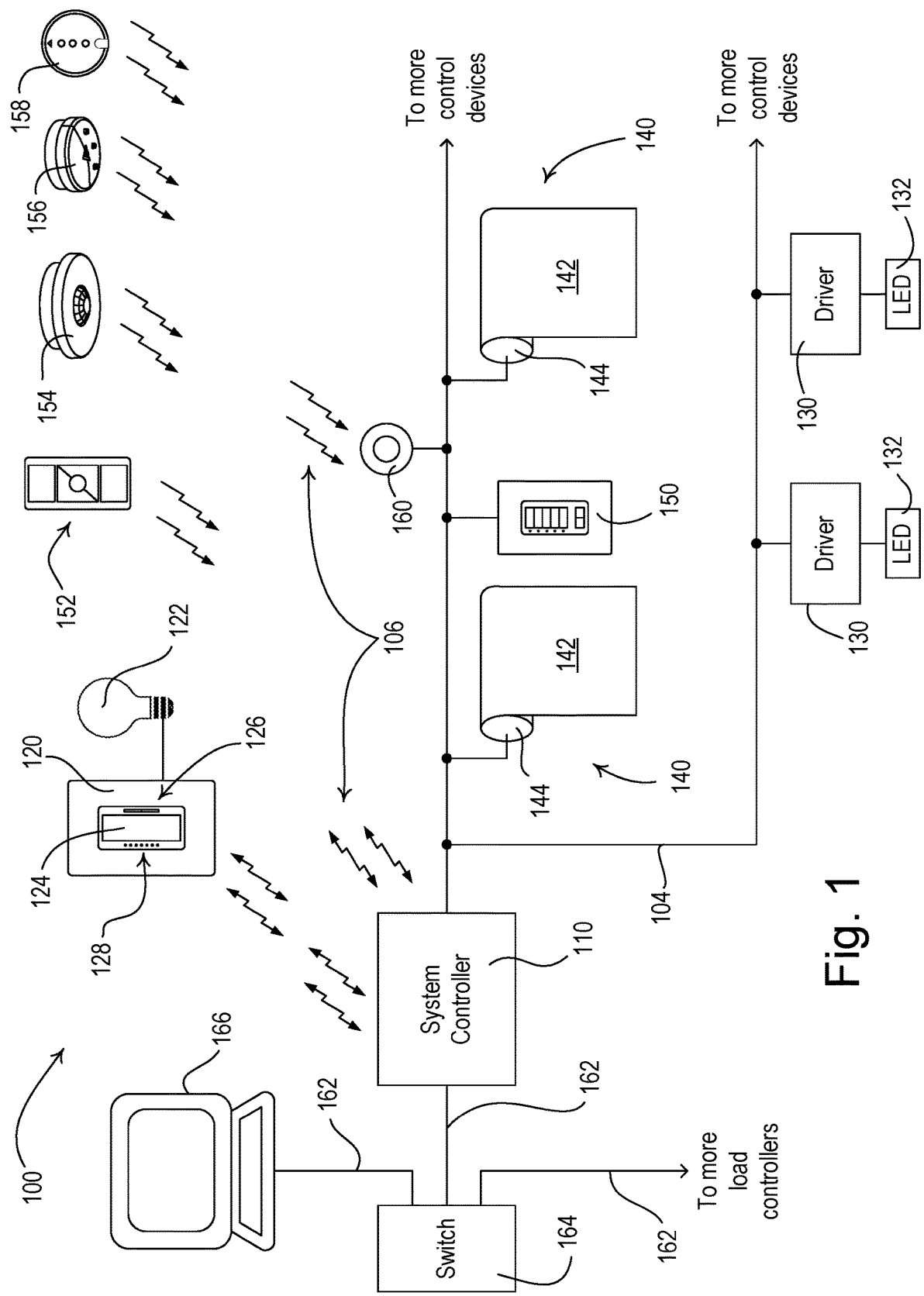
FIG. 1 is a simplified block diagram of a load control system having load control devices and motorized window treatments.

FIG. 1 is a simple diagram of an example load control system for controlling the amount of power delivered from an alternating-current (AC) power source (not shown) to one or more electrical loads. The load control system 100 may comprise a system controller 110 (e.g., a load controller or a central controller) operable to transmit and/or receive digital messages via a wired and/or a wireless communication link. For example, the system controller 110 may be coupled to one or more wired control devices via a wired digital communication link 104. The system controller 110 may be configured to transmit and/or receive wireless signals, e.g., radio-frequency (RF) signals 106, to communicate with one or more wireless control devices. The load control system 100 may comprise a number of control-source devices and/or a number of control-target devices for controlling an electrical load. The control-source devices may be input devices operable to transmit digital messages configured to control an electrical load via a control-target device. For example, control-source devices may transmit the digital messages in response to user input, occupancy/vacancy conditions, changes in measured light intensity, or other input information. The control-target devices may be load control devices operable to receive digital messages and control respective electrical loads in response to the received digital messages. A single control device of the load control system 100 may operate as both a control-source and a control-target device. The system controller 110 may be configured to receive digital messages from the control-source devices and transmit digital messages to the control-target devices in response to the digital messages received from the control-source devices. The control-source devices and the control-target devices may also, or alternatively, communicate directly.

The load control system 100 may comprise a load control device, such as a dimmer switch 120, for controlling a lighting load 122. The dimmer switch 120 may be adapted to be wall-mounted in a standard electrical wallbox. The dimmer switch 120 may comprise a tabletop or plug-in load control device. The dimmer switch 120 may comprise a toggle actuator 124 (e.g., a button) and/or an intensity adjustment actuator 126 (e.g., a rocker switch). Successive actuations of the toggle actuator 124 may toggle, e.g., turn off and on, the lighting load 122. Actuations of an upper portion or a lower portion of the intensity adjustment actuator 126 may respectively increase or decrease the amount of power delivered to the lighting load 122 and increase or decrease the intensity of the lighting load from a minimum intensity (e.g., approximately 1%) to a maximum intensity (e.g., approximately 100%). The dimmer switch 120 may further comprise a plurality of visual indicators 128, e.g., light-emitting diodes (LEDs), which may be arranged in a linear array and/or may be illuminated to provide feedback of the intensity of the lighting load 122. The dimmer switch 120 may be configured to receive digital messages from the system controller 110 via the RF signals 106 and to control the lighting load 122 in response to the received digital messages. The dimmer switch 120 may also, or alternatively, be coupled to the wired digital communication link 104. Examples of wall-mounted dimmer switches are described in greater detail in U.S. Pat. No. 5,248,919, issued Sep. 28, 1993, entitled LIGHTING CONTROL DEVICE, and U.S. Pat. No. 9,679,696, issued Jun. 13, 2017, entitled WIRELESS LOAD CONTROL DEVICE, the entire disclosures of which are hereby incorporated by reference.

The load control system 100 may further comprise one or more remotely-located load control devices, such as light-emitting diode (LED) drivers 130 for driving respective LED light sources 132 (e.g., LED light engines). The LED drivers 130 may be located remotely, for example, in the lighting fixtures of the respective LED light sources 132. The LED drivers 130 may be configured to receive digital messages from the system controller 110 via the digital communication link 104 and to control the respective LED light sources 132 in response to the received digital messages. The LED drivers 130 may be coupled to a separate digital communication link, such as an Ecosystem® or digital addressable lighting interface (DALI) communication link, and the load control system 100 may include a digital lighting controller coupled between the digital communication link 104 and the separate communication link. The LED drivers 132 may include internal RF communication circuits or be coupled to external RF communication circuits (e.g., mounted external to the lighting fixtures, such as to a ceiling) for transmitting and/or receiving the RF signals 106. The load control system 100 may further comprise other types of remotely-located load control devices, such as, for example, electronic dimming ballasts for driving fluorescent lamps.

The load control system 100 may further comprise a plurality of daylight control devices, e.g., motorized window treatments, such as motorized roller shades 140, to control the amount of daylight entering the building in which the load control system may be installed. A motorized roller shades 140 may comprise a covering material (e.g., a window treatment fabric 142). The covering material may be wound around a roller tube for raising and/or lowering the window treatment fabric 142. The motorized roller shades 140 may comprise motor drive units 144 (e.g., electronic drive units). The motor drive units 144 may be located inside the roller tube of the motorized roller shade. The motor drive units 144 may be coupled to the digital communication link 104 for transmitting and/or receiving digital messages. The motor drive units 144 may include a control circuit. The control circuit may be configured to adjust the position of the window treatment fabric 142, for example, in response to digital messages received from the system controller 110 via the digital communication link 104. Each of the motor drive units 144 may include memory for storing association information for associations with other devices and/or instructions for controlling the motorized roller shade 140. The motor drive units 144 may comprise an internal RF communication circuit. The motor drive units 144 may also, or alternatively, be coupled to an external RF communication circuit (e.g., located outside of the roller tube) for transmitting and/or receiving the RF signals 106. The load control system 100 may comprise other types of daylight control devices, such as, for example, a cellular shade, a drapery, a Roman shade, a Venetian blind, a Persian blind, a pleated blind, a tensioned roller shade systems, an electrochromic or smart window, and/or other suitable daylight control device.

The load control system 100 may comprise one or more other types of load control devices, such as, for example, a screw-in luminaire including a dimmer circuit and an incandescent or halogen lamp; a screw-in luminaire including a ballast and a compact fluorescent lamp; a screw-in luminaire including an LED driver and an LED light source; an electronic switch, a controllable circuit breaker, or other switching device for turning an appliance on and off; a plug-in load control device, a controllable electrical receptacle, or a controllable power strip for controlling one or more plug-in loads; a motor control unit for controlling a motor load, such as a ceiling fan or an exhaust fan; a drive unit for controlling a motorized window treatment or a projection screen; motorized interior or exterior shutters; a thermostat for a heating and/or cooling system; a temperature control device for controlling a setpoint temperature of a heating, ventilation, and air conditioning (HVAC) system; an air conditioner; a compressor; an electric baseboard heater controller; a controllable damper; a variable air volume controller; a fresh air intake controller; a ventilation controller; hydraulic valves for use in radiators and radiant heating systems; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and/or an alternative energy controller.

The load control system 100 may comprise one or more input devices, e.g., such as a wired keypad device 150, a battery-powered remote control device 152, an occupancy sensor 154, a daylight sensor 156, and/or a shadow sensor 158. The wired keypad device 150 may be configured to transmit digital messages to the system controller 110 via the digital communication link 104 in response to an actuation of one or more buttons of the wired keypad device. The battery-powered remote control device 152, the occupancy sensor 154, the daylight sensor 156, and/or the shadow sensor 158 may be wireless control devices (e.g., RF transmitters) configured to transmit digital messages to the system controller 110 via the RF signals 106 (e.g., directly to the system controller). For example, the battery-powered remote control device 152 may be configured to transmit digital messages to the system controller 110 via the RF signals 106 in response to an actuation of one or more buttons of the battery-powered remote control device 152. The occupancy sensor 154 may be configured to transmit digital messages to the system controller 110 via the RF signals 106 in response to detection of occupancy and/or vacancy conditions in the space in which the load control system 100 may be installed. The daylight sensor 156 may be configured to transmit digital messages to the system controller 110 via the RF signals 106 in response to detection of different amounts of natural light intensity. The shadow sensor 158 may be configured to transmit digital messages to the system controller 110 via the RF signals 106 in response to detection of an exterior light intensity coming from outside the space in which the load control system 100 may be installed. The system controller 110 may be configured to transmit one or more digital messages to the load control devices (e.g., the dimmer switch 120, the LED drivers 130, and/or the motorized roller shades 140) in response to the received digital messages, e.g., from the wired keypad device 150, the battery-powered remote control device 152, the occupancy sensor 154, the daylight sensor 156, and/or the shadow sensor 158. While the system controller 110 may receive digital messages from the input devices and/or transmit digital messages to the load control devices for controlling an electrical load, the input devices may communicate directly with the load control devices for controlling the electrical load.

The load control system 100 may comprise a wireless adapter device 160 that may be coupled to the digital communication link 104. The wireless adapter device 160 may be configured to receive the RF signals 106. The wireless adapter device 160 may be configured to transmit a digital message to the system controller 110 via the digital communication link 104 in response to a digital message received from one of the wireless control devices via the RF signals 106. For example, the wireless adapter device 160 may re-transmit the digital messages received from the wireless control devices on the digital communication link 104.

The occupancy sensor 154 may be configured to detect occupancy and/or vacancy conditions in the space in which the load control system 100 may be installed. The occupancy sensor 154 may transmit digital messages to the system controller 110 via the RF signals 106 in response to detecting the occupancy and/or vacancy conditions. The system controller 110 may be configured to turn one or more of the lighting load 122 and/or the LED light sources 132 on and off in response to receiving an occupied command and a vacant command, respectively. The occupancy sensor 154 may operate as a vacancy sensor, such that the lighting loads are turned off in response to detecting a vacancy condition (e.g., not turned on in response to detecting an occupancy condition).

The daylight sensor 156 may be configured to measure a total light intensity in the space in which the load control system is installed. The daylight sensor 156 may transmit digital messages including the measured light intensity to the system controller 110 via the RF signals 106. The digital messages may be used to control an electrical load (e.g., the intensity of lighting load 122, the motorized window shades 140 for controlling the level of the covering material, the intensity of the LED light sources 132) via one or more control load control devices (e.g., the dimmer switch 120, the motor drive unit 144, the LED driver 130).

The shadow sensor 158 may be configured to measure an exterior light intensity coming from outside the space in which the load control system 100 may be installed. The shadow sensor 158 may be mounted on a façade of a building, such as the exterior or interior of a window, to measure the exterior natural light intensity depending upon the location of the sun in sky. The shadow sensor 158 may detect when direct sunlight is directly shining into the shadow sensor 158, is reflected onto the shadow sensor 158, or is blocked by external means, such as clouds or a building, and may send digital messages indicating the measured light intensity. The shadow sensor 158 may transmit digital messages including the measured light intensity to the system controller 110 via the RF signals 106. The digital messages may be used to control an electrical load (e.g., the intensity of lighting load 122, the motorized window shades 140 for controlling the level of the covering material, and/or the intensity of the LED light sources 132) via one or more control load control devices (e.g., the dimmer switch 120, the motor drive unit 144, and/or the LED driver 130). The shadow sensor 158 may also be referred to as a window sensor, a cloudy-day sensor, or a sun sensor.

The load control system 100 may comprise other types of input device, such as: temperature sensors; humidity sensors; radiometers; pressure sensors; smoke detectors; carbon monoxide detectors; air quality sensors; motion sensors; security sensors; proximity sensors; fixture sensors; partition sensors; keypads; kinetic- or solar-powered remote controls; key fobs; cell phones; smart phones; tablets; personal digital assistants; personal computers; laptops; timeclocks; audio-visual controls; safety devices; power monitoring devices (such as power meters, energy meters, utility submeters, utility rate meters); central control transmitters; residential, commercial, or industrial controllers; or any combination of these input devices. These input devices may transmit digital messages to the system controller 110 via the RF signals 106. The digital messages may be used to control an electrical load (e.g., the intensity of lighting load 122, the motorized window shades 140 for controlling the level of the covering material, and/or the intensity of the LED light sources 132) via one or more control load control devices (e.g., the dimmer switch 120, the motor drive unit 144, and/or the LED driver 130).

The system controller 110 may be configured to control the load control devices (e.g., the dimmer switch 120, the LED drivers 130, and/or the motorized roller shades 140) according to a timeclock schedule. The timeclock schedule may be stored in a memory in the system controller. The timeclock schedule may be defined by a user of the system controller (e.g., a system administrator using a programming mode of the system controller 110). The timeclock schedule may include a number of timeclock events. The timeclock events may have an event time and a corresponding command or preset. The system controller 110 may be configured to keep track of the present time and/or day. The system controller 110 may transmit the appropriate command or preset at the respective event time of each timeclock event.

The load control system 100 may be part of an automated window treatment control system. The system controller 110 may control the shades according to automated window treatment control information. For example, the automated window treatment control information may include the angle of the sun, sensor information, an amount of cloud cover, and/or weather data, such as historical weather data and real-time weather data. For example, throughout course of a calendar day, the system controller 110 of the automated window treatment control system may adjust the position of the window treatment fabric multiple times, based on the calculated position of the sun or sensor information. The automated window treatment control system may determine the position of the window treatments in order to affect a performance metric. The automated window treatment system may command the system controller 110 to adjust the window treatments to the determined position in order to affect a performance metric. The automated window treatment control system may operate according to a timeclock schedule. Based on the timeclock schedule, the system controller may change the position of the window treatments throughout a calendar day. The timeclock schedule may be set to prevent the daylight penetration distance from exceeding a maximum distance into an interior space (e.g., work space, transitional space, or social space). The maximum daylight penetration distance may be set to a user's workspace. The system controller 110 may adjust the position of the window treatments according to collected sensor information.

The system controller 110 may be operable to be coupled to a network, such as a wireless or wired local area network (LAN) via a network communication bus 162 (e.g., an Ethernet communication link), e.g., for access to the Internet. The system controller 110 may be connected to a network switch 164 (e.g., a router or Ethernet switch) via the network communication bus 162 for allowing the system controller 110 to communicate with other system controllers for controlling other electrical loads. The system controller 110 may be wirelessly connected to the network, e.g., using Wi-Fi technology. The system controller 110 may be configured to communicate via the network with one or more network devices, such as a smart phone, a personal computer 166, a laptop, a tablet device (e.g., a hand-held computing device), a wireless-communication-capable television, and/or any other suitable wireless communication device (e.g., an Internet-Protocol-enabled device). The network device may be operable to transmit digital messages to the system controller 110 in one or more Internet Protocol packets.

The operation of the load control system 100 may be programmed and/or configured using the personal computer 166 or other network device. The personal computer 166 may execute a graphical user interface (GUI) configuration software for allowing a user to program how the load control system 100 may operate. The configuration software may generate load control information (e.g., a load control database) that defines the operation and/or performance of the load control system 100. For example, the load control information may include information regarding the different load control devices of the load control system (e.g., the dimmer switch 120, the LED drivers 130, and/or the motorized roller shades 140). The load control information may include information regarding associations between the load control devices and the input devices (e.g., the wired keypad device 150, the battery-powered remote control device 152, the occupancy sensor 154, the daylight sensor 156, and/or the shadow sensor 158), and/or how the load control devices may respond to input received from the input devices.

The system controller 110 may be configured to automatically control the motorized window treatments (e.g., the motorized roller shades 140). The motorized window treatments may be controlled to save energy and/or improve the comfort of the occupants of the building in which the load control system 100 may be installed. For example, the system controller 110 may be configured to automatically control the motorized roller shades 140 in response to a timeclock schedule, the daylight sensor 156, and/or the shadow sensor 158. The roller shades 140 may be manually controlled by the wired keypad device 150 and/or the battery-powered remote control device 152.

Figure 2A:
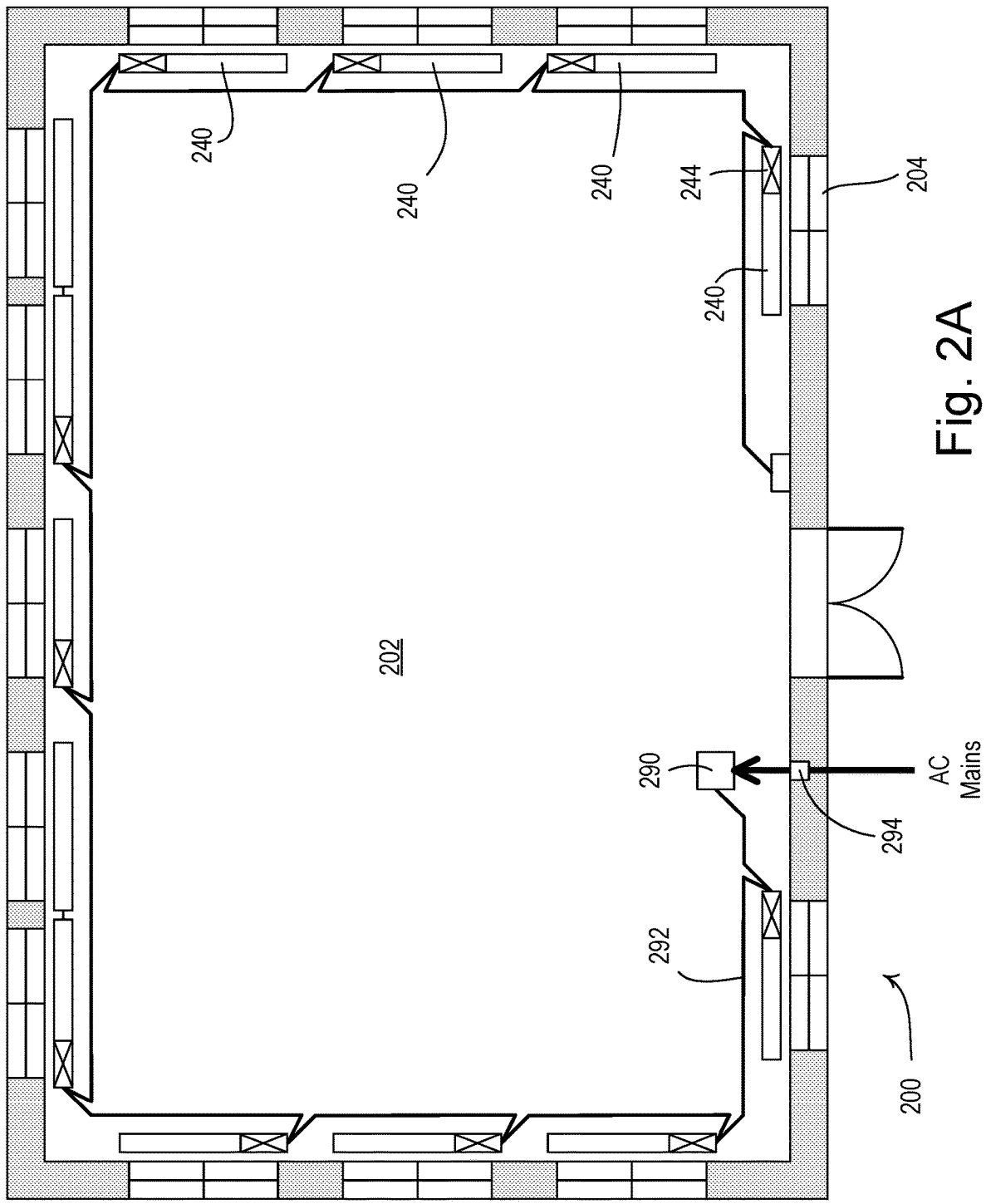
FIGS. 2A-2C are floorplan views of a direct-current (DC) power distribution system for a control system.
Figure 2B:
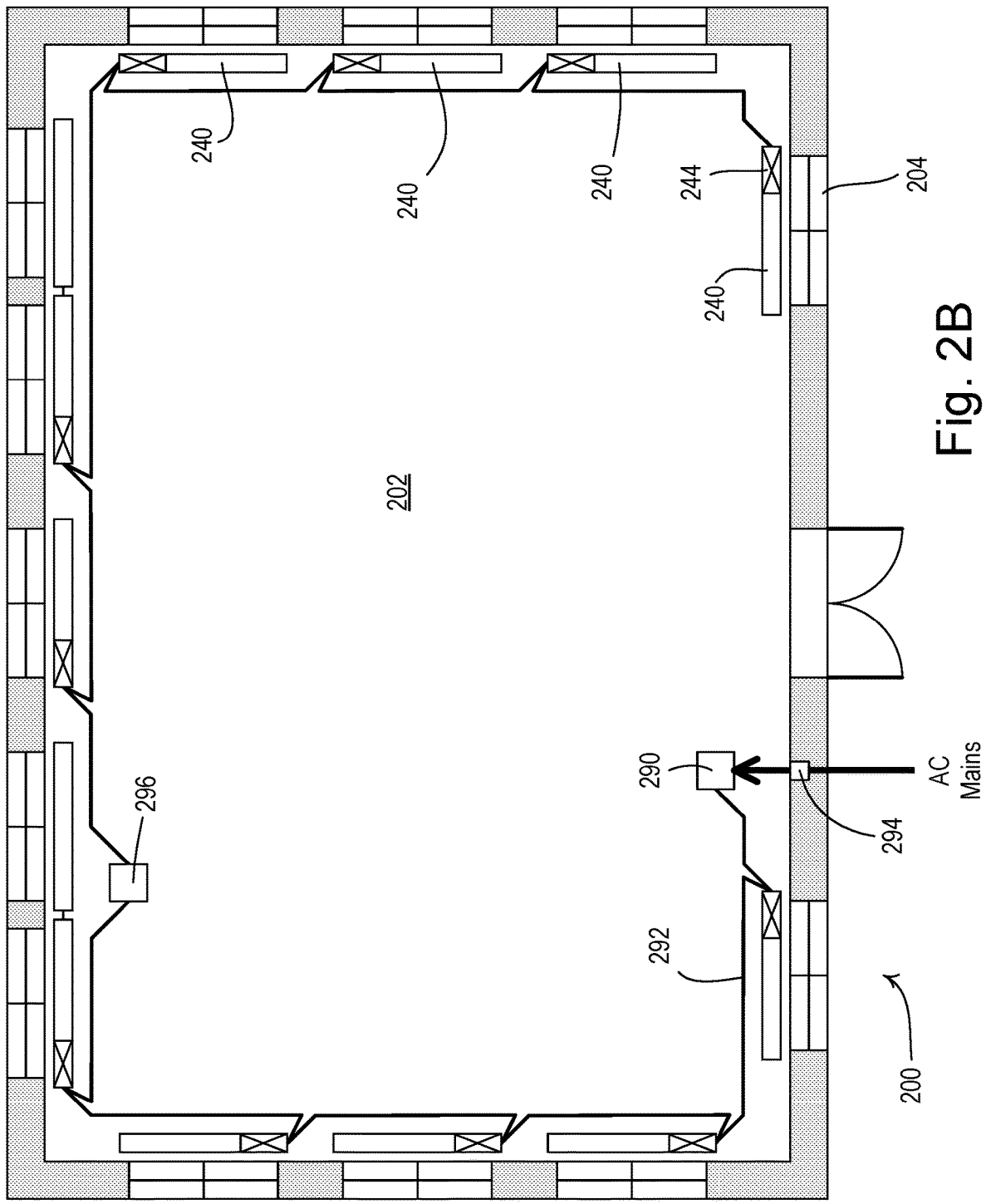
Figure 2C:
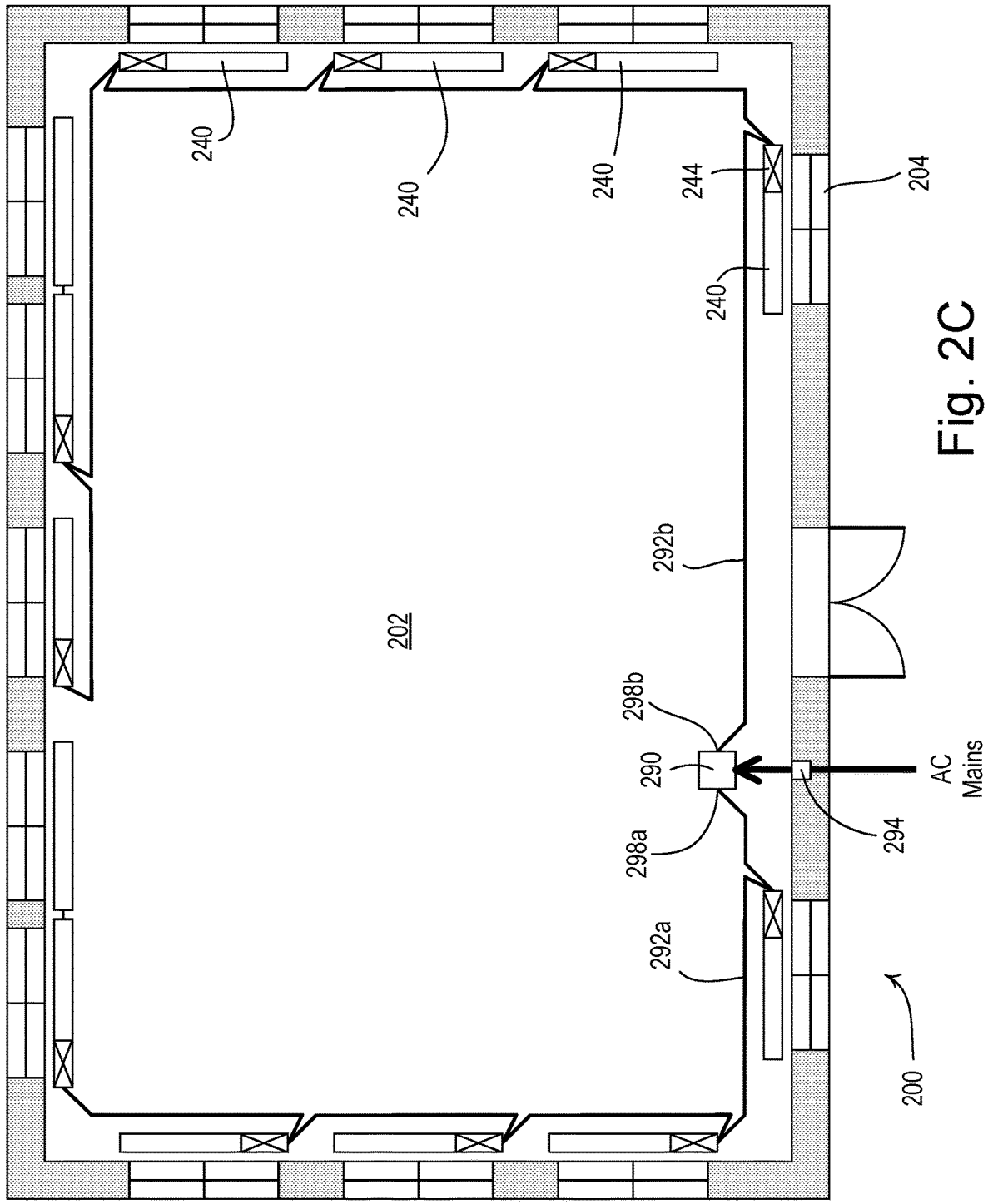

FIGS. 2A-2C are floorplan views of a direct-current (DC) power distribution system 200 for a control system (e.g., the load control system 100 shown in FIG. 1) that may be installed in a building 202. The control system may comprise one or more motorized window treatments 240 (e.g., the motorized roller shades 140 shown in FIG. 1) for controlling the amount of daylight entering the building 202 through respective windows 204. Each motorized window treatment 240 may comprise a respective roller tube and a respective covering material (not shown), such as the window treatment fabric 142 of the motorized roller shades 140 shown in FIG. 1. The motorized window treatments 240 may also comprise respective motor drive units 244 (e.g., the motor drive units 144 shown in FIG. 1) configured to adjust the positions of the respective covering materials. Each motor drive unit 244 may comprise an internal energy storage element, such as one or more rechargeable batteries and/or supercapacitors (e.g., as will be described in greater detail below).

The DC power distribution system 200 may comprise a bus power supply 290 (e.g., a Class 2 power supply), which may be electrically coupled to the motor drive units 244 of the motorized window treatments 240 via a power bus 292

(e.g., a DC power bus). The bus power supply 290 may be electrically coupled to an alternating-current (AC) mains supply for receiving an AC mains line voltage. The bus power supply 290 may be configured to generate (e.g., from the AC mains line voltage) a bus voltage on the bus power supply 292 for charging (e.g., trickle charging) the energy storage elements of the motor drive units 244. The power bus 292 may be electrically coupled to the motor drive units 244 in a daisy-chain configuration. For example, each motor drive unit 244 may comprise two power connectors (e.g., a power-in connector and a power-out connector) to allow for each daisy-chaining of the motor drive units. The bus power supply 290 may be configured to adjust (e.g., temporarily adjust) the magnitude of the DC bus voltage under certain conditions (e.g., in response to the number of motor drive units 244 that presently need to charge their internal energy storage elements). The bus power supply 290 may be configured to perform the functions (e.g., any of the example functions of described herein) of a system controller (e.g., the system controller 110). Further, in some examples, the bus power supply 290 may comprise a system controller (e.g., the system controller 110).

As shown in FIG. 2A, the power bus 292 may be a single cable (e.g., a single wire run) that may extend (e.g., in approximately a full loop) around the perimeter of an entire floor of the building 202 for charging the energy storage elements of all of the motor drive units 244 on the floor. The cable of the power bus 292 may comprise at least two or more electrical wires (e.g., electrical conductors) for distributing the bus voltage from the bus power supply 290 to the motor drive units 244 of the DC power distribution system 200. For example, the building may comprise a plurality of floors and the DC power distribution system 200 may comprise a plurality of respective power buses 292, with one of the power buses 292 on each of the floors of the building. The AC mains power source may be coupled to the power bus 292 on each floor of the building through a single circuit breaker 294 on each floor.

The energy storage elements of the motor drive units 244 may have a limited capacity for moving (e.g. capacity to power the movement of) the covering materials of the respective motorized window treatments 240. For example, the energy storage elements of the motor drive unit 244 may have a capacity to power a predetermined number of movements (e.g., full movements) of the covering materiel, where a full movement of the covering material may be a movement from a fully-raised position (e.g., a fully-open position) to a fully-lowered position (e.g., a fully-closed position) or a movement from the fully-lowered position to the fully-raised position. The motor drive units 244 may be configured to limit (e.g., prevent future movement at the limit or after the limit is exceeded) the number of movements (e.g., full movements) and/or the total amount (e.g., a number of rotations of the roller tube) of movement, for example, over a period of time (e.g., one day). For example, the motor drive units 244 may be configured to count the number of movements (e.g., full movements) during a day and prevent future movement of the covering material after the number (e.g., predetermined number) of movements exceeds a movement threshold (e.g., less than or equal to ten full movements, such as approximately five to ten full movements). In addition, the motor drive units 244 may be configured to store the total amount of movement (e.g., in units of rotation of the motor and/or linear distance of movement of a lower edge of the covering material) during a day and prevent future movement of the covering material after the total amount of movement exceeds a distance threshold (e.g., a predetermined amount of movement). For example, the distance threshold may be a value representing four full movements of the covering material between the fully-lowered position and the fully-raised position. The motor drive units 244 may also be configured to limit the frequency of movements. The motor drive units 244 may once again allow movement of the covering material at the end of the present day, at the end of a predetermined period of time after movement is stopped, and/or when the internal energy storage element has charged to an acceptable level.

The motor drive units 244 may be configured to communicate with each other via a communication link (not shown), such as a wired or wireless communication link. For example, if the motor drive units 244 are configured to transmit and receive wireless signals, such as radio-frequency (RF) signals, the power bus 292 may simply comprise two electrical conductors for suppling voltage and current to the motor drive units. In addition, the power bus 292 may be packaged together with a wired digital communication link (e.g., an RS-485 digital communication link) to allow the motor drive units 244 to communicate via the wired communication link. Further, the motor drive units 244 may be configured to communicate with each other by transmitting signals via the two electrical conductors of the power bus 292, for example, using a power-line communication (PLC) technique.

The motor drive units 244 may be configured to learn the storage levels of the energy storage elements of the other motor drive units 244 in the DC power distribution system 200 (e.g. as a percentage of a maximum storage capacity of the energy storage elements and/or a voltage level of the energy storage elements). For example, the motor drive units 244 may each periodically transmit the storage level of its energy storage element.

The motor drive units 244 may each be configured to control when the internal energy storage element charges. Multiple motor drive units 244 may charge the internal energy storage elements at the same time. In addition, a limited number of motor drive units 244 (e.g., one at a time) may be configured to charge the internal energy storage elements at once. The motor drive units 244 may be configured to coordinate when each of the motor drive units 244 charges its internal energy storage element. The motor drive units 244 may be configured to arbitrate with each other by communicating via the communication link in order to determine which motor drive unit(s) 244 should presently be charging its internal energy storage element. The motor drive units 244 may be configured to prioritize which motor drive unit should charge its internal energy storage element based on power needs of the motor drive units. For example, the motor drive units 244 having the lowest storage level of all of the motor drive units in the DC power distribution system 200 may be configured to charge its energy storage element before the other motor drive units.

Another device, such as a system controller (e.g., the system controller 110) and/or the bus power supply 290, may communicate with the motor drive units 244 to manage which of the motor drive unit(s) 244 is presently charging its internal energy storage element (e.g. based on the storage level(s) of the internal energy storage element(s)). The system controller may be configured to learn when multiple shades are required to move at the same time (e.g., to close all of the motorized window treatments at the end of a day as part of a timeclock schedule). For example, the system controller may store a history of movements of the motorized window treatments 240 and may be configured to determine which motor drive unit 244 should charge its internal energy storage element based on a determination of a motorized window treatment that is expected to move next (e.g., the most likely motorized window treatment to move). As such, the motor drive units 244 may be configured to control the charging of their internal energy storage element (e.g., to a particular storage level) based on past and/or expected usage of the motorized window treatment 240.

The motor drive units 244 may be configured to operate in a normal power mode. In normal power mode, the motor drive units 244 may be configured rotate their motor at a normal speed. Further, in normal power mode, the motor drive units 244 may be configured to charge their internal energy storage element to maximum capacity, or in some examples, to less than the maximum capacity, such as 60% of the maximum capacity. The motor drive units 244 may be configured to operate in a low-power mode during a high power demand event and/or during an energy depletion event. A high-power demand event may be a period of high energy usage of a plurality of load control devices, for example, such as when many (e.g., more than one or a majority) of the motorized window treatments need to move at the same time and/or when many (e.g., more than one or a majority) of the internal energy storage elements of the motor drive units 244 are charging. An energy depletion event may be, for example, when the DC power distribution system 200 is operating in a condition in which many (e.g., a majority of) of the internal energy storage elements of the motor drive units 244 are depleted (e.g., below a threshold level of storage, such as 20%). When operating in the low-power mode, the motor drive units 244 may be configured to, for example, control the motor to rotate as a slower speed (e.g., to reduce power consumption of the motor) and/or delay movements or operation of the motor.

The system controller and/or the bus power supply 290 may cause the motor drive units 244 to enter the low-power mode by transmitting a message to the motor drive units 244 (e.g., to the control circuits of the motor drive units 244). For example, the system controller and/or the bus power supply 290 may be configured to transmit a digital message to the motor drive units 244 (e.g., via the RF signals 106) for causing the motor drive units to enter the low-power mode. Alternatively or additionally, the bus power supply 290 may be configured to detect the high-power demand event (e.g., by measuring a magnitude of an output current of the bus power supply) and signal to the motor drive units 244 by generating a pulse on the power bus 292. For example, the bus power supply 290 may generate the pulse by temporarily increasing the magnitude of the DC bus voltage and/or may temporarily decreasing the magnitude of the DC bus voltage (e.g., to approximately zero volts). The motor drive units 244 may be configured to enter the low-power mode in response to detecting the pulse in the magnitude of the DC bus voltage.

In some cases, one motorized window treatment 240 may be required to move more often than another motorized window treatment. If one of the motor drive units 244 determines that its internal energy storage element has a large storage level (e.g., as compared to the storage level of one or more of the other motor drive units), the motor drive unit 244 may be configured to share charge from its internal energy storage element with one or more of the other motor drive units (e.g., the internal energy storage elements of other motor drive units). In addition, multiple motor drive units 244 may be configured to share charge with multiple other motor drive units.

As shown in FIG. 2B, the DC power distribution system 200 may further comprise a supplemental energy storage element 296 (e.g., an external energy storage element) that may be coupled to the power bus 292 between two of the motor drive units 244. The supplemental energy storage element 296 may be configured to charge from the bus power supply 292, for example, at times when the internal energy storage elements of the motor drive units 244 are charged to suitable levels. For example, during an energy depletion event, the supplemental energy storage element 296 may be configured to charge the internal energy storage elements of the motor drive units 244 that are downstream (e.g., a subset of motor drive units electrically coupled to the power bus 292 after the supplemental energy storage element 296) from the supplemental energy storage element 296 on the power bus 292. At this time, the supplemental energy storage element 296 may be configured to disconnect from the bus power supply 290 and the motor drive units 244 that are upstream (e.g., a subset of motor drive units electrically coupled to the power bus 292 between the supplemental energy storage element 296 and the bus power supply 290) from the supplemental energy storage element 296 on the power bus 292. For example, the supplemental energy storage element may comprise an internal switching circuit, such as a relay, for disconnecting from the bus power supply 290. The DC power distribution system 200 may comprise more than one supplemental energy storage element 296.

The system controller may be configured to determine the existence of an energy depletion event (e.g., when the DC power distribution system 200 is operating in a condition in which most of the internal energy storage elements of the motor drive units 244 are depleted). For example, the supplemental energy storage element 296 may be configured to log in memory and/or report to the system controller when the supplemental energy storage element 296 is needed to charge the internal energy storage elements of the downstream motor drive units 244. The system controller may be configured to optimize when the motor drive units 244 move and/or charge their internal energy storage elements to avoid further energy depletion events. For example, the personal computer 166 may be configured to send an alert to a building manager to indicate that the DC power distribution system 200 was operating in a condition in which most of the internal energy storage elements of the motor drive units 244 were depleted.

As shown in FIG. 2C, the bus power supply 290 may comprise two outputs 298a, 298b that are connected to two power bus legs 292a, 292b (e.g., two cables electrically coupled to the motor drive units 244) that extend around the floor of the building 202. For example, the bus power supply 290 may include a first output 298a that is electrically coupled, via a first cable of the power bus 292a, to a first subset of the motor drive units of the plurality of motorized window treatments, and a second output 298b that is electrically coupled, via a first cable of the power bus 292b, to a second subset of the motor drive units of the plurality of motorized window treatments. With the two power bus legs 292a, 292b, the distance between the bus power supply 290 and the motor drive units 244 at the ends of the power bus legs 292a, 292b may be reduced.

Figure 3:
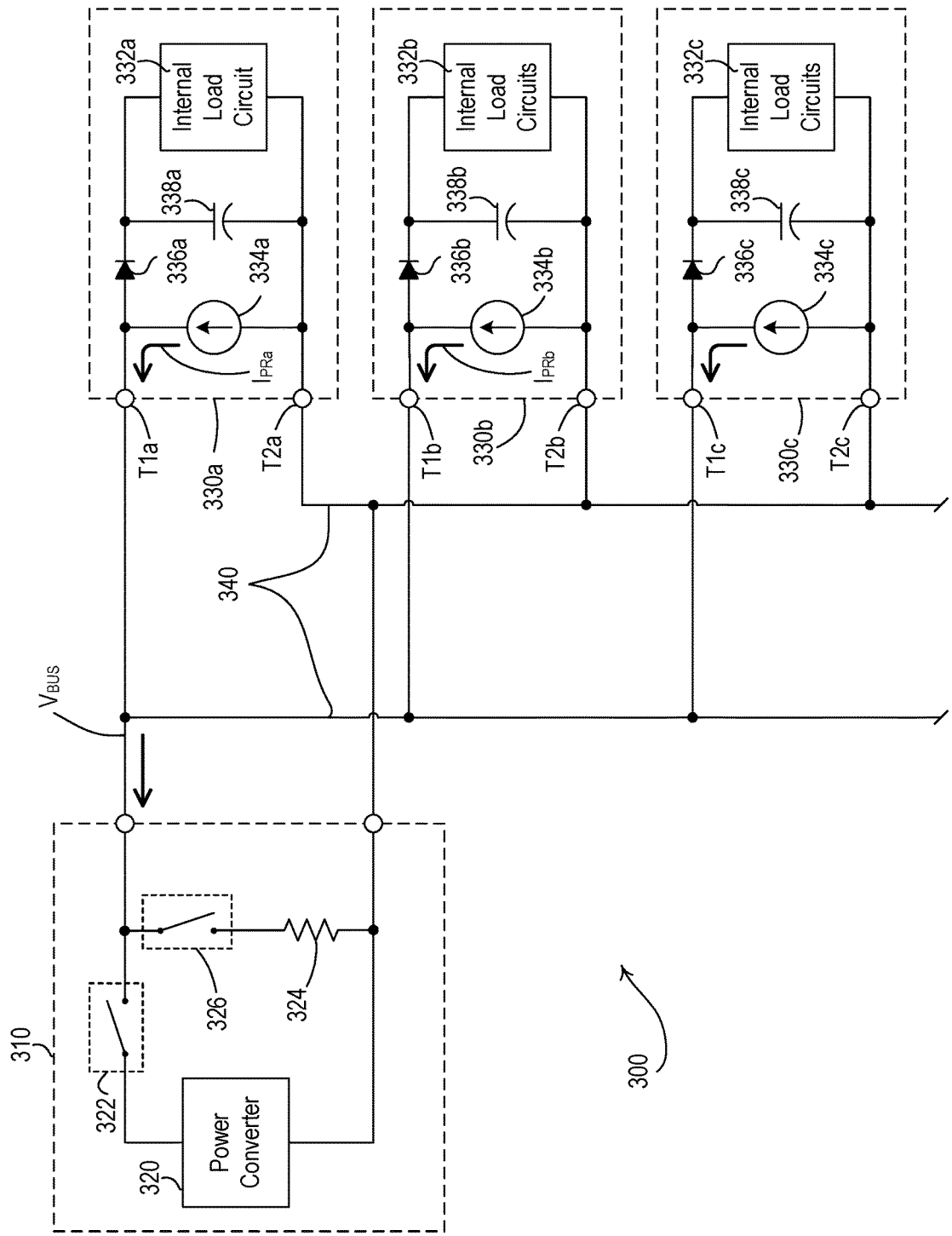
FIG. 3 is a block diagram of an example motor drive unit of a motorized window treatment.

FIG. 3 is a block diagram of an example DC power distribution system 300 used in a for a control system (e.g., the load control system 100 shown in FIG. 1). The DC power distribution system 300 may comprise a bus power supply 310 (e.g., the bus power supply 290), one or more motor drive units 330a, 330b, 330c (e.g., the motor drive units 244), and a power bus 340 (e.g., a DC bus voltage). The control system may comprise one or more motor drive units 330a-330c (e.g., of the motorized roller shades 140 and/or of the motorized window treatments 240). For example, when the motor drive units 330a-330c are configured as motor drive units of a motorized roller shade or a motorized window treatment, the motor drive units 330a-330c may adjust the positions of the respective covering materials to control the amount of daylight entering the building through respective windows. The power bus 340 may be electrically coupled to the motor drive units 330 in a daisy-chain configuration and configured to provide a bus voltage $V_{BUS}$ to the motor drive units 330a-330c. Although illustrated as three motor drive units 330a-330c, more or less motor drive units may be coupled to the power bus 340.

Each motor drive unit 330a-330c may include a respective internal load circuit 332a, 332b, 332c, which may each be a motor or other load internal to the motor drive unit 330. For instance, each internal load circuit 332a-332c may include any combination of an internal energy storage element, a motor drive circuit, and a motor, in some examples. Although described with reference to the motor drive units 330, any control-source devices and/or control-target devices may be connected to the power bus 340 and configured to operate in a manner similar to the motor drive units 330. The energy storage element of the motor drive unit 330 may have a limited capacity for moving (e.g., capacity to power the movement of) the covering materials of the respective motorized window treatments. For example, the energy storage element of the motor drive unit 330 may have a capacity to power a predetermined number of movements (e.g., full movements) of the covering material, where a full movement of the covering material may be a movement from a fully-lowered position to a fully-raised position or a movement from the fully-raised position to the fully-lowered position. The energy storage element may be any combination of a supercapacitor, a rechargeable battery, and/or other suitable energy storage device. The motor drive units 330 may each be configured to control when the internal energy storage element charges. Multiple motor drive units 330 may charge the internal energy storage elements at the same time.

Each motor drive unit 330a-330c may further comprise a respective current source 334a, 334b, 334c that may be coupled to the power bus 340. For example, the current source 334a of the motor drive unit 330a may be coupled between a positive terminal T1a and a negative terminal T2a, the current source 334b of the motor drive unit 330b may be coupled between a positive terminal T1b and a negative terminal T2b, and the current source 334c of the motor drive unit 330c may be coupled between a positive terminal T1c and a negative terminal T2c. Each motor drive unit 330a-330c may further comprise a respective energy storage element 338a, 338b, 338c, (e.g., such as a capacitor) that may be configured to charge from the power bus 340 through a respective diode 336a, 336b, 336c.

The bus power supply 310 may comprise a power converter circuit 320, a first controllable switching circuit 322, a second controllable switching circuit 326, and a sense resistor 324. In some examples, the sense resistor 324 may be a variable resistor, which may have a resistance $R_{VAR}$ that may be controlled by the bus power supply 310. The bus power supply 310 may also include a control circuit (not shown), such as a microprocessor, a programmable logic device (PLD), a microcontroller, an application specific integrated circuit (ASIC), a field-programmable gate array (FPGA), or any suitable processing device or control circuit. The bus power supply 310 may be configured to generate the bus voltage $V_{BUS}$ on the power bus 340 using the power converter circuit 320. The bus voltage $V_{BUS}$ may be provided to the power bus 340 when the first controllable switching circuit 322 is conductive and the second controllable switching circuit 326 is non-conductive. The bus voltage $V_{BUS}$ may be used to charge the (e.g., trickle charge) energy storage elements 338a-338c of the motor drive units 330a-330c. Further, although not illustrated in FIG. 3, the bus power supply 310 may be electrically coupled to an AC mains supply for receiving an AC mains line voltage, and the power converter circuit 320 may be an AC-to-DC converter that is configured to receive the AC mains line voltage and generate the bus voltage $V_{BUS}$. The control circuit may determine the magnitude of the bus voltage $V_{BUS}$, for example, when the first controllable switching circuit 322 is non-conductive and the second controllable switching circuit 326 is conductive. For example, the control circuit may determine the magnitude of the current conducted through the power bus 340 based on one or more sense signals. The control circuit may control the resistance $R_{VAR}$ of the sense resistor 324 to adjust the magnitude of the sense signals received while the control circuit is determining the magnitude of the bus voltage $V_{BUS}$ (e.g., as will be explained in greater detail below).

The power bus 340 may be electrically coupled to the motor drive units 330a-330c in a daisy-chain configuration. For example, each motor drive unit 330a-330c may comprise two power connectors (e.g., a power-in connector and a power-out connector) to allow for each daisy-chaining of the motor drive units. Alternatively, each motor drive unit 330a-330c may comprise a single power connector and the daisy-chaining (e.g., connection of power-in and power-out wiring) may occur at the terminals of the single power connector or external to the single power connector (e.g., using a wire-nut with a third wire terminating at the single power connector). These are just various ways of doing daisy-chain wiring. The cable of the power bus 340 may comprise at least two or more electrical wires (e.g., electrical conductors) for distributing the bus voltage $V_{BUS}$ from the power converter circuit 320 to the motor drive units 330a-330c of the DC power distribution system 300. The bus power supply 310 may be configured to adjust (e.g., temporarily adjust) the magnitude of the bus voltage $V_{BUS}$ under certain conditions (e.g., in response to the number of motor drive units 330a-330c that presently need to charge their internal energy storage elements 338a-338c and/or drive their respective motors). The bus power supply 310 may be configured to perform the functions (e.g., any of the example functions as described herein) of a system controller (e.g., the system controller 110). Further, in some examples, the DC power distribution system 300 may comprise a system controller (e.g., the system controller 110).

The bus power supply 310 may have a power capability $P_{CAP}$ (e.g., a limited power capability) that may define a maximum amount of power that the bus power supply 310 may to deliver power over the power bus 340 to the motor drive units 330a-330c. When one of the motor drive units 330a-330c operates its internal load circuit 332a-332c (e.g., the motor), the motor drive unit may consume most (e.g., all) of the power needed to operate the internal load circuit from the power bus 340. If most (e.g., all) of the motor drive units 330a-330c operate their internal load circuits 332a-332c at the same time (e.g., and/or need to recharge their respective internal energy storage elements 338a-338c), the cumulative total of the required power could exceed the power capability $P_{CAP}$ of the power converter circuit 320, which in some instances could cause the bus power supply 310 to become overloaded. When the bus power supply 310 becomes overloaded, the bus power supply 310 could overheat, suffer from a shorter lifetime of the product, reduce the magnitude of the bus voltage $V_{BUS}$, cause the magnitude of the bus voltage $V_{BUS}$ to drift from the desired operating range, etc. Even if the bus power supply 310 does not become overloaded, power could be distributed unevenly amongst the motor drive units 330a-300c. One limitation of existing systems is that a motor drive unit may know how much power it requires, but the motor drive unit may not know how much power all of the other motor drive units require.

The DC power distribution system 300 may include a system controller (e.g., the system controller 110) that operates as a master device that learns a required power (e.g., required power) of each motor drive unit 330a-300c and arbitrates the amount of power that each of the motor drive units 330a-300c may consume at any given time. But the use of a system controller to arbitrate the distribution of power within the system 300 increases overhead, including both the necessary physical components, the increased communication bandwidth, and the necessary computational resources to enable routine communication between the motor drive units 330a-330c and the system controller. For example, significant bandwidth resources may be required if the motor drive units 330a-330c are configured to communicate their required power routinely, such as every one second, using a digital and/or wireless communication technique. Accordingly, the bus power supply 310 and the motor drive units 330a-330c of the DC power distribution system 300 shown in FIG. 3 may be configured to use the power bus 340 to enable each of the motor drive units 330a-330c to communicate a required power $P_{REQ}$, to learn a total required power $P_{TOT}$ of all the motor drive units 330a-330c, to determine an allocated power $P_{ALLOC}$ (e.g., a proportionate amount of the power capability of the bus power supply 310 (e.g., 100 W)) that the motor drive unit 330a-330c can consume at a particular time, and to only consume the allocated power $P_{ALLOC}$ from bus voltage $V_{BUS}$ across the power bus 340.

The bus power supply 310 may operate the first and second controllable switching circuits 322, 326 in a coordinated manner using a periodic cycle having a periodic time period $T_{PBUS}$ (e.g., approximately one second). The bus power supply 310 may provide the bus voltage $V_{BUS}$ on the power bus 340 during an on portion $T_{ON}$ of the periodic time period $T_{PBUS}$. The bus power supply 310 may not provide the bus voltage $V_{BUS}$ on the power bus 340 during an off portion $T_{OFF}$ of the periodic time period $T_{PBUS}$, for example, to allow for the motor drive units 330a-330c to each communicate their required power $P_{REQ}$ to the bus power supply 310 and the other motor drive units in the DC power distribution system 300. The bus power supply 310 may generate the bus voltage $V_{BUS}$ using the power converter circuit 320. The bus power supply 310 may provide the bus voltage $V_{BUS}$ on the power bus 340 by rendering the controllable switching circuit 322 conductive and rendering the controllable switching circuit 326 non-conductive during the on portion $T_{ON}$ of the periodic time period $T_{PBUS}$. When the controllable switching circuit 322 is conductive and the controllable switching circuit 326 is non-conductive and the bus voltage $V_{BUS}$ is provided on the power bus 340, the motor drive units 330a-330c may charge their internal energy storage elements 338a-338c and/or drive their internal load circuits 332a-332c (e.g., motors) from the bus voltage $V_{BUS}$.

The bus power supply 310 may render the controllable switching circuit 322 non-conductive and render the controllable switching circuit 326 conductive off portion $T_{OFF}$ of the periodic time period $T_{PBUS}$, for example, to allow the motor drive units 330a-330c to each communicate (e.g., communicate a required power $P_{REQ}$) on the power bus 340. For example, the bus power supply 310 may render the controllable switching circuit 322 non-conductive and render the controllable switching circuit 326 conductive periodically at the periodic time period $T_{PBUS}$. For example, the on portion $T_{ON}$ may be approximately 995 milliseconds and the off portion $T_{OFF}$ may be approximately 5 milliseconds. It should be appreciated that even though the bus power supply 310 is not providing the bus voltage $V_{BUS}$ on the power bus 340 during the off portion $T_{OFF}$, the bus voltage $V_{BUS}$ may have a non-zero magnitude during the off portion $T_{OFF}$, for example, to allow the motor drive units 330a-330c to communicate the required powers $P_{REQ}$ on the power bus 340. Further, even though the bus power supply 310 is not providing the bus voltage $V_{BUS}$ on the power bus 340 for the off portion $T_{OFF}$ of each time period, the energy storage elements 338a-338c of each motor drive units 330a-330c may each operate as a bus capacitor for holding up an input voltage of the motor drive unit, which for example, could be used to power the respective internal load circuits 332a-332c during the off portion $T_{OFF}$ of each periodic time period $T_{PBUS}$.

When the controllable switching circuit 322 is non-conductive and the controllable switching circuit 326 is conductive (e.g., during the off portion $T_{OFF}$), the motor drive units 330a-330c (e.g., the current sources 334a-334c) may conduct a power-requirement current $I_{PR}$ (e.g., a small current) onto the power bus 340. The magnitude of the power-requirement current $I_{PR}$ may be dependent upon (e.g., proportional to) the required (e.g., requested)) power $P_{REQ}$ of the motor drive unit 330. For example, immediately before or at the beginning of the off portion $T_{OFF}$ of the periodic time period $T_{PBUS}$, each motor drive units 330a-330c may calculate its required power based on, for example, the power requirements of the respective internal load circuit 338a-338c (e.g., whether the motor drive unit is driving its motor, and if so, how much power is required to drive the motor, etc.) and/or whether the respective internal energy storage element 338a-338 needs to be recharged. Then, after the beginning of the off portion $T_{OFF}$ of the periodic time period $T_{PBUS}$, the motor drive units 330a-330c may each output a respective power-requirement current $I_{PRa}, I_{PRb}, I_{PRc}$ onto the power bus 340, where the magnitude of the power-requirement current $I_{PR}$ is dependent upon (e.g., proportional to) the required power $P_{REQ}$ of the motor drive unit. The motor drive units 330a-330c may each control the respective current source 334a-334c to conduct the respective power-requirement current $I_{PRa}$-$I_{PRc}$ onto the power bus 340 during the off portion $T_{OFF}$ of the periodic time period $T_{PBUS}$. The off portion $T_{OFF}$ of the periodic time period $T_{PBUS}$ may also be referred to as a communication period.

When the controllable switching circuit 322 is non-conductive and the controllable switching circuit 326 is conductive (e.g., during the off portion $T_{OFF}$), the motor drive units 330a-330c may each detect the magnitude of the bus voltage $V_{BUS}$ (e.g., which may indicate the magnitude of the power-requirement current $I_{PRa}, I_{PRb}, I_{PRc}$ on the power bus 340), for example, to determine the total required power $P_{TOT}$ of the motor drive units 330a-330c on the power bus. As such, each motor drive unit 330a-330c is aware of its required power $P_{REQ}$ and the total required power $P_{REQ}$ of the motor drive units 330a-330c on the power bus 340. During the next cycle (e.g., the next of the periodic time periods $T_{PBUS}$) when the controllable switching circuit 322 is conductive and the controllable switching circuit 326 is non-conductive (e.g., during the next on portion $T_{ON}$), the motor drive units 330a-330c may each consume its allocated power $P_{ALLOC}$ from the power bus to charge the respective energy storage elements 338a-338c and/or drive their internal load circuits 332a-332c (e.g., motors).

Although described in the context of communicating a required power $P_{REQ}$ across the power bus, in other examples, the motor drive units 330a-330c may communicate a required amount of other resources, such as current, voltage, bandwidth, communication resources, time, etc.

Figure 4A:
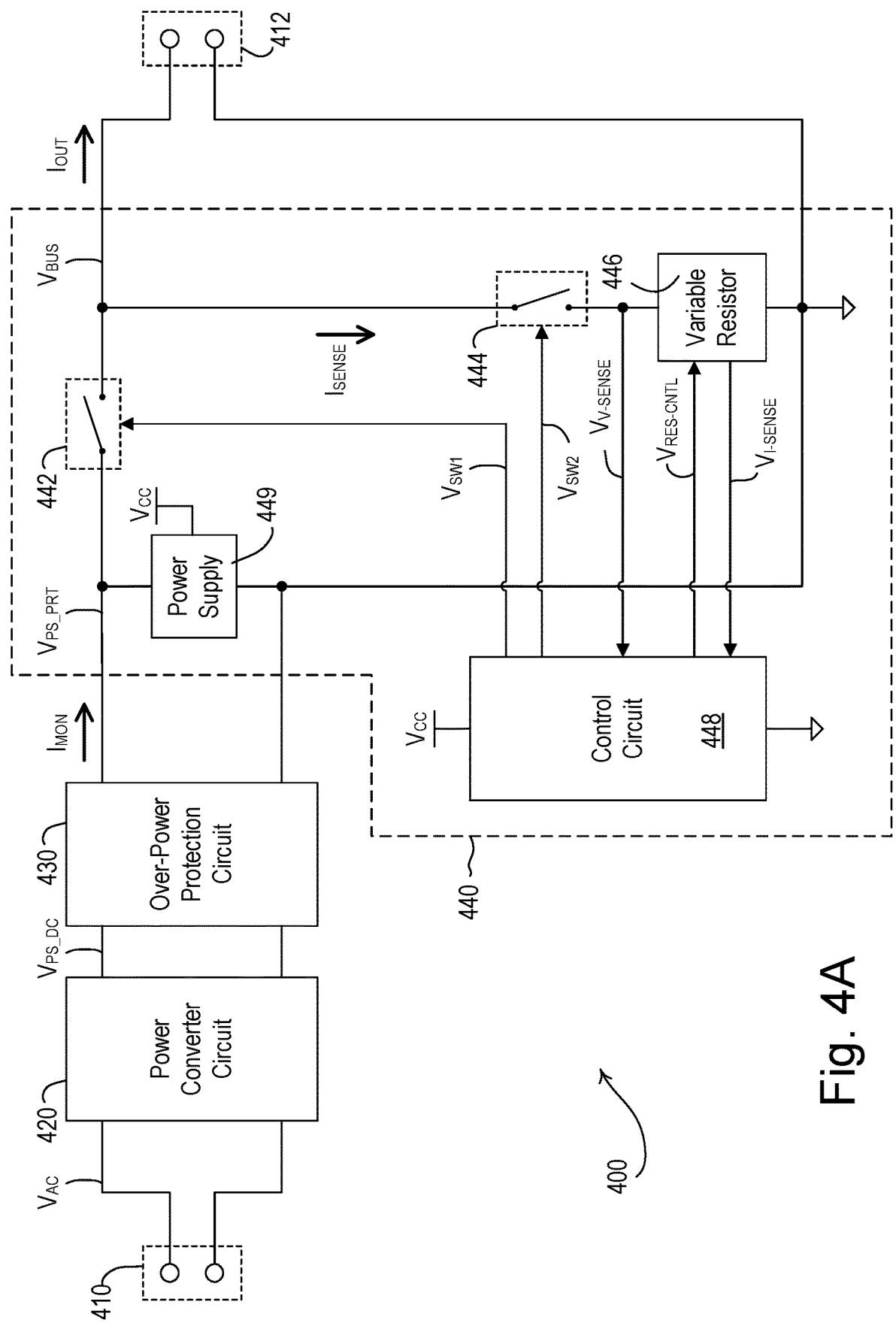
FIG. 4A is a block diagram of an example bus power supply used in a DC power distribution system of a load control system.

FIG. 4A is a block diagram of an example bus power supply 400 (e.g., the bus power supply 290 and/or the bus power supply 310) used in a DC power distribution system of a load control system (e.g., the load control system 100 shown in FIG. 1, the DC power distribution system 300, etc.). The bus power supply 400 (e.g., a Class 2 power supply) may be electrically coupled to one or more of the motor drive units (e.g., the motor drive units 244 and/or the motor drive units 330a-330c) via a power bus (e.g., the power bus 340). For example, the bus power supply 400 may comprise one or more power connectors, such as a power connector 410 (e.g., comprising two power terminals, such as a positive terminal and a negative terminal) for receiving an input voltage from an external power supply (e.g., such as an AC mains line voltage $V_{AC}$ from an AC power source). The bus power supply 400 may also comprise a power connector 412, which may be connected to the power bus that is electrically coupled to one or more motor drive units in a daisy-chain configuration. The bus power supply 400 may be configured to generate a bus voltage $V_{BUS}$, and the power connector 412 may provide the bus voltage $V_{BUS}$ to the power bus. For example, the bus voltage $V_{BUS}$ may have a magnitude that is less than the Class 2 limit of 60 volts (e.g., approximately 50 volts, such as 48 volts). The motor drive units connected to the power bus may conduct an output current $I_{OUT}$ from the bus power supply 400 through the power connector 412.

The bus power supply 400 may include a power converter circuit 420, an over-power protection circuit 430 (e.g., an over-current protection circuit), and a power bus management circuit 440. The power converter circuit 420 may be coupled to the power connector 410 for receiving the input voltage (e.g., the AC mains line voltage $V_{AC}$), and generating a DC power supply voltage $V_{PS\_DC}$. The power converter circuit 420 may be an AC/DC converter or a DC/DC converter, for example, depending on whether the power connector 410 is connected to an AC power source or a DC power source. The DC power supply voltage $V_{PS\_DC}$ may be a relatively constant voltage. For example, the magnitude of the DC power supply voltage $V_{PS\_DC}$ may be approximately 50 volts.

The over-power protection circuit 430 may couple the DC power supply voltage $V_{PS\_DC}$ to the power bus under normal operating conditions and output a protected power supply voltage $V_{PS\_PRT}$ (e.g., also having a DC magnitude). The bus power supply 400 may also disconnect the power converter circuit 420 from the power bus (e.g., disable the bus power supply 400) in response to an output power $P_{OUT}$ of the power converter circuit 420 exceeding a threshold, such as the power capability $P_{CAP}$ of the power converter circuit 420. The over-power protection circuit 430 may determine the output power $P_{OUT}$ of the bus power supply 400 by monitoring a current (e.g., a monitored current $I_{MON}$) conducted through the over-power protection circuit 430 (e.g., since the protected power supply voltage $V_{PS\_PRT}$ has a DC magnitude). The monitored current $I_{MON}$ may be the output current $I_{OUT}$ plus any current consumed by the power bus management circuit 440. The monitored current $I_{MON}$ may be roughly (e.g., nearly) equivalent to the output current $I_{OUT}$. For example, the current consumed by the power bus management circuit 440 may be small (e.g., negligible). Further, in instances where the bus power supply 400 does not include the power bus management circuit 440, the monitored current $I_{MON}$ may be equal to the output current $I_{OUT}$. Accordingly, the output power $P_{OUT}$ of the power supply 400 may be equal to the output current $I_{OUT}$ multiplied times the bus voltage $V_{BUS}$ (e.g., $P_{OUT}=V_{OUT} \cdot I_{OUT}$).

In examples, the over-power protection circuit 430 may have multiple, timed thresholds, where each threshold is associated with a different power threshold and an amount of time (e.g., a different amount of time). In some examples, the over-power protection circuit 430 may be configured to disconnect the power converter circuit 420 from the power bus by rendering a controllable conductive switching circuit non-conductive. Further, the over-power protection circuit 430 may be configured to keep the power converter circuit 420 disconnected from the power bus until, for example, power to the bus power supply 400 is fully cycled by fully removing power from the bus power supply 400 and then restored again (e.g., the bus power supply 400 has been turned both off and back on again).

The over-power protection circuit 430 of the bus power supply 400 may have a nominal power capability (e.g., approximately 85 watts, such as 84 watts). For example, the nominal power capability $P_{CAP-NOM}$ may be characterized by a nominal power threshold $P_{TH-NOM}$ at or below which the bus power supply 400 may supply power indefinitely (e.g., the over-power protection circuit 430 may never disconnect the bus power supply 400 from the power bus when the power converter circuit 420 is operating at or below the nominal power threshold $P_{TH-NOM}$). For example, the bus power supply 400 may continuously supply power to the power bus at or below the nominal power threshold $P_{TH-NOM}$ without interruption and/or disconnection by the over-power protection circuit 430. The nominal power capability $P_{CAP-NOM}$ may correspond to a rated current of the bus power supply 400 (e.g., a rated continuous current of the bus power supply 400). The over-power protection circuit 430 may be configured to prevent the output power $P_{OUT}$ of the bus power supply 400 from indefinitely exceeding the nominal power threshold $P_{TH-NOM}$, for example, by disconnecting the power converter circuit 420 from the power bus.

The over-power protection circuit 430 may allow the bus power supply 400 to operate (e.g., supply power) at one or more increased power capabilities that are greater than the nominal power capability $P_{TH-NOM}$ for up to, but not longer than, respective predetermined increased-power time periods (e.g., a different respective time periods based on the increased power capability). Allowing the bus power supply 400 to operate at one of the increased power capabilities for up to the respective predetermined increased-power time period may allow the bus power supply 400 to cope with peaks in power consumed on the power bus. For example, devices consuming power from the power bus may all consume power simultaneously or at higher levels when high-power demand events are occurring, which may occur, for example, if multiple (e.g., all) of the motor drive units coupled to the power bus drive their motors simultaneously.

The over-power protection circuit 430 may be configured with a plurality of different power capabilities that are greater than the nominal power capability, where each of the plurality of different power capabilities are associated with a different increased-power time period that that the power converter circuit 420 can supply power at or below that increased power capability without tripping the over-power protection circuit 430. For example, the over-power protection circuit 430 may be configured with a first increased power capability that may be characterized by a first increased-power threshold $P_{TH-IP1}$ (e.g., approximately 150 watts, such as 148 watts) and a first increased-power time period $T_{IP1}$ (e.g., approximately 60 minutes) during which the bus power supply 400 may operate at or below the first increased-power threshold $P_{TH-IP1}$ (e.g., and above the nominal power threshold $P_{TH-NOM}$) without tripping. If the output power $P_{OUT}$ of the power converter circuit 420 exceeds the nominal power threshold $P_{TH-NOM}$ (e.g., approximately 85 watts) and remains below the first increased-power threshold $P_{TH-IP1}$ (e.g., approximately 150 watts) for more than the first increased-power time period $T_{IP1}$ (e.g., approximately 60 minutes), the over-power protection circuit 430 may trip and disconnect the power converter circuit 420 from the power bus.

The over-power protection circuit 430 may also be configured with a second increased power capability that may be characterized by second increased-power threshold $P_{TH-IP2}$ (e.g., approximately 240 watts, such as 237 watts) and a second increased-power time period $T_{IP2}$ of time (e.g., approximately two minutes) that the bus power supply 400 can operate at or below the second increased-power threshold $P_{TH-IP2}$ (e.g., and above the first increased-power threshold $P_{TH-IP1}$) without tripping. If the output power $P_{OUT}$ of the power converter circuit 420 exceeds the first increased-power threshold $P_{TH-IP1}$ (e.g., approximately 150 watts) and remains below the second increased-power threshold $P_{TH-IP2}$ (e.g., approximately 240 watts) for more than the second increased-power time period $T_{IP2}$ (e.g., approximately two minutes), the over-power protection circuit 430 may trip and disconnect the power converter circuit 420 from the power bus. Although described with two increased power capabilities, the over-power protection circuit 430 may be configured with more or fewer increased power capabilities.

The over-power protection circuit 430 may be configured to instantaneously (e.g., nearly instantaneously) disconnect the power converter circuit 420 from the power bus when the output power $P_{OUT}$ of the power converter circuit 420 exceeds a maximum power threshold $P_{TH-MAX}$ (e.g., when the magnitude of the monitored current NON exceeds a maximum current threshold I'm-MAX). The over-power protection circuit 430 may determine if the magnitude of the output power $P_{OUT}$ exceeds the maximum power threshold $P_{TH-MAX}$ using, for example, a third increased-power time period $T_{IP3}$ (e.g., less than approximately 200 milliseconds), which may be regarded as nearly instantaneous. For example, the maximum power threshold $P_{TH-MAX}$ may be equal to the increased-power threshold of the highest increased power capability of the over-power protection circuit 430 (e.g., the maximum power threshold $P_{TH-MAX}$ may be equal to the second increased-power threshold $P_{TH-IP2}$). If the output power exceeds the maximum power threshold $P_{TH-MAX}$ (e.g., approximately 240 watts) for more than the third increased-power time period $T_{IP3}$ (e.g., less than approximately 200 milliseconds), the over-power protection circuit 430 may trip and disconnect the power converter circuit 420 from the power bus.

In some examples, the over-power protection circuit 430 may rely on analog circuits alone to disconnect (e.g., instantaneously disconnect and/or disconnect after a period of time) the power converter circuit 420 from the DC power bus. The analog circuits may bypass the need for a microcontroller if the magnitude of the monitored current $I_{MON}$ exceeds one or more of the increased-power thresholds. Bypassing the need for a microcontroller may allow the over-power protection circuit 430 to determine that the magnitude of the monitored current $I_{MON}$ has exceeded one of the increased-power thresholds and disconnect the bus power supply 400 from the DC power supply faster (e.g., instantaneously or nearly instantaneously) than may be achieved with the use of a microcontroller (e.g., digital circuits).

The over-power protection circuit 430 may be configured to determine that the output power $P_{OUT}$ of the power converter circuit 420 exceeds one of the increased-power capability for more than the respective period of time associated with that increased-power capability. For example, the over-power protection circuit 430 may be configured to determine that the magnitude of the monitored current $I_{MON}$ conducted through the over-power protection circuit 430 exceeds a respective current threshold associated with each of the increased-power capabilities for more than the respective increased-power time period associated with that increased-power capability. When the over-power protection circuit 430 determines that the magnitude of the monitored current $I_{MON}$ exceeds the respective current threshold for more than the respective increased-power time period associated with that increased-power capability, the over-power protection circuit 430 may disconnect the power converter circuit 420 from the power bus (e.g., disable the bus power supply 400). In some examples, the over-power protection circuit 430 may maintain the power converter circuit 420 disconnected from the DC power bus until the bus power supply 400 is fully cycled by fully removing power from the bus power supply 400 and then restored again (e.g., the bus power supply 400 has been turned both off and back on again).

The over-power protection circuit 430 may comprise a control circuit such as a microprocessor, a programmable logic device (PLD), a microcontroller, an application specific integrated circuit (ASIC), a field-programmable gate array (FPGA), or any suitable processing device or control circuit. In examples, the over-power protection circuit 430 may comprise a microcontroller and/or analog circuits that are configured to perform determinations, maintain voltage signals, disconnect the bus power supply 400 from the DC power bus, operate as a timer, compare signals, and/or any other functionality within the over-power protection circuit 430.

The power bus management circuit 440 may include a first controllable switching circuit 442 that is coupled between the output of the over-power protection circuit 430 and the second power connector 412. The power bus management circuit 440 may include a second controllable switching circuit 444 between the junction of the first controllable switching circuit 442 and the second power connector 412 and circuit common through a variable resistor 446, where the second controllable switching circuit 444 and the variable resistor 446 are coupled in parallel between the terminals of the second power connector 412.

The power bus management circuit 440 may also include a control circuit 448 for controlling the operation of the power bus management circuit 440. The control circuit 448 may comprise, for example, a microprocessor, a programmable logic device (PLD), a microcontroller, an application specific integrated circuit (ASIC), a field-programmable gate array (FPGA), and/or any suitable processing device or control circuit. The control circuit 448 may be configured to generate a first switch control signal $V_{SW1}$ for rendering the first controllable switching circuit 442 conductive and non-conductive, a second switch control signal $V_{SW2}$ for rending the second controllable switching circuit 444 conductive and non-conductive, and a variable resistor control signal $V_{RES-CNTL}$ for controlling a resistance $R_{VAR}$ of the variable resistor 446. The control circuit 448 may control the operation of the first and second controllable switching circuits 442, 444 in a coordinated or mutually exclusive manner. The control circuit 448 may be configured to control the resistance $R_{VAR}$ of the variable resistor 446 from a minimum resistance $R_{MIN}$ to a nominal resistance $R_{NOM}$ (e.g., a maximum resistance), and/or to intermediate resistances between the minimum resistance $R_{MIN}$ and the nominal resistance $R_{NOM}$.

The control circuit 448 may receive a first power-requirement signal, such as a voltage sense signal $V_{V-SENSE}$, that may have a magnitude that indicate the magnitude of the bus voltage $V_{BUS}$, for example, when the first controllable switching circuit 442 is non-conductive and the second controllable switching circuit 444 is conductive (e.g., during the off portion $T_{OFF}$ of the time period). The control circuit 448 may also receive a second power-requirement signal, such as a current sense signal $V_{I-SENSE}$, that may have a magnitude that indicates the magnitude of a sense current $I_{SENSE}$ conducted through the variable resistor 446 (e.g., and the total current $I_{TOTAL}$ conducted on the power bus), for example, when the first controllable switching circuit 442 is non-conductive and the second controllable switching circuit 444 is conductive (e.g., during the off portion $T_{OFF}$ of the time period).

The control circuit 448 may adjust the resistance $R_{VAR}$ of the variable resistor 446 using the variable resistor control signal $V_{RES-CNTL}$ to, for example, adjust an allocated power $P_{ALLOC}$ determined (e.g., calculated) by each of the motor drive units on the power bus. Further, adjustment of the value of the resistance $R_{VAR}$ of the variable resistor 446 may cause adjustment of the magnitudes of the voltage sense signal $V_{V-SENSE}$ and the current sense signal $V_{I-SENSE}$, for example, when the first controllable switching circuit 442 is non-conductive and the second controllable switching circuit 444 is conductive (e.g., during the off portion $T_{OFF}$ of the time period). Further, in some examples, the control circuit 448 may control the resistance $R_{VAR}$ of the variable resistor 446 to be greater than the resistance on the power bus (e.g., the wire that makes up the power bus), but not so large that it delay the time it takes to discharge the wire capacitance during the off portion $t_{OFF}$ of each periodic time period $T_{PBUS}$. For example, the nominal resistance $R_{NOM}$ of the variable resistor may be 100 ohms. The bus power supply may be configured to provide a high-end amount of power on the power bus for a limited amount of time (e.g., up to 240 watts for two minutes).

The power bus management circuit 440 may further comprise a low-voltage power supply 449 that receives the protected power supply voltage $V_{PS\_PRT}$ and generates a supply voltage $V_{CC}$ (e.g., approximately 3.3 V) for powering the control circuit 448 and other low-voltage circuitry of the bus power supply 400.

Further, in some examples, the power bus management circuit 440 may include a current source that may be coupled to the power bus. For example, rather than adjusting the resistance $R_{VAR}$ of the variable resistor 446, the control circuit 448 may be configured to conduct current into the variable resistor 446 (e.g., during off portions of the periodic time period), for example, to reduce the allocated power $P_{ALLOC}$ determined by the motor drive units coupled to the power bus. For example, by conducting current onto the power bus during the off portions of the periodic time period, the motor drive units will calculate a greater amount of required current on the power bus during the off portion, which will cause them to reduce their proportional allocated amount during the next on portion of the periodic time period.

Figure 4B:
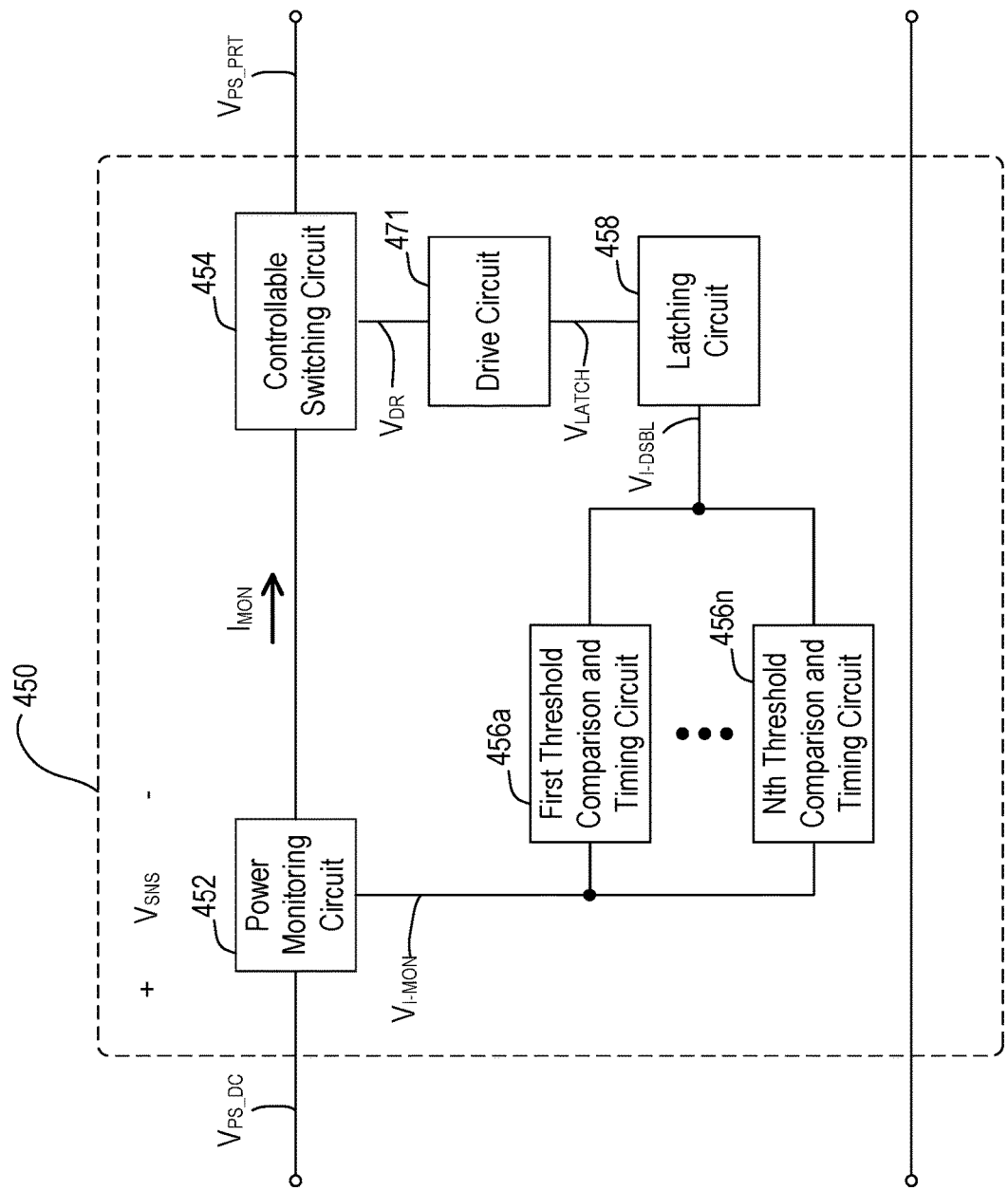
FIG. 4B is a block diagram of an example over-power protection circuit of a bus power supply used in a DC power distribution system of a load control system.

FIG. 4B is a block diagram of an example over-power protection circuit 450 (e.g., the over-power protection circuit 430) of a bus power supply (e.g., the bus power supply 400) used in a DC power distribution system of a load control system. The over-power protection circuit 450 (e.g., over-current protection circuit) may receive an output voltage of a power converter circuit (e.g., the DC power supply voltage $V_{PS\_DC}$ of the power converter circuit 420 of FIG. 4A), and may output a protected power supply voltage (e.g., the protected power supply voltage $V_{PS\_PRT}$ of FIG. 4A). The over-power protection circuit 450 may comprise a power monitoring circuit 452 (e.g., a current monitoring circuit), a controllable switching circuit 454, a latching circuit 458, a drive circuit 471, and a plurality of threshold comparison and timing circuits, such as a first threshold comparison and timing circuit 456a through an Nth threshold comparison and timing circuit 456n.

The power monitoring circuit 452 may be configured to monitor the magnitude of the output power $P_{OUT}$ of the power converter circuit 420. For example, the power monitoring circuit 452 may be configured to monitor the magnitude of the output power $P_{OUT}$ of the power converter circuit 420 by monitoring the magnitude of current flowing through the over-power protection circuit 450 (e.g., the monitored current $I_{MON}$). The power monitoring circuit 452 may receive the DC power supply voltage $V_{PS-DC}$ and may measure the magnitude of a sense voltage $V_{SNS}$ developed in the power monitoring circuit (e.g., across a resistor of the power monitoring circuit) in order to determine the magnitude of the monitored current NON flowing through the resistor. The power monitoring circuit 452 may generate a power monitoring signal, such as a current monitoring signal $V_{I-MON}$, which may have a magnitude that may be proportional to the magnitude of the sense voltage $V_{SNS}$ developed across the resistor of the current monitoring circuit 452 and/or the magnitude of the monitored current $I_{MON}$. As such, the magnitude of the current monitoring signal $V_{I-MON}$ may indicate the magnitude of the monitored current NON.

A plurality of threshold comparison and timing circuits 456a-465n may be associated with a respective power level of the over-power protection circuit 450. The plurality of threshold comparison and timing circuits 456a-465n may receive the current monitoring signal $V_{I-MON}$ and output a respective signal that may be used to render the controllable switching circuit 454 non-conductive when the magnitude of the output power $P_{OUT}$ of the power converter circuit exceeds a respective increased-power threshold for more than a respective increased-power time period associated with the respective increased-power threshold of the over-power protection circuit 450. Since the magnitude of the DC power supply voltage $V_{PS\_DC}$ generated by the power converter circuit (e.g., and the bus voltage $V_{BUS}$) are maintained approximately constant, the plurality of threshold comparison and timing circuits 456a-465n may determine that the magnitude of the output power $P_{OUT}$ of the power converter circuit exceeds the respective increased-power thresholds by determining that the current through the over-power protection circuit 450 (e.g., the magnitude of the monitored current $I_{MON}$) is greater than a respective current threshold for more than the respective increased-power time period associated with the respective increased-power threshold of the over-power protection circuit 450.

Figure 4C:
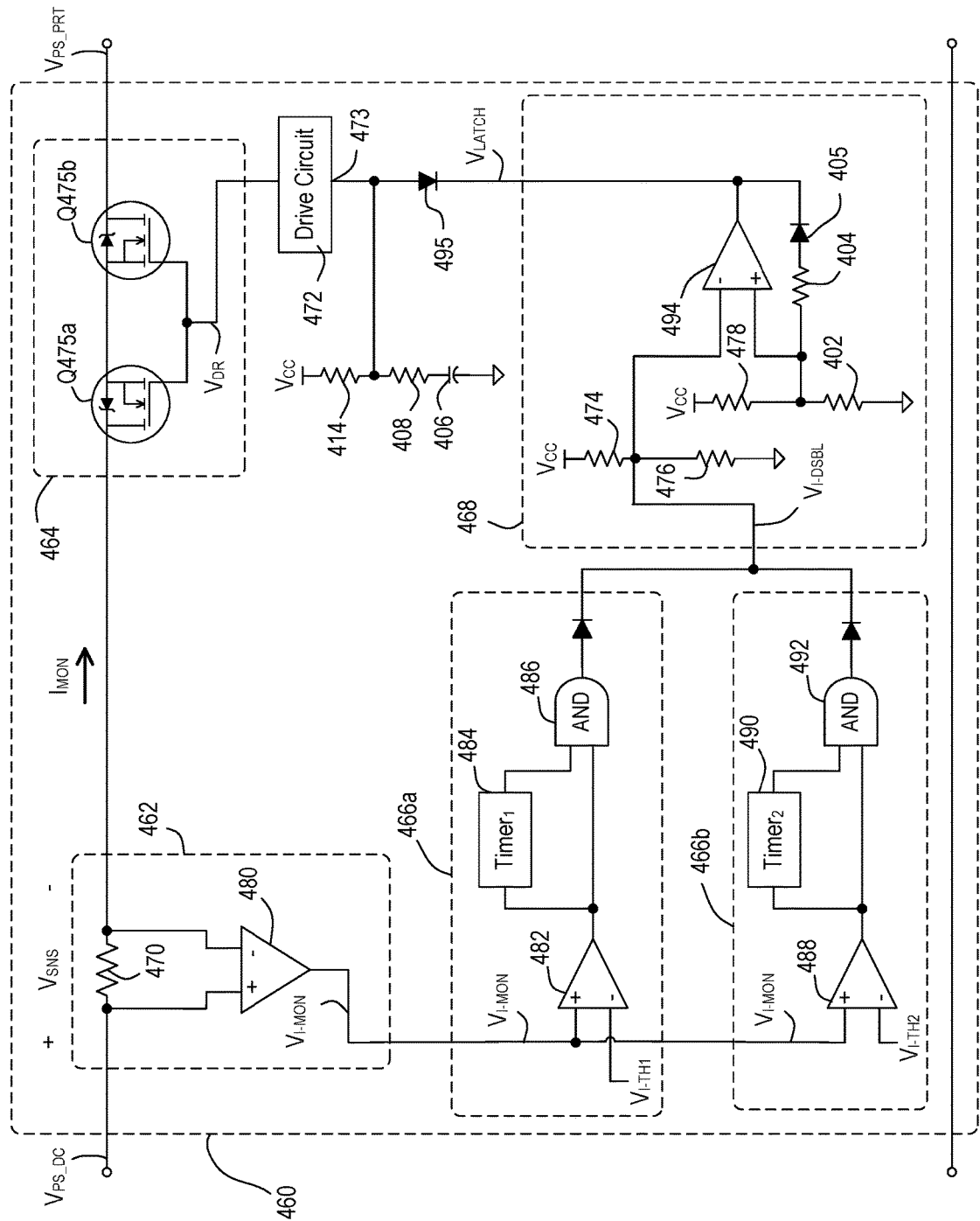
FIG. 4C is a block diagram of an example over-power protection circuit of a bus power supply used in a DC power distribution system of a load control system.
Figure 4D:
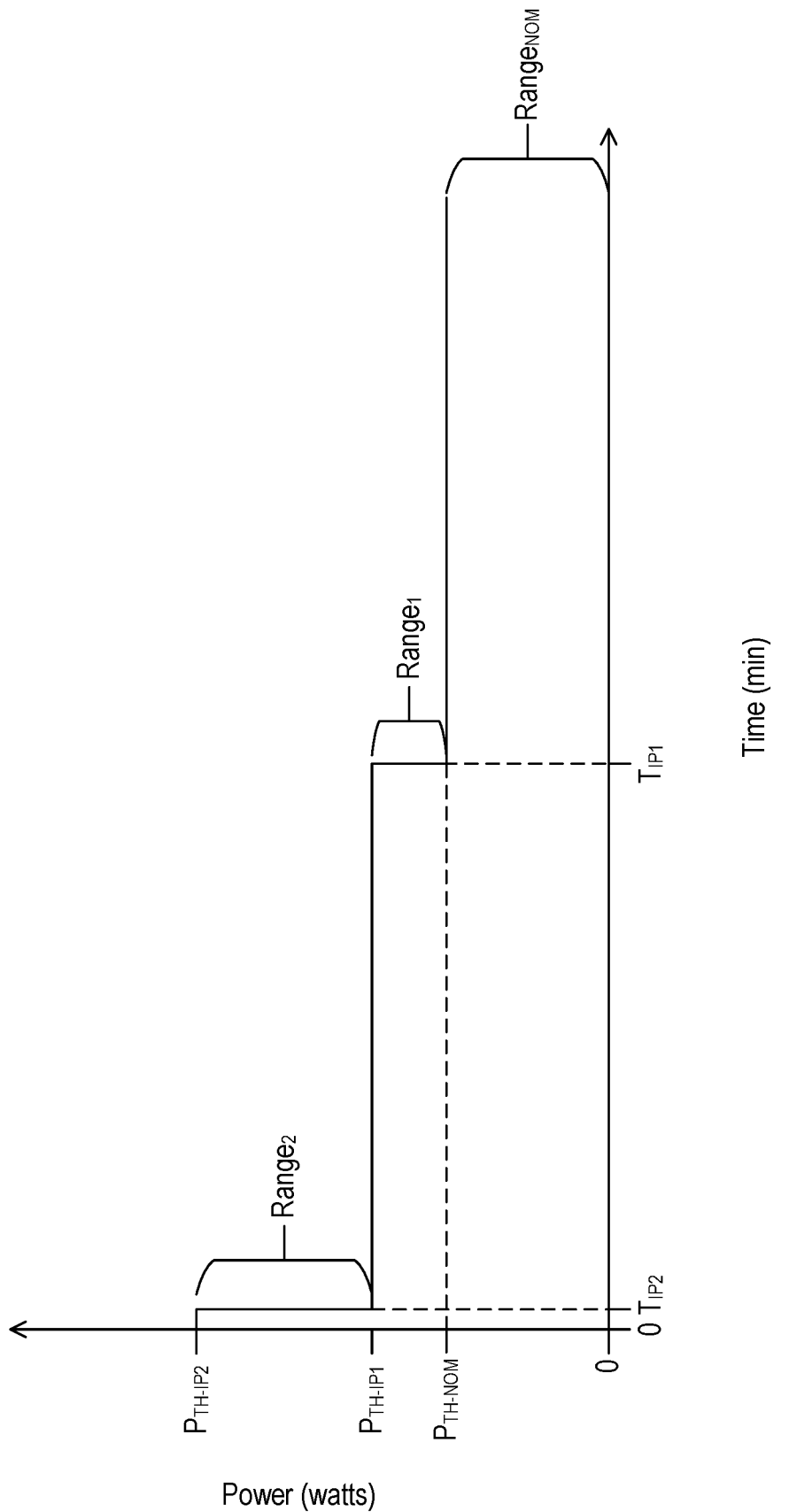
FIG. 4D illustrates an example of increased-power threshold and associated increased-power time periods for an over-power protection circuit.

FIG. 4D illustrates an example of increased-power threshold and associated increased-power time periods for an over-power protection circuit (e.g., the over-power protection circuit 430, the over-power protection circuit 450, the over-power protection circuit 460, etc.). The plurality of threshold comparison and timing circuits 456a-465n may be configured to allow the output power $P_{OUT}$ of the power converter circuit (e.g., as indicated by the magnitude of the monitored current $I_{MON}$) to remain within a nominal power range $Range_{NOM}$ (e.g., at or below a nominal power threshold $P_{TH-NOM}$, such as approximately 85 watts) without rendering the controllable switching circuit 454 non-conductive. The plurality of threshold comparison and timing circuits 456a-465n may be configured to allow the output power $P_{OUT}$ of the power converter circuit (e.g., as indicated by the magnitude of the monitored current $I_{MON}$) to remain within a first power range $Range_S$ (e.g., above the nominal power threshold $P_{TH-NOM}$ and at or below a first increased-power threshold $P_{TH-IP1}$, such as between approximately 84-150 watts) for a first period of time (e.g., the first increased-power time period $T_{IP1}$, such as approximately 60 minutes) without rendering the controllable switching circuit 454 non-conductive. The plurality of threshold comparison and timing circuits 456a-465n may be configured to allow the output power $P_{OUT}$ of the power converter circuit (e.g., as indicated by the magnitude of the monitored current $I_{MON}$) to remain within a second power range $Range_2$ (e.g., above the first increased-power threshold $P_{TH-IP1}$ and at or below a second increased-power threshold $P_{TH-IP2}$, such as between approximately 150-240 watts) for a second period of time (e.g., the second increased-power time period $T_{IP2}$, such as approximately 2 minutes) without rendering the controllable switching circuit 454 non-conductive.

The over-power protection circuit 450 may include a first threshold comparison and timing circuit 456a that may be associated with a first power threshold $P_{TH1}$. For example, the first power threshold $P_{TH1}$ may be equal to the nominal power threshold $P_{TH-NOM}$. Since the magnitude of the DC power supply voltage $V_{PS\_DC}$ of the power converter circuit is approximately constant, the first threshold comparison and timing circuit 456a may use a first current threshold $I_{TH1}$ (e.g., approximately 1.7 amps, such as 1.75 amps) that corresponds to the first power threshold $P_{TH1}$ (e.g., approximately 85 watts, such as 84 watts). The over-power protection circuit 450 may be configured to receive the current monitoring signal $V_{I-MON}$, and compare the magnitude of the current monitoring signal $V_{I-MON}$ with a first voltage threshold $V_{I-TH1}$, which may correspond to the first current threshold $I_{TH1}$. Using the current monitoring signal $V_{I-MON}$, the first threshold comparison and timing circuit 456a may be configured to determine whether the magnitude of the monitored current $I_{MON}$ through the over-power protection circuit 450 is greater than the first current threshold $I_{TH1}$ for the first increased-power time period $T_{IP1}$ (e.g., approximately 60 minutes). For example, the magnitude of the first voltage threshold $V_{I-TH1}$ may be a magnitude that corresponds to the magnitude of the first current threshold $I_{TH1}$.

The over-power protection circuit 450 may include a second threshold comparison and timing circuit that may be associated with a second power threshold $P_{TH2}$. For example, the second power threshold $P_{TH2}$ may be equal to the first increased-power threshold $P_{TH-IP1}$. The second threshold comparison and timing circuit may be characterized by a second current threshold $I_{TH2}$ (e.g., which may correspond to the second power threshold $P_{TH2}$, such as approximately 3 amps, such as 3.08 amps) and the second increased-power time period $T_{IP2}$ (e.g., approximately 2 minutes). The second threshold comparison and timing circuit may be configured to determine that the magnitude of the monitored current $I_{MON}$ through the over-power protection circuit 450 is greater than the second current threshold $I_{TH2}$ (e.g., by determining that the magnitude of the current monitoring signal $V_{I-MON}$ is greater than a second voltage threshold $V_{I-TH2}$) for the second increased-power time period $T_{IP2}$.

Further, in some examples, the over-power protection circuit 450 may include a third threshold comparison and timing circuit that may be associated with an instantaneous power-threshold. For example, the instantaneous power-threshold may be equal to the maximum power threshold $P_{TH-MAX}$. The third threshold comparison and timing circuit may be characterized by a third current threshold $I_{TH2}$ (e.g., which may correspond to the instantaneous power-threshold, such as approximately 4.8 amps, such as 4.94 amps) and a third increased-power time period $T_{IP3}$ (e.g., which may be substantially instantaneous, such as approximately 200 milliseconds). The third threshold comparison and timing circuit may be configured to determine that the magnitude of the monitored current $I_{MON}$ through the over-power protection circuit 450 is greater than the instantaneous power-threshold (e.g., by determining that the magnitude of the current monitoring signal $V_{I-MON}$ is greater than a maximum voltage threshold VT-MAX) for the third increased-power time period $T_{IP3}$.

If any of the first through Nth comparison and timing circuits determines that the magnitude of the monitored current $I_{MON}$ is greater than the respective threshold for the respective period of time, the comparison and timing circuit will control the disable signal $V_{I-DSBL}$, which may be used to render the controllable switching circuit 454 non-conductive. Further, although described with reference to three threshold comparison and timing circuits, the over-power protection circuit 450 may include a plurality of threshold comparison and timing circuits 456a-456n, where each threshold comparison and timing circuit may be associated with a respective nominal or increased-power threshold and may be configured with a respective current threshold and/or time period.

The latching circuit 458 may receive the disable signal $V_{I-DSBL}$, which may be controlled by any of the comparison and timing circuits, and, in response, the latching circuit 458 generate a latch signal $V_{LATCH}$. The drive circuit 471 may be configured to receive the latch signal $V_{LATCH}$ from the latching circuit 458, and in response, generate a drive signal $V_{DR}$ for controlling the controllable switching circuit 454. For example, the drive circuit 471 may render the controllable switching circuit 454 non-conductive in response to receiving the latch signal $V_{LATCH}$, which in turn may disconnect the power converter circuit 420 from the power bus. As such, if any of the first through Nth comparison and timing circuits determines that the magnitude of the monitored current $I_{MON}$ is greater than the respective current threshold for the respective time period, the controllable switching circuit 454 may be rendered non-conductive to disconnect the power converter circuit 420 from the power bus.

When the controllable switching circuit 454 disconnects the power converter circuit 420 from the power bus, the latching circuit 458 may be configured to maintain controllable switching circuit 454 non-conductive to keep the power converter circuit 420 disconnected from the power bus. That is, the latching circuit 458 may maintain the power converter circuit 420 in a state disconnected from the power bus until power to the bus power supply 400 is fully cycled by fully removing power from the bus power supply 400 and then restored again (e.g., the bus power supply 400 has been turned both off and back on again). Alternatively or additionally, the latching circuit 458 may reset (e.g., render the controllable switching circuit 454 conductive) after a timeout period (e.g., without the need of the bus power supply 400 to turn off and back on again).

FIG. 4C is a block diagram of an example over-power protection circuit 460 (e.g., the over-power protection circuit 430 of FIG. 4A and/or the over-power protection circuit 450 of FIG. 4B) of a bus power supply (e.g., the bus power supply 400) used in a DC power distribution system of a load control system (e.g., the DC power distribution system 300). The over-power protection circuit 460 may comprise a power monitoring circuit, such as a current monitoring circuit 462 (e.g., the current monitoring circuit 452), a first threshold comparison and timing circuit 466a (e.g., the first threshold comparison and timing circuit 456a), a second threshold comparison and timing circuit 466n (e.g., one of the additional threshold comparison and timing circuits of the over-power protection circuit 450), a latching circuit 468 (e.g., the latching circuit 458), a drive circuit 473 (e.g., the drive circuit 471), and a controllable switching circuit 464 (e.g., the controllable switching circuit 454).

The current monitoring circuit 462 may comprise a resistor 470 (e.g., a sense resistor) and an amplifier 480. The resistor 470 of the current monitoring circuit 462 may be coupled in series with the controllable switching circuit 464 and may conduct a monitored current $I_{MON}$ through the over-power protection circuit 460. The current monitoring circuit 462 may be configured to receive the DC power supply voltage $V_{PS\_DC}$ from a power converter circuit of the bus power supply (e.g., the power converter circuit 420), the controllable switching circuit 464 may be configured to produce the protected power supply voltage $V_{PS\_PRT}$.

The controllable switching circuit 464 may comprise a pair of field-effect transistors (FETs) Q475a and Q475b (e.g., arranged in an anti-series configuration). The gates of the FETs Q475a and Q475b may receive a drive signal $V_{DR}$ from the drive circuit 472 for rendering the FETs Q475a and Q475b conductive and non-conductive. The controllable switching circuit 464 may receive the drive signal $V_{DR}$, and be configured to be rendered non-conductive when the drive signal $V_{DR}$ is low and to be rendered conductive when the drive signal $V_{DR}$ is high.

The drive circuit 472 may comprise an input 473 that may be pulled high towards a supply voltage $V_{CC}$ (e.g., through a resistor 414) to render the FETs Q475a and Q475b conductive. The input 473 of the drive circuit 472 may also be coupled to circuit common through the series combination of a resistor 408 and a capacitor 406. For example, when the bus power supply is powered up and a low-voltage power supply (e.g., the low-voltage power supply 449) begins to generate the supply voltage $V_{CC}$, the voltage at the input 473 of the drive circuit 472 may begin to rise with respect to time. When the magnitude of the voltage at the input 473 exceeds a turn-on voltage of the drive circuit 472 (e.g., approximately 1.6-2 volts), the drive circuit 472 may render the FETs Q475a and Q475b conductive. The resistor-capacitor (RC) circuit formed by the resistors 408, 414 and the capacitor 406 may provide some delay between when the bus power supply first receives power and when the controllable switching circuit 464 is rendered conductive (e.g., to allow the circuitry of the bus power supply to be powered up before the controllable switching circuit 464 is rendered conductive). The FETs Q475a and Q475b may be maintained in the conductive state while the magnitude of the voltage at the input 473 of the drive circuit 472 is maintained above approximately the turn-on voltage.

The current monitoring circuit 462 may be configured to monitor (e.g., measure) the magnitude of the monitored current $I_{MON}$ conducted through the current monitoring circuit 462 and the controllable switching circuit 464. The amplifier 480 of the current monitoring circuit 462 may be configured to receive a sense voltage $V_{SNS}$ developed across the resistor 470. The amplifier 480 may output a current monitoring signal $V_{I\text{-}MON}$ corresponding to the magnitude of the sense voltage $V_{SNS}$. For example, the magnitude of the current monitoring signal $V_{I\text{-}MON}$ may be proportional (e.g., substantially proportional) to the magnitude of the sense voltage $V_{SNS}$ and thus the magnitude of the monitored current $I_{MON}$.

The first threshold comparison and timing circuit 466a may comprise a timer 484, a comparator 482, and a logic AND gate 486. The first threshold comparison and timing circuit 466a may be configured to allow the over-power protection circuit 460 to operate with a first power range Range₁ (e.g., between approximately 85 watts and 150 watts) for a first period of time (e.g., approximately 60 minutes). The comparator 482 may be configured to receive the current monitoring signal $V_{I\text{-}MON}$ (e.g., at the positive input) and a first voltage threshold $V_{I\text{-}TH1}$ (e.g., at a negative input). The first voltage threshold $V_{I\text{-}TH1}$ may correspond to a first current threshold $I_{TH1}$ (e.g., approximately 1.7 amps) and/or the first power threshold Rim (e.g., approximately 85 watts). In some examples, the first power threshold $P_{TH1}$ may correspond to the nominal power threshold $P_{TH\text{-}NOM}$.

The comparator 482 may be configured to compare the magnitude of the current monitoring signal $V_{I\text{-}MON}$ to the first voltage threshold $V_{I\text{-}TH1}$ to determine whether the output power $P_{OUT}$ of the power converter circuit is greater than the first power threshold $P_{TH1}$. The comparator 482 may drive its output low if the magnitude of the current monitoring signal $V_{I\text{-}MON}$ is lower than the first voltage threshold $V_{I\text{-}TH1}$ (e.g., the output power $P_{OUT}$ of the power converter circuit is less than or equal to the nominal power threshold $P_{TH\text{-}NOM}$), and drive its output high if the magnitude of the current monitoring signal $V_{I\text{-}MON}$ is higher than the first voltage threshold $V_{I\text{-}TH1}$ (e.g., the output power $P_{OUT}$ of the power converter circuit is greater than the nominal power threshold $P_{TH\text{-}NOM}$).

The timer 484 may be configured to start and run for a first time period when the output of the comparator 482 is driven high (e.g., when the magnitude of the current monitoring signal $V_{I\text{-}MON}$ is higher than the first voltage threshold $V_{I\text{-}TH1}$, signifying that the magnitude of the monitored current $I_{MON}$ is above the first current threshold $I_{TH1}$). The timer 484 may continue running as long as the output of the comparator 482 is driven high (e.g., for as long as the magnitude of the monitored current $I_{MON}$ is above the first current threshold $I_{TH1}$). While the magnitude of the monitored current $I_{MON}$ remains above the first current threshold $I_{TH1}$, the timer 484 may be configured to drive its output low until the timer 484 reaches the expiration of the first time period. If the magnitude of the monitored current $I_{MON}$ drops below the first current threshold $I_{TH1}$, the output of the comparator 482 may be driven low and the timer 484 may stop and reset to zero. If the timer 484 reaches the expiration of the first time period while the magnitude of the monitored current $I_{MON}$ has remained above the first current threshold $I_{TH1}$, the timer 484 may be configured to drive its output high.

The logic AND gate 486 may receive the outputs of the comparator 482 and the timer 484. When either of the output of the comparator 482 or the output of the timer 484 is driven low, the logic AND gate 486 may drive its output low. When both of the outputs of the comparator 482 and the timer 484 are driven high (e.g., signifying the magnitude of the monitored current $I_{MON}$ has remained above the first current threshold $I_{TH1}$ for the first period of time), the logic AND gate 486 may drive its output high to control the disable signal $V_{I\text{-}DSBL}$.

The second threshold comparison and timing circuit 466b may comprise a timer 490, a comparator 488, and a logic AND gate 492. The second threshold comparison and timing circuit 466b may be configured to allow the over-power protection circuit 460 to operate within a second power range $Range_2$ (e.g., between approximately 150 watts and 240 watts) for a second period of time (e.g., approximately 2 minutes). The comparator 488 may be configured to receive the current monitoring signal $V_{I\text{-}MON}$ (e.g., at the positive input) and a second voltage threshold $V_{I\text{-}TH2}$ (e.g., at a negative input). The second voltage threshold $V_{I\text{-}TH2}$ may correspond to a second current threshold $I_{TH2}$ (e.g., approximately 3 amps) and/or the second power threshold $P_{TH2}$ (e.g., 150 watts).

The comparator 488 may be configured to compare the magnitude of the current monitoring signal $V_{I\text{-}MON}$ to the second voltage threshold $V_{I\text{-}TH2}$ to determine whether the output power $P_{OUT}$ of the power converter circuit is greater than the second power threshold $P_{TH2}$. The comparator 488 may drive its output low if the magnitude of the current monitoring signal $V_{I\text{-}MON}$ is lower than the second voltage threshold $V_{I\text{-}TH2}$ (e.g., the output power $P_{OUT}$ of the power converter circuit is less than the second power threshold $P_{TH2}$), and drive its output high if the magnitude of the current monitoring signal $V_{I\text{-}MON}$ is higher than the second voltage threshold $V_{I\text{-}TH2}$ (e.g., the output power $P_{OUT}$ of the power converter circuit is greater than the second power threshold $P_{TH2}$).

The timer 490 may be configured to start and run for a second time period when the output of the comparator 488 is driven high (e.g., when the magnitude of the current monitoring signal $V_{I\text{-}MON}$ is higher than the second voltage threshold $V_{I\text{-}TH2}$, signifying that the magnitude of the monitored current $I_{MON}$ is above the second current threshold $I_{TH2}$). The second time period may be shorter than the first period of time. The timer 490 may continue running as long as the output of the comparator 488 is driven high (e.g., for as long as the magnitude of the monitored current $I_{MON}$ is above the second current threshold $I_{TH2}$). While the magnitude of the monitored current $I_{MON}$ remains above the second current threshold $I_{TH2}$, the timer 490 may be configured to drive its output low until the timer 490 reaches the expiration of the second time period. If the magnitude of the monitored current $I_{MON}$ drops below the second current threshold $I_{TH2}$, the output of the comparator 488 may be driven low and the timer 490 may stop and reset to zero. If the timer 490 reaches the expiration of the second time period while the magnitude of the monitored current $I_{MON}$ has remained above the second current threshold $I_{TH2}$, the timer 490 may be configured to drive its output high.

The logic AND gate 492 may receive the outputs of the comparator 488 and the timer 490. When either of the output of the comparator 488 or the output of the timer 490 is driven low, the logic AND gate 492 may drive its output low. When both of the outputs of the comparator 488 and the timer 490 are driven high (e.g., signifying the magnitude of the monitored current $I_{MON}$ has remained above the second current threshold $I_{TH2}$ for the second period of time), the logic AND gate 492 may drive its output high to control the disable signal $V_{I\text{-}DSBL}$.

Although described with two threshold comparison and timing circuits 466a, 466b, the over-power protection circuit 460 may comprise any number of threshold comparison and timing circuits (e.g., each with a different power threshold and time period). For example, the over-power protection circuit 460 may include a threshold comparison and timing circuit 466c that is configured to output the disable signal $V_{I\text{-}DSBL}$ when the current monitoring signal $V_{I\text{-}MON}$ exceeds a third voltage threshold $V_{I\text{-}TH3}$ for a third time period (e.g., approximately 200 milliseconds). The third voltage threshold $V_{I\text{-}TH3}$ may correspond to a third current threshold $I_{TH2}$ (e.g., approximately 4.8 amps) and/or the maximum power threshold $P_{TH\text{-}MAX}$ (e.g., 240 watts). As such, the over-power protection circuit 460 may be configured to instantaneously (e.g., nearly instantaneously) disconnect from the power bus when the output power $P_{OUT}$ exceeds the maximum power threshold $P_{TH\text{-}MAX}$.

An effect of the second period of time being shorter than the first period of time may be, for example, that if the first current threshold $I_{TH1}$ and second current threshold $I_{TH2}$ (e.g., or any other threshold) are both exceeded for the duration of the second timer, then the second timer 490 will expire before the first timer 484 and trip the over-power protection circuit 460. In other words, if two current thresholds are exceeded simultaneously for the same duration, the shorter time period (e.g., of the higher threshold) will be the one to cause the over-power protection circuit 460 to disconnect the power converter circuit from the power bus.

As noted above, in some examples, the bus power supply may be configured to adjust (e.g., temporarily adjust) the magnitude of the bus voltage $V_{BUS}$ under certain conditions (e.g., in response to the number of motor drive units that presently need to charge their internal energy storage elements and/or drive their respective motors). If the bus power supply adjusts the magnitude of the bus voltage $V_{BUS}$, the bus power supply may adjust the magnitude of the current thresholds (e.g., as dictated by the first and second voltage thresholds $V_{I\text{-}TH1}$, $V_{I\text{-}TH2}$), for example, to keep the power thresholds at the same level.

The latching circuit 468 may comprise a comparator 494, resistors 474, 476, 478, 402, 404, and a diode 405. The latching circuit 468 may be configured to receive the disable signal $V_{I\text{-}DSBL}$, which may be coupled to a negative input of the comparator 494. The latching circuit 486 may comprise a first voltage divider including the resistors 474, 476, and a second voltage divider including the resistors 478, 402. The junction of the resistors 474, 476 of the first voltage divider may be coupled to the negative input of the comparator 494, and the junction of the resistors 478, 402 may be coupled to the positive input of the comparator 494. The resistors 474, 476, 478, 402 may be sized such that the magnitude of the voltage at the positive input of the comparator 494 is greater than the magnitude of the voltage at the negative input of the comparator (e.g., without influence from the threshold comparison and timing circuits 466a, 466b). Thus, when the magnitude of the disable signal $V_{I\text{-}DSBL}$ is low (e.g., if the magnitude of the monitored current $I_{MON}$ has not exceeded a current threshold for the respective time period), the comparator 494 may drive its output high. When the disable signal $V_{I\text{-}DSBL}$ is driven high (e.g., if the magnitude of the monitored current $I_{MON}$ has exceeded a current threshold for the respective time period), the comparator 494 may drive its output low and thus the latch signal $V_{LATCH}$ low.

The resistor 404 and the diode 405 may be coupled in series between the positive input and the output of the comparator 494. When the output of the comparator 494 is driven low, the positive input of the comparator 494 may be pulled low through the resistor 404 and the diode 405, such that the disable signal $V_{I\text{-}DSBL}$ cannot cause the output of the comparator 494 to be driven high again. In other words, once the disable signal $V_{I\text{-}DSBL}$ has been driven high, the output of the comparator 494 may maintain the latch signal $V_{LATCH}$ (e.g., latch to) a low level.

The drive circuit 472 may receive the latch signal $V_{LATCH}$ from the latching circuit 468 through a diode 495 and may control the drive signal $V_{DR}$ in accordance with the latch signal $V_{LATCH}$. For example, if the latch signal $V_{LATCH}$ is high, the drive circuit 472 may control the drive signal $V_{DR}$ to render the controllable switching circuit 464 conductive. When the latch signal $V_{LATCH}$ is driven low, the input 473 of the drive circuit 472 may be pulled low through the diode 495 (e.g., below the turn-on voltage of the drive circuit) to cause the drive circuit 472 to control the drive signal $V_{DR}$ to render the controllable switching circuit 464 non-conductive. As such, if any of the threshold comparison and timing circuits 466a, 466b drive the disable signal $V_{I\text{-}DSBL}$ high (e.g., if the magnitude of the monitored current $I_{MON}$ has exceeded a current threshold for a respective time period), the latching circuit 458 may drive the latch signal $V_{LATCH}$ low, which may cause the drive circuit 472 to render the controllable switching circuit 464 non-conductive. For example, drive circuit 472 may render the FETs Q475a and Q475b non-conductive to disconnect the power converter circuit from the power bus when the power converter circuit has exceeded a current threshold for a respective time period.

In addition, the drive circuit 472 may be configured with a maximum current threshold $I_{TH\text{-}MAX}$ for rendering the controllable switching circuit 464 non-conductive in response to a very large current conducted through the over-power protection circuit 460. For example, the drive circuit 472 may also receive the current monitoring signal $V_{I\text{-}MON}$ for determining the magnitude of the monitoring current $I_{MON}$. If the magnitude of the monitored current NON exceeds the maximum current threshold $I_{TH\text{-}MAX}$ (e.g., which corresponds to the maximum power threshold $P_{TH\text{-}MAX}$), the drive circuit 472 may be configured to render the FETs Q475a and Q475b to disconnect the power converter circuit 420 from the power bus nearly instantaneously (e.g., in less than 200 milliseconds).

Figure 5:
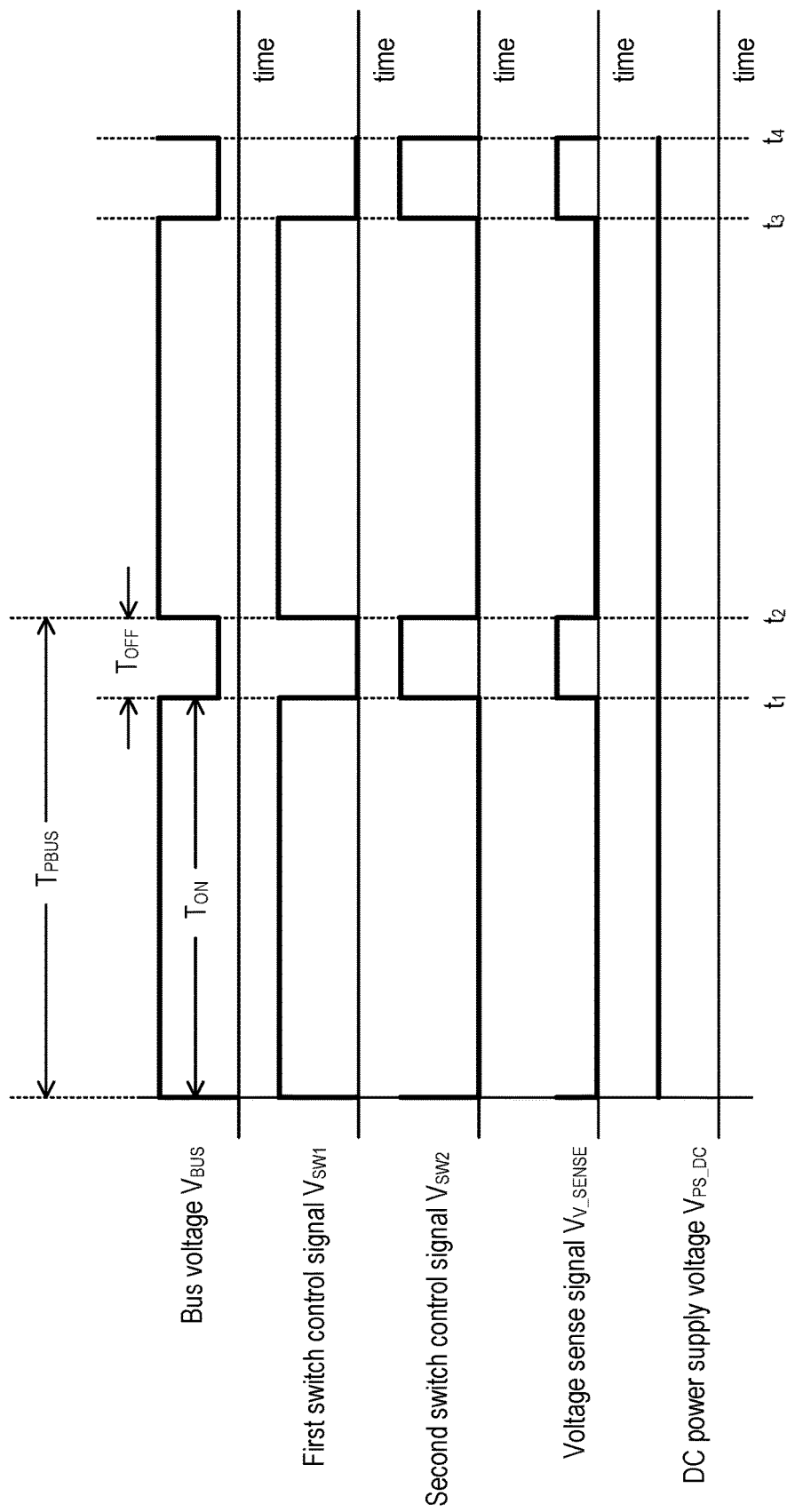
FIG. 5 shows examples of waveforms that illustrate an operation of a bus power supply that is connected to a power bus in a DC power distribution system.

FIG. 5 shows examples of waveforms that illustrate an operation of a bus power supply (e.g., the bus power supply 400) that is connected to a power bus (e.g., a DC power bus) in a DC power distribution system (e.g., the DC power distribution system 300). Although described with reference to the bus power supply 400, the waveforms may be applicable to any of the DC power supplies described herein (e.g., the bus power supply 290, the bus power supply 310, and/or the bus power supply 400).

The bus power supply 400 may operate the first and second controllable switching circuits 442, 444 in a coordinated manner to generate the bus voltage $V_{BUS}$ on the power bus and to allow for the motor drive units to communicate their required power to the other motor drive units in the DC power distribution system. The control circuit 448 may operate the first and second controllable switching circuits 442, 444 periodically (e.g., every one second). For example, the control circuit 448 may render the first controllable switching circuit 442 conductive and render the second controllable switching circuit 444 non-conductive for an on portion $T_{ON}$ (e.g., approximately 995 milliseconds) of each of the periodic time periods $T_{PBUS}$, and render the first controllable switching circuit 442 non-conductive and render the second controllable switching circuit 444 conductive for an off portion $T_{OFF}$ (e.g., approximately five milliseconds) of each of the periodic time periods $T_{PBUS}$. Accordingly, the bus power supply 400 may provide the bus voltage $V_{BUS}$ on the power bus during the on portion $T_{ON}$, and may stop providing the bus voltage $V_{BUS}$ on the power bus during the off portion $T_{OFF}$. However, it should be appreciated that the power converter circuit 420 is configured to generate the DC power supply voltage $V_{PS\_DC}$ regardless of state of the first controllable switching circuit 442.

Referring to FIG. 5, the control circuit 448 may render the first controllable switching circuit 442 non-conductive and render the second controllable switching circuit 444 conductive at the beginning of the off portion $T_{OFF}$ of each of the periodic time periods $T_{PBUS}$, for example, at time $t_1$. While the first controllable switching circuit 442 is non-conductive and the second controllable switching circuit 444 is conductive, the motor drive units may communicate their required power onto the power bus. For example, during the off portion $T_{OFF}$ of the each of the periodic time periods $T_{PBUS}$, the motor drive units may conduct a power-requirement current $I_{PR}$ (e.g., a small current) onto the power bus. The magnitude of the power-requirement current $I_{PR}$ is dependent upon (e.g., proportional to) the required power $P_{REQ}$ of the motor drive unit. Accordingly, the magnitude of the bus voltage $V_{BUS}$ during the off portion $T_{OFF}$ of each of the periodic time periods $T_{PBUS}$ may be dependent upon (e.g., proportional to) the total required power $P_{TOT}$ of the motor drive units of the DC power distribution system. Further, the control circuit 448 may receive the voltage sense signal $V_{V\text{-}SENSE}$ that indicates the magnitude of the bus voltage $V_{BUS}$ and/or the current sense signal $V_{I\text{-}SENSE}$ that indicates the magnitude of the sense current $I_{SENSE}$ conducted through the variable resistor 446 (e.g., and the current conducted through the power bus). Accordingly, the control circuit 448 may determine the total required power $P_{TOT}$ of all the motor drive units of the DC power distribution system to be used in the next subsequent periodic time period $T_{PBUS}$.

At time t2, which is the end of the off portion $T_{OFF}$ of the periodic time period $T_{PBUS}$ (e.g., the beginning of the on portion $T_{ON}$), the control circuit 448 may render the first controllable switching circuit 442 conductive and render the second controllable switching circuit 444 non-conductive. While the first controllable switching circuit 442 is conductive and the second controllable switching circuit 444 is non-conductive, the power converter circuit 420 may generate the DC power supply voltage $V_{PS\_DC}$ to enable the bus power supply 400 to provide the bus voltage $V_{BUS}$ on the power bus, and the motor drive units may charge their internal energy storage elements and/or drive their internal load circuits (e.g., motors) from the bus voltage $V_{BUS}$. Further, during the on portion $T_{ON}$ of the periodic time period $T_{PBUS}$, the motor drive units may consume their allocated power $P_{ALLOC}$ from the power bus to charge their internal energy storage elements and/or drive their internal load circuits (e.g., motors).

In some examples, the nominal power capability $P_{CAP\text{-}NOM}$ of the bus power supply 400 and/or the nominal resistance $R_{NOM}$ (e.g., the maximum resistance) of the variable resistor 446 may be known by the bus power supply 400 and/or the motor drive units. During the off portion $T_{OFF}$, each motor drive unit may control its current source to conduct the respective power-requirement current $I_{PR}$ onto the power bus, which may result in change in the magnitude of the bus voltage $V_{BUS}$ that is equal to a bus voltage contribution $V_{BUS}$ ONE DRIVE on the power bus (e.g., as at least a portion of the magnitude of the bus voltage $V_{BUS}$). For example, the magnitude of the bus voltage contribution $V_{BUS}$ ONE DRIVE may be equal to the magnitude of the power-requirement current $I_{PR}$ from the current source (e.g., the current sources 334a-334c) of the motor drive unit multiplied by the resistance $R_{VAR}$ of the variable resistor 446. The magnitude of the bus voltage $V_{BUS}$ during the off portion $T_{OFF}$ may be equal to the sum of the power-requirement currents $I_{PR}$ of the current sources of the motor drive units 330a-330c multiplied by the resistance $R_{VAR}$ of the variable resistor 446. Thus, each motor drive unit may use the magnitude of the power-requirement current $I_{PR}$ (e.g., which may be proportional to its required power $P_{REQ}$), and the magnitude of the bus voltage $V_{BUS}$ (e.g., which may be proportional to the total required power $P_{REQ-TOT}$ of motor drive units) to calculate a proportional amount $K_P$ of the nominal power capability $P_{CAP-NOM}$ of the bus power supply 400 that could be consumed (e.g., $K_P$=required power/total required power). The motor drive units may each determine an allocated power $P_{ALLOC}$ that it is allowed (e.g., allocated) to consume from the power bus as the proportional amount $K_P$ multiplied by the nominal power capability $P_{CAP-NOM}$ of the bus power supply 400.

In some examples, the bus power supply 400 may control the resistance $R_{VAR}$ of the variable resistor 446 to adjust the allocated power $P_{ALLOC}$ calculated by each of the motor drive units on the power bus. For example, the control circuit 448 may make it appear to each motor drive unit as if the cumulative total power required (e.g., requested) by all the motor drive units is more than (e.g., or less than) the actual total power required by all the motor drive units. Since each motor drive unit is configured to only consume their proportional amount of the total required power, the control circuit 448 may adjust the resistance $R_{VAR}$ of the variable resistor 446 to adjust the magnitude of the cumulative total required power to make it appear the total cumulative required power of all of the motor drive units has increased (e.g., or decreased). Accordingly, the control circuit 448 may cause each motor drive unit to consume less (e.g., or more) power during the next on portion $T_{ON}$. For example, if the resistance $R_{VAR}$ of the variable resistor 446 is increased, then the total cumulative required power of all of the motor drive units will appear to the motor drive units to have to larger, which may cause the allocated power $P_{ALLOC}$ of each motor drive unit to decrease.

In some examples, it may be desirable for the bus power supply 400 to adjust the power capability of the bus power supply 400 that is available to all of the motor drive units above the nominal power capability $P_{CAP-NOM}$. Alternatively or additionally, the bus power supply 400 may be configured with one or more increased-power capabilities, and the bus power supply 400 may be configured to cause the motor drive units to consume less power from the power bus, for example, when the output power $P_{OUT}$ of the bus power supply 400 is exceeding an increased-power capability for a period of time (e.g., a period of time that is less that the time period associated with that increased-power capability, such as a time before the bus power supply 400 renders the controllable switching circuit 454 non-conductive).

Figure 6:
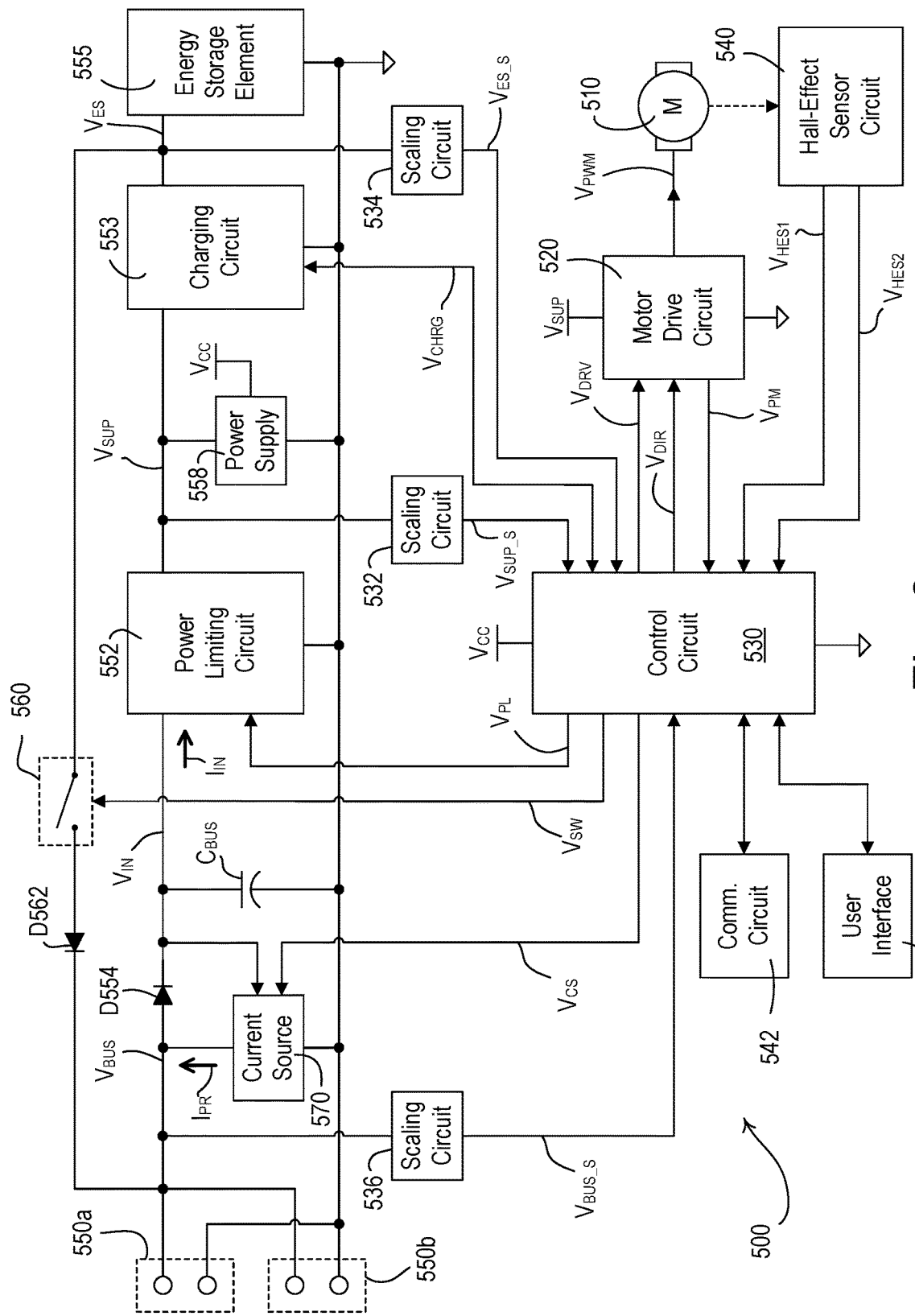
FIG. 6 is a block diagram of an example motor drive unit of a motorized window treatment.

FIG. 6 is a block diagram of an example motor drive unit 500 of a motorized window treatment (e.g., one of the motor drive units 144 of the motorized roller shades 140 of FIG. 1 and/or one of the motor drive units 244 of the motorized window treatments 240 of FIGS. 2A-2C and/or one of the motor drive units 330 of FIG. 3). The motor drive unit 500 may comprise a motor 510 (e.g., a DC motor) that may be coupled (e.g., mechanically) for raising and lowering a covering material. For example, the motor 510 may be coupled to a roller tube of the motorized window treatment for rotating the roller tube for raising and lowering a covering material (e.g., a flexible material, such as a shade fabric). The motor drive unit 500 may comprise a load circuit, such as a motor drive circuit 520 (e.g., an H-bridge drive circuit) that may generate a pulse-width modulated (PWM) voltage $V_{PWM}$ for driving the motor 510 (e.g., to move the covering material between a fully-lowered and fully-raised position).

Although described with a motor 510, a motor drive unit 520, and a half-effect sensor 540, in some examples the motor drive unit 500 may not include any of these components, and rather, could be another type of periodic load, such as a high powered sensor comprising a sensing circuit (e.g. an occupancy sensing circuit with higher power processing, such as radar), a periodic light source, such as an LED driver and lighting load, a light source that consumes high power for a short period of time (e.g., an ballast that requires more power when striking the lamp than during steady-state operation, a lighting load located in a seldomly frequented location, such as a closet, a lighting load on a short time clock or timer, such an exterior lighting loads that are triggered by motion, an event, or at a predetermined time of day, etc.), a motorized room divider, and/or a camera (e.g., that is configured to detect glare at window(s), detect occupants, etc.). Further, although described primarily as a motor drive unit for a motorized window treatment, the motor drive unit 500 may drive any sort of motor for any purpose, such as a motor for condenser, a burner for a furnace, etc.

The motor drive unit 500 may comprise a control circuit 530 for controlling the operation of the motor drive unit 500. The control circuit 530 may comprise, for example, a microprocessor, a programmable logic device (PLD), a microcontroller, an application specific integrated circuit (ASIC), a field-programmable gate array (FPGA), or any suitable processing device or control circuit.

The control circuit 530 may be configured to generate a drive signal $V_{DRV}$ for controlling the motor drive circuit 520 to control the rotational speed of the motor 510. For example, the drive signal $V_{DRV}$ may comprise a pulse-width modulated signal, and the rotational speed of the motor 510 may be dependent upon a duty cycle of the pulse-width modulated signal. In addition, the control circuit 530 may be configured to generate a direction signal $V_{DIR}$ for controlling the motor drive circuit 520 to control the direction of rotation of the motor 510. The control circuit 530 may be configured to control the motor 510 to adjust a present position $P_{PRES}$ of the shade fabric of the motorized window treatment between a fully-lowered position $P_{LOWERED}$ and a fully-raised position PRAISED.

The control circuit 530 may also receive a motor power signal $V_{PM}$ that indicates a present power consumption of the motor 510. For example, the motor power signal $V_{PM}$ may have a magnitude that indicates the present power consumption of the motor 510. For instance, in some examples, the motor drive circuit 520 may filter the drive signal $V_{DRV}$, measure a magnitude of the filtered drive signal (e.g., which indicate an average magnitude of the drive signal $V_{DRV}$), and multiple the magnitude of the filtered drive signal by the magnitude of the supply voltage $V_{SUP}$ to determine the magnitude at which to generate the motor power signal $V_{PM}$.

The motor drive unit 500 may include a rotational position sensing circuit, e.g., a Hall effect sensor (HES) circuit 540, which may be configured to generate two Hall effect sensor (HES) signals $V_{HES1}$, $V_{HES2}$ that may indicate the rotational position and direction of rotation of the motor 510. The HES circuit 540 may comprise two internal sensing circuits for generating the respective HES signals $V_{HES1}$, $V_{HES2}$ in response to a magnet that may be attached to a drive shaft of the motor. The magnet may be a circular magnet having alternating north and south pole regions, for example. For example, the magnet may have two opposing north poles and two opposing south poles, such that each sensing circuit of the HES circuit 540 is passed by two north poles and two south poles during a full rotation of the drive shaft of the motor. Each sensing circuit of the HES circuit 540 may drive the respective HES signal $V_{HES1}$, $V_{HES2}$ to a high state when the sensing circuit is near a north pole of the magnet and to a low state when the sensing circuit is near a south pole. The control circuit 530 may be configured to determine that the motor 510 is rotating in response to the HES signals $V_{HES1}$, $V_{HES2}$ generated by the HES circuit 540. In addition, the control circuit 530 may be configured to determine the rotational position and direction of rotation of the motor 510 in response to the HES signals $V_{HES1}$, $V_{HES2}$.

The motor drive unit 500 may comprise one or more power connectors, such as two power connectors 550a, 550b (e.g., each comprising two power terminals, such as a positive terminal and a negative terminal) for receiving a bus voltage $V_{BUS}$ from, for example, an external power supply (e.g., the bus power supply 292, the bus power supply 310, or the bus power supply 400) via a power bus (e.g., the power bus 292). For example, one of the two power connectors 550a, 550b may be a power-in connector that is connected to upstream motor drive units, and the other of the two power connectors 550a, 550b may be a power-out connector that is connected to downstream motor drive units, which may allow for easy wiring of the motor drive units (e.g., in the daisy-chain configuration). The motor drive unit 500 may comprise a diode D554 configured to receive the bus voltage $V_{BUS}$ and produce an input voltage VIN across a bus capacitor $C_{PBUS}$.

The bus voltage $V_{BUS}$ may be coupled to the control circuit 530 through a scaling circuit 536, which may generate a scaled bus voltage $V_{BUS\_S}$. The control circuit 530 may be configured to determine the magnitude of the bus voltage $V_{BUS}$ in response to the magnitude of the scaled bus voltage $V_{BUS\_S}$. For example, the control circuit 530 may determine the on portion $T_{ON}$ and the off portion $T_{OFF}$ of each periodic time period $T_{PBUS}$ based on the scaled bus voltage $V_{BUS\_S}$. Further, the control circuit may determine the total amount of required power (e.g., requested power) of all the devices on the power bus during the off portions $T_{OFF}$ using the scaled bus voltage $V_{BUS\_S}$.

The motor drive unit 500 may comprise a power limiting circuit 552 that is configured to receive the input voltage $V_{IN}$ and generate a supply voltage $V_{SUP}$. The power limiting circuit 552 may draw an input current $I_{IN}$ from the power bus and/or the bus capacitor $C_{BUS}$. The magnitude of the supply voltage $V_{SUP}$ may be less than the magnitude of the input voltage $V_{IN}$. For example, the power limiting circuit 552 may act as a limiter (e.g., a power limiter and/or a current limiter), and in some examples, may comprise a power converter circuit that acts as a limiter. The control circuit 530 may be configured to control the operation of the power limiting circuit 552 using a power limit control signal $V_{PL}$ to control (e.g., ramp) the magnitude of the input current $I_{IN}$ and/or the magnitude of the supply voltage $V_{SUP}$. The supply voltage $V_{SUP}$ may be coupled to the control circuit 530 through a scaling circuit 532, which may generate a scaled supply voltage $V_{SUP\_S}$. The control circuit 530 may be configured to determine the magnitude of the supply voltage $V_{SUP}$ in response to the magnitude of the scaled supply voltage $V_{SUP\_S}$.

The motor drive unit 500 may comprise a charging circuit 553 (e.g., that receives the supply voltage $V_{SUP}$) and an energy storage element 555. The energy storage element 555 may comprise one or more supercapacitors, rechargeable batteries, or other suitable energy storage devices. A supercapacitor of a motor drive unit may have an energy storage capability in the range of approximately 12-26 J/cm$^3$. By contrast, an electrolytic capacitor may have an energy storage capability of approximately 1 J/cm$^3$ (e.g., in the range of about $\frac{1}{10}^{th}$ to $\frac{1}{30}^{th}$ of a supercapacitor), while a battery has an energy storage capability of greater than approximately 500 J/cm$^3$ (e.g., about 15 to 50 times (or more) the energy storage capability of a supercapacitor).

The charging circuit 553 may be configured to charge the energy storage element 555 from the supply voltage $V_{SUP}$ to produce a storage voltage $V_{ES}$ across the energy storage element 555. The charging circuit 553 may also be configured to draw current from the energy storage element 555 to use the storage voltage $V_{ES}$ to generate (e.g., supplement) the supply voltage $V_{SUP}$. The storage voltage $V_{ES}$ may be coupled to the control circuit 530 through a scaling circuit 534, which may generate a scaled storage voltage $V_{ES\_S}$. The control circuit 530 may be configured to determine the magnitude of the storage voltage $V_{ES}$ in response to the magnitude of the scaled storage voltage $V_{ES\_S}$.

The motor drive unit 500 may comprise a current source circuit 570 that may be coupled across the power connectors 550a, 550b. The control circuit 530 may be configured to control the operation of the current source circuit 570 using a current source control signal $V_{CS}$ to control a magnitude of a power-requirement current $I_{PR}$ (e.g., a source current) conducted onto the power bus (e.g., during the off portion $T_{OFF}$ of each periodic time period $T_{PBUS}$), where the magnitude of the power-requirement current $I_{PR}$ is dependent upon (e.g., proportional to) the required power of the motor drive unit 500. The control circuit 530 may calculate a magnitude of the power-requirement currents $I_{PR}$ to be conducted onto the power bus based on any combination of a present power consumption $P_{MOT}$ of the motor 510 (e.g., using the magnitude of the motor power signal $V_{PM}$), a magnitude of voltage depreciation in the charge of the energy storage element 555 (e.g., by determining the difference between the magnitude of the storage voltage $V_{ES}$ and a maximum storage voltage $V_{ES\_MAX}$ of the energy storage element 555), and/or a standby power consumption $P_{STANDBY}$ of the motor drive unit 500 (e.g., the power consumption of circuitry other than the motor 510).

In some examples, the control circuit 530 may calculate a magnitude of the power-requirement currents $I_{PR}$ to be conducted onto the power bus based on (e.g., based further on) one or more scaling factors (e.g., scaling factors $K_{IPR}$, $K_{PM}$, and $K_{ES}$). For example, the control circuit 530 may calculate the magnitude of the power-requirement current $I_{PR}$ using the present power consumption $P_{MOT}$ of the motor 510, the magnitude of the storage voltage $V_{ES}$, the maximum storage voltage $V_{ES\_MAX}$, and the scaling factors $K_{IPR}$, $K_{PM}$, and $K_{ES}$, e.g., $$I_{PR}=K_{IPR} \cdot (K_{PM} \cdot V_{PM} + K_{ES} \cdot [(V_{ES\_MAX}^2 - V_{ES}^2)/V_{ES\_MAX}^2] + P_{STANDBY}). \quad \text{Equation 1}$$

The value of the scaling factor $K_{IPR}$ may be based on the resistance of a sense resistor in the bus power supply (e.g., the nominal resistance $R_{NOM}$ of the variable resistor 426) and the maximum possible voltage of the bus voltage $V_{BUS}$ on the power bus during the off portion $T_{OFF}$ of each periodic time period $T_{PBUS}$ (e.g., one-half the average bus voltage $V_{BUS}$). $K_{PM}$ may be based on the power usage requirements of the motor 510, and the value of the scaling factor $K_{ES}$ may be based on the energy storage element (e.g., the magnitude of the storage voltage $V_{ES}$ across the energy storage element). In some examples, the scaling factor $K_{IPR}$ may be equal to one, and the scaling factor $K_{PM}$ may be equal to 1/5000. The scaling factor $K_{ES}$ may be the maximum amount of power that a motor drive unit could request when its energy storage element is empty (e.g., the energy storage voltage $V_{ES}=0V$). The value of $K_{ES} \cdot V_{ES\_MAX}$ may be selected so that it is substantially less than $K_{PM} \cdot V_{PM}$. In some examples, the scaling factor $K_{IPR}$ may be equal to the total power-requirement currents $I_{PR}$ from all the devices divided by the total required power during the off portion $T_{OFF}$. It should be appreciated that in some examples, the scaling factors may be omitted.

The control circuit 530 may calculate an allocated power $P_{ALLOC}$ that the power limiting circuit 552 may consume from the power bus and/or the bus capacitor $C_{BUS}$ (e.g., during the on portions $T_{ON}$) to charge the energy storage element 555 and/or drive the motor 510. The control circuit 530 may calculate a proportionate amount $K_P$ of the nominal power capability $P_{CAP\text{-}NOM}$ of the bus power supply (e.g., the bus power supply 400) that the motor drive unit 500 is allowed (e.g., allocated) to consume from the power bus. For example, the proportionate amount $K_P$ may be equal to the required power $P_{REQ}$ of the motor drive unit 500 divided by the total required power $P_{TOT}$ of the motor drive unit (e.g., all of the motor drive units) on the power bus, e.g., $$K_P = P_{REQ}/P_{TOT}. \quad \text{Equation 2}$$

The control circuit 530 may be configured to calculate the allocated power $P_{ALLOC}$ by multiplying the nominal power capability $P_{CAP\text{-}NOM}$ by the proportionate amount $K_P$, e.g., $$P_{ALLOC} = K_P \cdot P_{CAP\text{-}NOM}. \quad \text{Equation 3}$$

The control circuit 530 may control the power limiting circuit 552 based on the allocated power $P_{ALLOC}$, so that the motor drive unit 500 consumes the proportionate amount $K_P$ of the nominal power capability $P_{CAP\text{-}NOM}$ from the power bus during the on portion $T_{ON}$ of each periodic time period $T_{PBUS}$. Further, and for example, the motor drive unit 500 may consume the allocated power $P_{ALLOC}$ from the bus capacitor $C_{BUS}$ during the off portion $T_{OFF}$ of each periodic time period $T_{PBUS}$.

The motor drive unit 500 may further comprise a power supply 558 that receives the supply voltage $V_{SUP}$ and generates a low-voltage supply voltage $V_{CC}$ (e.g., approximately 3.3 V) for powering the control circuit 530 and other low-voltage circuitry of the motor drive unit 500. The power supply 558 may conduct current from the energy storage element 555 and/or the power limiting circuit 552, for example, when the control circuit 530 controls the motor drive circuit 520 to rotate the motor 510.

In some examples, the charging circuit 553 is configured to conduct an average current from the power bus that meets (or exceeds) the peak current required by the motor drive circuit 520 to drive the motor 510. However, in other examples, the charging circuit 553 is configured to conduct an average current from the power bus that is much smaller than the peak current required by the motor drive circuit 520 to drive the motor 510. The storage level of the energy storage element 555 may decrease when the motor 510 is rotating and may slowly increase as the charging circuit 553 charges (e.g., trickle charges) the energy storage element. For example, the energy storage element 555 of the motor drive unit 500 may have a capacity to power a predetermined number of full movements (e.g., less than or equal to 10 full movements, such as approximately 5-10 full movements) of the covering materiel.

The motor drive unit 500 may include a communication circuit 542 that allows the control circuit 530 to transmit and receive communication signals, e.g., wired communication signals and/or wireless communication signals, such as radio-frequency (RF) signals. For example, the motor drive unit 500 may be configured to communicate signals with external control devices (e.g., the motor drive units 244 shown in FIGS. 2A-2C).

The motor drive unit 500 may further comprise a user interface 544 having one or more buttons that allow a user to provide inputs to the control circuit 530 during setup and configuration of the motorized window treatment. The control circuit 530 may be configured to control the motor 510 to control the movement of the covering material in response to a shade movement command received from the communication signals received via the communication circuit 542 or the user inputs from the buttons of the user interface 544. The user interface 544 may also comprise a visual display, e.g., one or more light-emitting diodes (LEDs), which may be illuminated by the control circuit 530 to provide feedback to the user of the motorized window treatment system. The motor drive unit 500 may comprise a memory (not shown) configured to store the present position $P_{PRES}$ of the shade fabric and/or the limits (e.g., the fully-raised position PRAISED and the fully-lowered position $P_{LOWERED}$). The memory may be implemented as an external integrated circuit (IC) or as an internal circuit of the control circuit 530.

In some examples (e.g., alternative examples), the control circuit 530 may be configured to periodically transmit messages including the storage level of the energy storage element 555 (e.g., the magnitude of the storage voltage $V_{ES}$) via the communication circuit 542. The control circuit 530 may be configured to learn the storage levels of energy storage elements of the other motor drive units coupled to the power bus in the DC power distribution system via messages received via the communication circuit 542. The control circuit 530 may be configured to communicate with the other motor drive units to coordinate when each of the charging circuits 553 charges its energy storage element 555. The control circuit 530 may generate a charging enable signal $V_{CHRG}$ for enabling and disabling the charging circuit 553 (e.g., to charge the energy storage element 555 based on communication with the other motor drive units).

The motor drive unit 500 may also comprise a controllable switching circuit 560 coupled between the energy storage element 555 and the power connectors 550a, 550b through a diode D562. The control circuit 530 may generate a switch control signal $V_{SW}$ for rendering the controllable switching circuit 560 conductive and non-conductive. The control circuit 530 may be configured to render the controllable switching circuit 560 conductive to bypass one or more components of the motor drive unit 500 (e.g., the charging circuit 553 and the diode D554) and allow the energy storage element 555 to charge energy storage elements of other motor drive units coupled to the power bus. The control circuit 530 may allow the energy storage element 555 to charge energy storage elements of other motor drive units coupled to the power bus based on the storage levels of energy storage elements of the other motor drive units (e.g. if the storage levels of energy storage elements of the other motor drive units are low), based on a message received from the system controller, based on a message received from another motor drive unit, based on a determination that another motor drive unit is charging from the power bus, based on another motor drive unit in use/moving a motor, based on a determination that another motor drive unit has an upcoming energy usage event, and/or based on another motor drive unit having a high-power demand event.

Further, in some examples, the motor drive unit 500 may include a boost converter (not shown) in series with or instead of the switch 560. In such examples, the control circuit 530 may be configured to increase (e.g., boost) the voltage across the energy storage element 555 when connecting the energy storage element 555 to the power bus (e.g., when providing power from the energy storage element 555 to the power bus). The inclusion of a boost converter in the motor drive unit 500 may be beneficial when, for example, the internal storage element 555 has a low voltage rating.

The DC power distribution system (e.g., the load control system 100 shown in FIG. 1 and/or the DC power distribution system 300) may include a variety of different types of control devices, such as various input devices. For example, as described above, the DC power distribution system may include wired keypad device(s), battery-powered remote control device(s), occupancy sensor(s), daylight sensor(s), shadow sensor(s), radar sensor(s), and/or camera(s) (e.g., that are configured to detect glare at window(s), detect occupants, etc.).

Figure 7:
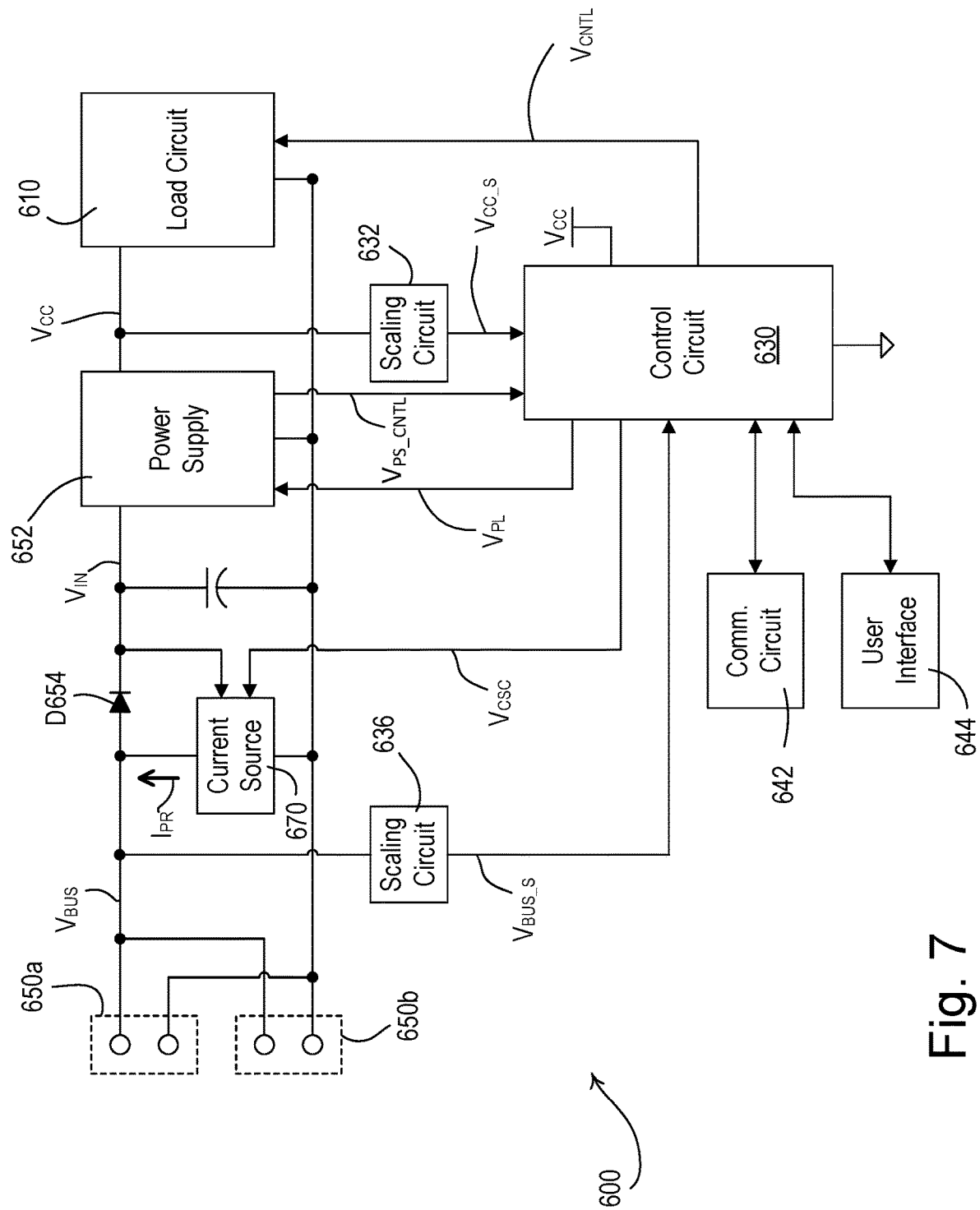
FIG. 7 is an example of a control device used in a DC power distribution system.

FIG. 7 is an example of a control device 600 (e.g., an input device, such as the wired keypad device 150, the battery-powered remote control device 152, the occupancy sensor 154, the daylight sensor 156, and/or the shadow sensor 158) used in a DC power distribution system (e.g., the load control system 100 shown in FIG. 1). The control device 600 may include a load circuit 610. For example, the load circuit 610 may include a sensor and/or sensing circuit (e.g., when the control device 600 is an occupancy sensor, a daylight sensor, and/or a shadow sensor), and/or a light source, such as one or more LEDs (e.g., when the control device 600 is a keypad, a battery-powered remote control device, or a low powered light source). However, in some examples, the control device 600 may not include a load circuit 610, for example, when the control device 600 is a wireless adapter circuit, for example, because the control device 600 already includes a communication circuit 642.

The control device 600 may comprise a control circuit 630 for controlling the operation of the control device 600. The control circuit 630 may comprise, for example, a microprocessor, a programmable logic device (PLD), a microcontroller, an application specific integrated circuit (ASIC), a field-programmable gate array (FPGA), or any suitable processing device or control circuit. The control circuit 630 may be configured to generate a control signal $V_{CNTL}$ for controlling the load circuit 610 to control the internal load, for instance, in examples where the control device 600 comprises the load circuit.

The control device 600 may include a communication circuit 642 that allows the control circuit 630 to transmit and receive communication signals, e.g., wired communication signals and/or wireless communication signals, such as radio-frequency (RF) signals. For example, the control device 600 may be configured to communicate signals with external control devices (e.g., any of the control-target devices in the load control system 100). The control device 600 may further comprise a user interface 644 having one or more buttons that allow a user to provide inputs to the control circuit 630, for example, to control one or more control-target devices. The user interface 644 may also comprise a visual display, e.g., one or more light-emitting diodes (LEDs), which may be illuminated by the control circuit 630 to provide feedback to the user of the control device 600. Or, alternatively, the visual display (e.g., one or more LEDs) may be part of the load circuit 610. The control device 600 may comprise a memory (not shown) configured to store one or more operational settings of the control device 600. The memory may be implemented as an external integrated circuit (IC) or as an internal circuit of the control circuit 630.

The control device 600 may comprise one or more power connectors, such as two power connectors 650a, 650b (e.g., each comprising two power terminals, such as a positive terminal and a negative terminal) for receiving a bus voltage $V_{BUS}$ from, for example, an external power supply (e.g., the bus power supply 292, the bus power supply 310, or the bus power supply 400) via a power bus (e.g., the power bus 292). For example, one of the two power connectors 650a, 650b may be a power-in connector that is connected to upstream motor drive units, and the other of the two power connectors 650a, 650b may be a power-out connector that is connected to downstream motor drive units, which may allow for easy wiring of the motor drive units and other devices (e.g., in the daisy-chain configuration) to the power bus.

The control device 600 may be configured to draw a relative constant current from the power bus (e.g., using the bus voltage $V_{BUS}$). That is, the control device 600 may consume a relatively constant and continuous amount of power from the power bus. This is contrasted with the motor drive units that are coupled to the power bus, which operate relatively infrequently (e.g., a couple times per day), but require large amounts of power when they operate.

The control device 600 may comprise a current source circuit 670 that is coupled across the power connectors 650a, 650b. In some examples, the control circuit 630 may be configured to control the operation of the current source circuit 670 using a current source control signal $V_{CSC}$ to control a magnitude of the power-requirement current $I_{PR}$ (e.g., source current) conducted onto the power bus (e.g., during the off portion $T_{OFF}$ of each periodic time period $T_{PBUS}$), where the magnitude of the power-requirement currents $I_{PR}$ conducted onto the power bus is dependent upon (e.g., proportional to) the required power $P_{REQ}$ of the control device 600. In some examples, the control circuit 630 may control the magnitude of the power-requirement currents $I_{PR}$ to be the same value for the off portion $T_{OFF}$ of each periodic time period $T_{PBUS}$, for example, when the control device 600 draws a constant current from the power bus (e.g., when the magnitude of the input current $V_{IN}$ is relatively constant over time). However, in some examples, the current source circuit 670 is not controlled by the current source control signal $V_{CSC}$, but is rather configured (e.g., preconfigured) to conduct a constant power-requirement currents $I_{PR}$ (e.g., having a magnitude of approximately 3 mA) during the off portion $T_{OFF}$ of every periodic time period $T_{PBUS}$.

Finally, in some examples, the control device 600 may not include the current source circuit 670, and the control device 600 may consume a constant amount of power from the power bus and not communicate this to the other devices on the power bus using the power-requirement currents $I_{PR}$. In such examples, the bus power supply (e.g., the bus power supply 400) that is connected to the power bus may determine the amount of constant power required by the control device(s) 600 that are connected to the power bus, for example, by averaging the steady state load on the power bus. Accordingly, the bus power supply may then control the resistance $R_{VAR}$ of the variable resistor during the off portion $T_{OFF}$ of each periodic time period $T_{PBUS}$ to ensure that the constant power load(s) are continuously provided sufficient power on the power bus (e.g., regardless of the power needs of any peaky loads, such as one or more motor drive units, coupled to the power bus).

The bus voltage $V_{BUS}$ may be coupled to the control circuit 630 through a scaling circuit 636, which may generate a scaled bus voltage $V_{BUS\_S}$. The control circuit 630 may be configured to determine the magnitude of the bus voltage $V_{BUS}$ in response to the magnitude of the scaled bus voltage $V_{BUS\_S}$. Further, using the scaled bus voltage $V_{BUS\_S}$, the control circuit 630 may be configured to determine the power requests of all the other devices on the DC power bus and/or determine when the bus power supply on the DC power bus has started and stopped generating the bus voltage $V_{BUS}$ (e.g., to determine the on portion $T_{ON}$ and off portion $T_{OFF}$ of each periodic time period $T_{PBUS}$).

The control device 600 may further comprise a power supply 652 that receives an input voltage $V_{IN}$ and generates a supply voltage $V_{CC}$ (e.g., approximately 3.3 V) for powering the control circuit 630 and other low-voltage circuitry of the control device 600. The control circuit 630 may receive a power supply control signal $V_{PS\_CNTL}$ that indicates the power being used by the power supply 652. The supply voltage $V_{CC}$ may be coupled to the control circuit 630 through a scaling circuit 632, which may generate a scaled supply voltage $V_{CC\_S}$. The control circuit 630 may be configured to determine the magnitude of the supply voltage $V_{CC}$ in response to the magnitude of the scaled supply voltage $V_{CC\_S}$. In some examples, the power supply 652 may be controlled by the control circuit 630 (e.g., via a power limit control signal $V_{PL}$) to limit the supply voltage $V_{CC}$. For example, the control circuit 630 may be configured to control the operation of the power supply 652 using the power limit control signal $V_{PL}$ to control the magnitude of the supply voltage $V_{CC}$.

Figure 8:
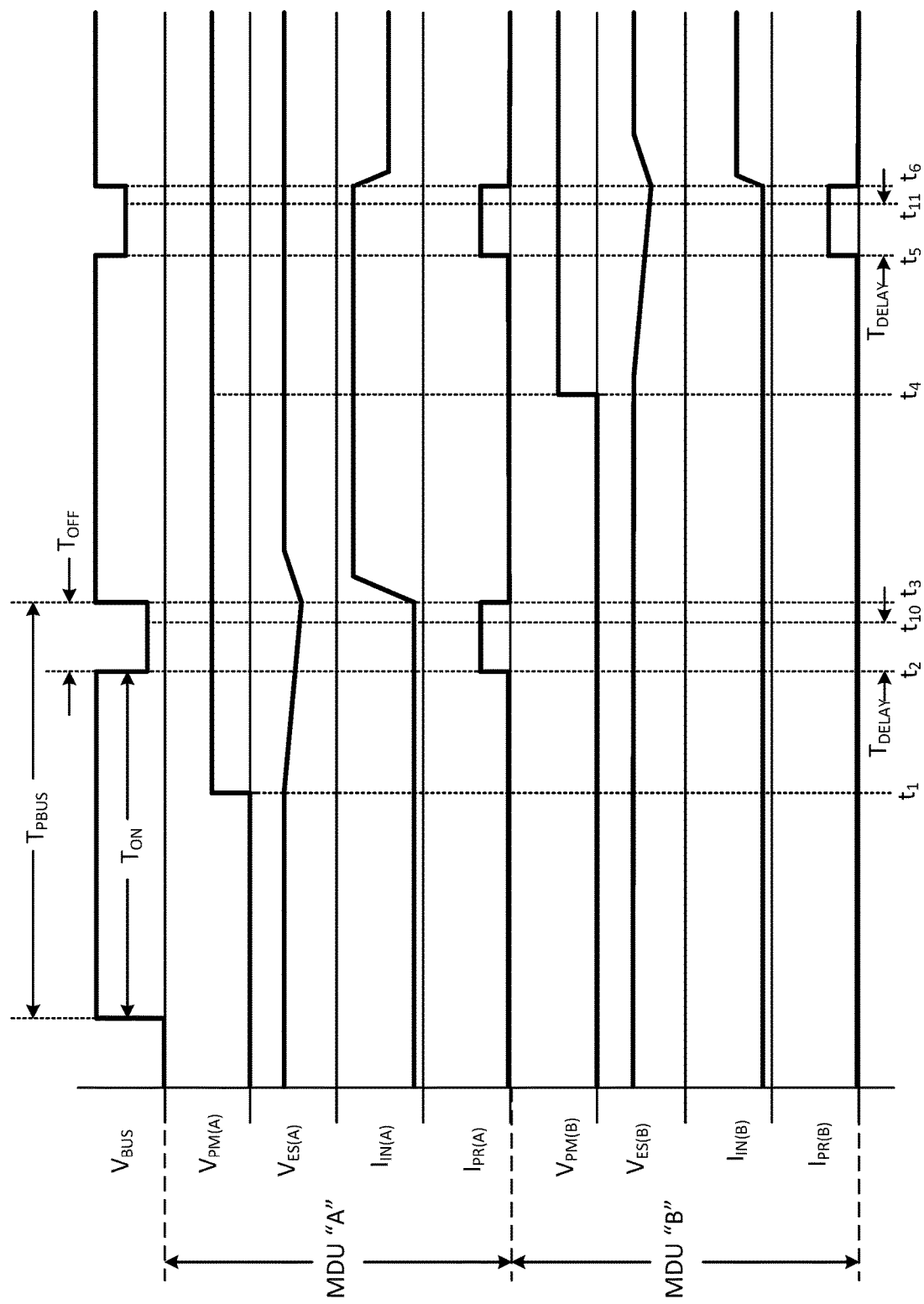
FIG. 8 shows examples of waveforms that illustrate an operation of two motor drive units that are connected to a power bus in a DC power distribution system.

FIG. 8 shows examples of waveforms that illustrate an operation of two motor drive units (e.g., the motor drive unit 500) that are connected to a power bus (e.g., a DC power bus) in a DC power distribution system (e.g., the DC power distribution system 300). In FIG. 8, the first motor drive unit (MDU "A") operates its motor first, and the second motor drive unit (MDU "B") operates its motor second. The first and second motor drive units may be coupled to the same DC power bus (e.g., the power bus 292, 340) and be supplied a bus voltage $V_{BUS}$ from the same bus power supply (e.g., the bus power supply 310, 400).

As noted above, the bus power supply may operate first and second controllable switching circuits (e.g., the first and second controllable switching circuits 442, 444) periodically (e.g., every one second). For example, as noted above, the bus power supply may render the first controllable switching circuit conductive and render the second controllable switching circuit non-conductive for an on portion $T_{ON}$ (e.g., 995 milliseconds) of each time period $T_{PBUS}$, and render the first controllable switching circuit non-conductive and render the second controllable switching circuit conductive for an off portion $T_{OFF}$ (e.g., five milliseconds) of each time period $T_{PBUS}$. Accordingly, the bus power supply may provide a bus voltage $V_{BUS}$ on the power bus during the on portion $T_{ON}$, and may stop providing the bus voltage $V_{BUS}$ on the power bus during the off portion $T_{OFF}$.

Prior to the time $t_1$, the respective motors of the first and second motor drive units may be stopped and the storage voltages $V_{ES(A)}$, $V_{ES(B)}$ across the respective energy storage elements (e.g., the energy storage device 555) may be in a steady state condition (e.g., at a constant maximum capacity $V_{ES\_MAX}$). Further, prior to the time $t_1$, the input current $I_{IN(A)}$, $I_{IN(B)}$, at the first and second motor drive units may be in a steady state condition. For example, the supply voltages $V_{SUP(A)}$, $V_{SUP(B)}$ may be at a relatively small constant value. At time $t_1$, the first motor drive unit may control a drive signal $V_{DRV}$ to drive its motor (e.g., the motor 310), for example, in response to receiving a user input or control signal indicating a new position of a covering material of a motorized window treatment. The first motor drive unit may consume power to drive the motor from an energy storage device, and as such, the storage voltage $V_{ES(A)}$ across the energy storage element may begin to decrease starting at time $t_1$. Further, the motor power signal $V_{PM(A)}$ of the first motor drive unit may indicate the power being used by the motor.

At time $t_2$, the bus power supply may render the first controllable switching circuit non-conductive and render the second controllable switching circuit conductive to stop generating the bus voltage $V_{BUS}$ across the power bus. The time $t_2$ may represent the beginning of the off portion $T_{OFF}$ of the time period $T_{PBUS}$. In some examples, the first and/or second motor drive units may be configured to determine the occurrence of the off portion of the periodic time period $T_{PBUS}$ when a magnitude of the bus voltage $V_{BUS}$ drops below a threshold value. At time $t_2$ (e.g., or immediately prior to time $t_2$), the first and second motor drive units may calculate their required power from the power bus. Then, at time $t_2$ (e.g., or immediately after the time $t_2$), the first and second motor drive units may provide a power-requirement current $I_{PR}$ onto the power bus at a magnitude that is dependent upon (e.g., proportional to) the required power of the respective motor drive unit. For example, the first motor drive unit may control the operation of a current source circuit (e.g., the current source circuit 570) using a current source control signal $V_{CSC}$ to control a magnitude of a power-requirement current $I_{PR(A)}$ conducted onto the power bus, where the magnitude of the power-requirement current $I_{PR(A)}$ is dependent upon (e.g., proportional to) the required power of the first motor drive unit.

As noted above, the first motor drive unit may calculate the magnitude of the power-requirement current $I_{PR(A)}$ based on the power being used by the motor (e.g., using the motor power signal $V_{PM(A)}$), a level of depreciation in the charge of the energy storage element 555 (e.g., by comparing the magnitude of the storage voltage $V_{ES}$ to a maximum storage $V_{ES\_MAX}$ of the energy storage element 555), and, in some examples, one or more scaling factors. Since the second motor drive unit is not driving its motor at time $t_2$ and the energy storage element of the second motor drive unit is above a threshold voltage level, such as $V_{ES\_MAX}$, the second motor drive unit may not control a magnitude of the power-requirement current $I_{PR(B)}$ to be conducted onto the power bus (e.g., control the magnitude of the power-requirement current $I_{PR(B)}$ to be zero).

At a time delay TDELAY after the beginning of the off portion $T_{OFF}$ of time period $T_{PBUS}$ (e.g., after the time $t_2$), the first and second motor drive units may measure the total amount of voltage across the power bus, for example, using the scaled bus voltage $V_{BUS\_S}$. For instance, the first motor drive unit may measure the total amount of voltage across the power bus at the time $t_{10}$. Based on the desired amount of power of the first motor control unit and the total amount of required power for all the motor drive units, the first motor drive unit may calculate an amount of power (e.g., a proportionate amount of power) that it may consume during the next on portion $T_{ON}$. For example, the first motor drive unit may calculate the allocated amount of power as a scaled fraction of its desired amount of power (e.g., based on the power-requirement current $I_{PR(A)}$) divided by the total required power of all the devices on the power bus (e.g., based on the bus voltage $V_{BUS}$). During the off portion $T_{OFF}$ between the time $t_2$ and the time $t_3$, the magnitude of the bus voltage $V_{BUS}$ may be equal to the resistance $R_{VAR}$ of the variable resistor of the bus power supply times the magnitude of the power-requirement current $I_{PR(A)}$ (e.g., $V_{BUS} = R_{VAR} \cdot I_{PR(A)}$).

At the time $t_3$, the bus power supply may render the first controllable switching circuit conductive and render the second controllable switching circuit non-conductive to provide the bus voltage $V_{BUS}$ for an on portion $T_{ON}$ (e.g., 995 milliseconds) of the next one of the periodic time periods $T_{PBUS}$. The time $t_3$ may correspond to the end of the off portion $T_{OFF}$ of the previous one of the periodic time period $T_{PBUS}$ and the beginning of the on portion $T_{ON}$ of the next time period $T_{PERIOD}$. Further, at the time $t_3$, the first and second motor drive units may begin consuming the allocated amount of power (e.g., a proportionate amount of power) from the DC power bus based on the performed calculation. For example, the first motor drive unit may control the operation of a power limiting circuit (e.g., the power limiting circuit 552) based on the calculated allocation of power (e.g., to which the first motor drive unit is entitled) from the DC power bus during the on portion $T_{ON}$ of the present time period $T_{PERIOD}$. The first motor drive unit may consume the allocated power $P_{ALLOC}$ from the power bus during the on portion $T_{ON}$ of the present one of the time periods $T_{PBUS}$ to drive the motor and recharge the internal energy storage element of the first motor drive unit. As such, the input current $I_{IN(A)}$ of the first motor drive unit may begin to increase at the time $t_3$, and the energy storage element may begin to recharge. For example, a power limiting circuit (e.g., power limiting circuit 552) of the first motor drive unit may control the input current $I_{IN(A)}$ to increase (e.g., increase gradually) at the time $t_3$. Since the bus voltage $V_{BUS}$ is substantially constant, the input power is proportional to the input current $I_{IN(A)}$ (e.g., as shown in FIG. 8).

Further, since the second motor drive unit did not request any power from the DC power bus during the off portion $T_{OFF}$ of the previous time period $T_{PBUS}$ (e.g., the second motor drive unit did not generate a power-requirement current $I_{PR(B)}$ during the off portion $T_{OFF}$), the second motor drive unit may not consume any power (e.g., additional power) form the DC power bus during the on portion $T_{ON}$ of the present time period $T_{PBUS}$. As such, the input current $I_{IN(B)}$ of the second motor drive unit does not increase during the on portion $T_{ON}$ of the present time period $T_{PBUS}$.

At time $t_4$, the second motor drive unit may generate a drive signal $V_{DRV}$ to drive its motor, for example, in response to receiving a user input or control signal indicating a new position of a covering material of a motorized window treatment. The second motor drive unit may consume power to drive the motor from an energy storage device, and as such, the storage voltage $V_{ES(B)}$ across the energy storage element may begin to decrease starting at time $t_4$. Further, the motor power signal $V_{PM(B)}$ of the second motor drive unit may indicate the power being used by the motor.

At time $t_5$, the bus power supply may render the first controllable switching circuit non-conductive and render the second controllable switching circuit conductive to stop generating the bus voltage $V_{BUS}$ across the DC power bus. The time $t_5$ may represent the beginning of the off portion $T_{OFF}$ of the time period $T_{PBUS}$. At time $t_5$ (e.g., or immediately prior to time $t_5$), the first and second motor drive units may calculate their required power from the DC power bus. Then, at time $t_5$ (e.g., or immediately after the time $t_5$), the first and second motor drive units may provide a power-requirement current $I_{PR}$ onto the DC power bus at a magnitude that is dependent upon (e.g., proportional to) the required power of the respective motor drive unit. For example, the first motor drive unit may control the operation of a current source circuit to control a magnitude of the power-requirement currents $I_{PR(A)}$ that is conducted onto the DC power bus, where the magnitude of the power-requirement currents $I_{PR(A)}$ is dependent upon (e.g., proportional to) the required power of the first motor drive unit. Similarly, the second motor drive unit may control the operation of a current source circuit to control a magnitude of the power-requirement currents $I_{PR(B)}$ that is conducted onto the DC power bus, where the magnitude of the power-requirement currents $I_{PR(B)}$ is dependent upon (e.g., proportional to) the required power of the second motor drive unit. Since both the first and second motor drive units are providing (e.g., conducting) the respective power-requirement currents $I_{PR(A)}$, $I_{PR(B)}$ onto the DC power bus, the magnitude of the bus voltage $V_{BUS}$ during the off portion $T_{OFF}$ between times $t_5$ and $t_6$ may be more than (e.g., double) the magnitude of the bus voltage $V_{BUS}$ during the off portion $T_{OFF}$ between times $t_2$ and $t_3$. For example, during the off portion $T_{OFF}$ between the time $t_5$ and the time $t_6$, the bus voltage $V_{BUS}$ may be equal to the resistance $R_{VAR}$ of the variable resistor of the bus power supply times the combination of the magnitudes of the power-requirement currents $I_{PR(A)}$ and $I_{PR(B)}$ (e.g., $V_{BUS} = R_{VAR} \cdot (I_{PR(A)} + I_{PR(B)})$).

At a time $t_{11}$, (e.g., after a time delay TDELAY from the beginning of the off portion $T_{OFF}$ of time period $T_{PBUS}$ at the time $t_5$), the first and second motor drive units may measure the magnitude of the bus voltage $V_{BUS}$ across the DC power bus (e.g., using a scaled bus voltage $V_{BUS\_S}$). For instance, the first and second motor drive unit may measure the magnitude of the bus voltage $V_{BUS}$ across the DC power bus at the time $t_{11}$. Based on the desired amount of power of the motor control unit and the total amount of required power for all the motor drive units, the first and second motor drive unit may calculate an allocated amount of power (e.g., proportionate amount of power) that each may consume during the next time period $T_{PBUS}$. For example, the first and second motor drive units may calculate an allocated amount of power as a scaled fraction of its desired amount of power (e.g., based on the magnitude of the power-requirement currents $I_{PR(A)}$ of the first motor drive unit, and based on the magnitude of the power-requirement currents $I_{PR(B)}$ of the second motor drive unit) divided by the total required power of all the devices on the DC power bus (e.g., based on the bus voltage $V_{BUS}$ during the off portion $T_{OFF}$).

At the time $t_6$, the bus power supply may render the first controllable switching circuit conductive and render the second controllable switching circuit non-conductive to provide the bus voltage $V_{BUS}$ for an on portion $T_{ON}$ (e.g., 995 milliseconds) of the next time period $T_{PBUS}$. At the time $t_6$, the first and second motor drive units may begin consuming an allocated (e.g., proportionate) amount of power from the DC power bus based on the performed calculation. For example, the first motor drive unit may control the operation of a power limiting circuit based on the calculated proportion of power that the first motor drive unit is entitled to from the DC power bus during the on portion $T_{ON}$ of the present time period $T_{PBUS}$, and the second motor drive unit may do the same. The first motor drive unit may consume an allocated (e.g., proportionate) amount of the bus voltage $V_{BUS}$ during the on portion $T_{ON}$ of the present time period $T_{PBUS}$ to drive the motor and recharge the internal energy storage element of the first motor drive unit, and likewise, the second motor drive unit may do the same. As such, the input current $I_{IN(B)}$ of the second motor drive unit may begin to increase, and the energy storage voltage $V_{ES(B)}$ of the energy storage element of the second motor drive unit may begin to recharge. However, at the time $t_6$, since the second motor drive unit is now consuming power from the DC power bus, the input current $I_{IN(A)}$ of the first motor drive unit may decrease by an offset based on the additional motor drive unit(s) that are consuming power from the DC power bus. Finally, although not illustrated, the energy storage element of the first motor drive unit may decrease slightly during the off portion $T_{OFF}$ of time period (e.g., between the time $t_5$ and the time $t_6$), and, in such instances, would recharge at the beginning of the on portion $T_{ON}$ of the next time period $T_{PBUS}$.

Figure 9:
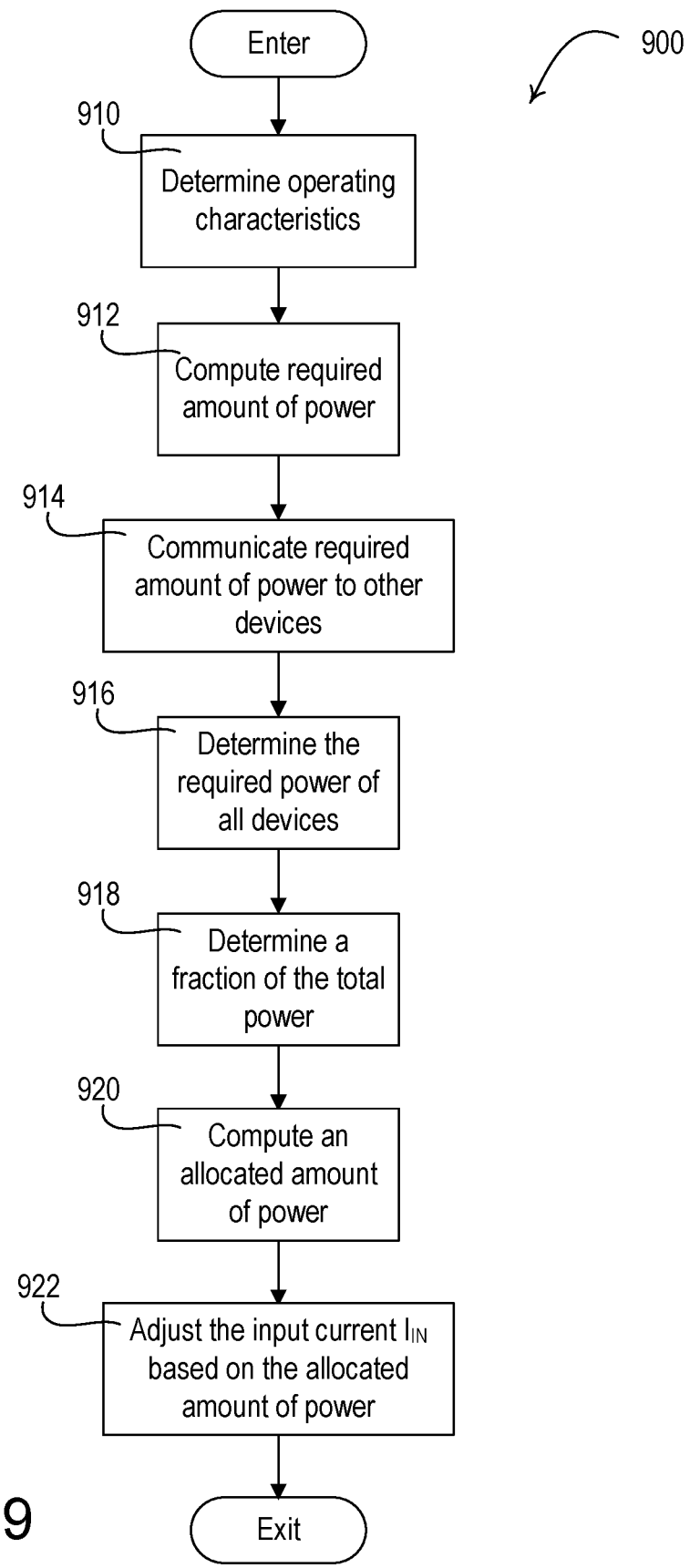
FIG. 9 is a flowchart of an example procedure that may be performed by a control circuit of a motor drive unit.

FIG. 9 is a flowchart of an example procedure 900 that may be performed by a control circuit of a motor drive unit (e.g., a control circuit of one of the motor drive units 144 of the motorized roller shades 140 of FIG. 1, a control circuit of one of the motor drive units 244 of the motorized window treatments 240 of FIGS. 2A-2C, and/or the control circuit of the motor drive unit 500 of FIG. 5), for example, to consume an allocated (e.g., proportionate) amount of power from a DC power bus. The control circuit of motor drive unit may perform the procedure 900 periodically, for example, every one second. The motor drive unit may be coupled to a DC power bus (e.g., the DC power bus 292) and be supplied a bus voltage $V_{BUS}$ from a bus power supply (e.g., the bus power supply 400).

The bus power supply may render the first controllable switching circuit conductive and render the second controllable switching circuit non-conductive for an on portion $T_{ON}$ (e.g., 995 milliseconds) of each time period $T_{PBUS}$, and render the first controllable switching circuit non-conductive and render the second controllable switching circuit non-conductive for an off portion $T_{OFF}$ (e.g., five milliseconds) of each time period $T_{PBUS}$. Accordingly, the bus power supply may provide (e.g., generate) the bus voltage $V_{BUS}$ on the DC power bus during the on portion $T_{ON}$, and may stop providing (e.g., generating) the bus voltage $V_{BUS}$ during the off portion $T_{OFF}$.

The control circuit of motor drive unit may begin the procedure 900 at 910. At 910, the control circuit may determine one or more operating characteristics, such as an amount of power presently being used by the internal load, such as a motor, the present voltage across the energy storage element, etc. For example, the control circuit may receive one or more internal signals (e.g., voltages) that indicate the operating characteristics of the motor drive unit. For example, the control circuit unit may determine (e.g., measure) an amount of power used by an internal load, such as a motor (e.g., using the motor power signal $V_{PM}$). The control circuit unit may determine (e.g., measure) the voltage across an internal energy storage element of the motor drive unit (e.g., based on the energy storage element voltage signal $V_{ES\_S}$). The control circuit unit may determine a maximum voltage that can be stored across the internal energy storage element, which for example, may be preconfigured in (e.g., stored in memory of) the motor drive unit.

At 912, the control circuit may determine a desired amount of power that the motor drive unit expects to need during the next time period $T_{PBUS}$. The control circuit may calculate the desired amount of power based on the power presently being used by the motor (e.g., using a motor power signal $V_{PM}$), the amount of voltage in the internal energy storage element (e.g., by comparing $V_{ES}$ to the maximum storage of the internal energy storage element $V_{ES\_MAX}$), and in some examples, one or more scaling factors. In some examples, instead of determining the amount of voltage in the internal energy storage element, the control circuit may determine a percentage of total or maximum storage capacity of the internal energy storage element, which may not require that the control circuit measure the voltage of the internal energy storage element (e.g., such as using coulomb counting). The control circuit may determine (e.g., compute) a magnitude of the power-requirement current $I_{PR}$ to conducted onto the power bus. The magnitude of the power-requirement current $I_{PR}$ may be dependent upon (e.g., proportional to) the required power of the motor drive unit during the next time period $T_{PBUS}$. The control circuit may calculate the power-requirement current $I_{PR}$ based on the power being used by the motor (e.g., using a motor power signal $V_{PM}$), the amount of voltage in the internal energy storage element (e.g., by comparing $V_{ES}$ to the maximum storage of the internal energy storage element $V_{ES\_MAX}$), and in some examples, one or more scaling factors. For example, the control circuit may calculate the power-requirement current $I_{PR}$ based on Equation 1, noted above and re-recited below.

$$I_{PR}=K_{IPR} \cdot (K_{PM} \cdot V_{PM} + K_{ES} \cdot [(V_{ES\_MAX}^2 - V_{ES}^2)/V_{ES\_MAX}^2] + P_{STANDBY}). \quad \text{Equation 1}$$

In some examples, the control circuit may determine a standby amount of power $P_{STANDBY}$ that the motor drive unit will request regardless of the other power requirements of the motor drive unit. For example, in some examples, the desired amount of power will be no smaller than the standby amount of power $P_{STANDBY}$.

At 914, the control circuit may communicate the desired amount of power to the other devices on the DC power bus. For example, the control circuit may communicate the power-requirement current $I_{PR}$ to the other devices (e.g., the bus power supply, motor drive units 500, and/or devices 600) on the DC power bus. The control circuit may communicate the power-requirement current $I_{PR}$ using an analog technique over the DC power bus. For example, the control circuit may control the operation of a current source circuit (e.g., the current source circuit 570) using a current source control signal $V_{CSC}$ to control the magnitude of the power-requirement current $I_{PR}$ conducted onto the DC power bus. Alternatively, the control circuit may communicate the desired amount of power using a digital technique over the DC power bus or using a wireless or wired digital communication technique (e.g., using the communication circuit 542, such as a digital wire protocol (e.g., rs485)).

At 916, the control circuit may determine the required power of all the other devices on the DC power bus. For example, the control circuit may determine the total cumulative amount of required power of all the devices on the DC power bus during the off portions $T_{OFF}$ by determining the magnitude of the DC bus voltage $V_{BUS}$ during the off period (e.g., using a scaled bus voltage $V_{BUS\_S}$). Alternatively, the control circuit may determine the total amount of required power of all the devices on the DC power bus by receiving one or more wireless signals from the other devices (e.g., using the communication circuit 542).

At 918, the control circuit may compute the fraction of the total power that the motor drive unit may consume during the on portion $T_{ON}$ of the next time period $T_{PBUS}$. For example, the control circuit may calculate the desired amount of power as a scaled fraction of its desired amount of power (e.g., based on the power-requirement current $I_{PR}$) divided by the total required power of all the devices on the power bus (e.g., based on the bus voltage $V_{BUS}$).

For example, the control circuit may calculate a proportionate amount $K_P$ of the nominal power capability $P_{CAP-NOM}$ of the bus power supply that the motor drive unit is allowed (e.g., allocated) to consume from the DC power bus. For example, the proportionate amount $K_P$ may be equal to the required power $P_{REQ}$ (e.g., the desired amount of power determined at 912) of the motor drive unit divided by the total required power $P_{TOT}$ of all of the motor drive units (e.g., the required power of all devices determined at 916) on the power bus, e.g., $$K_P = P_{REQ}/P_{TOT}. \qquad \text{Equation 2}$$

At 920, the control circuit may compute an allocated amount of power it may consume from the DC power bus during the on portion $T_{ON}$ of the next time period $T_{PBUS}$. For example, the control circuit may calculate the absolute amount of power that it may consume from the DC power bus, and in some examples, scale that power into the voltage. In some examples, from 910 and 920, the bus power supply may render the first controllable switching circuit non-conductive and render the second controllable switching circuit conductive (e.g., 910-920 may occur during an off portion $T_{OFF}$ of a time period $T_{PBUS}$).

For example, the control circuit may calculate an allocated power $P_{ALLOC}$ that the power limiting circuit may consume from the DC power bus and/or the bus capacitor $C_{BUS}$ (e.g., during the subsequent on portion $T_{ON}$) to charge the energy storage element and/or drive the motor. The control circuit may be configured to calculate the allocated power $P_{ALLOC}$ by multiplying the nominal power capability $P_{CAP-NOM}$ of the power supply by the proportionate amount $K_P$ (e.g., the fraction of the total power determined at 918), e.g., $$P_{ALLOC} = K_P \cdot P_{CAP-NOM}. \qquad \text{Equation 3}$$

Finally, at 922, the control circuit may adjust an input current $I_{IN}$ of the motor drive unit based on the allocated amount of power. For example, the control circuit may generate a supply voltage $V_{SUP}$ based on the computed amount of power that it may consume from the DC power bus. For example, the control circuit may control a power limit control signal $V_{PL}$ to control a power limiting circuit (e.g., the power limiting circuit 552) to control the magnitude of the supply voltage $V_{SUP}$ such that the magnitude of the supply voltage $V_{SUP}$ is equal to (e.g., or less than) the computer amount of power that the motor drive unit may consume from the DC power bus. At 922, the bus power supply may render the first controllable switching circuit conductive and render the second controllable switching circuit non-conductive (e.g., 920 may occur during the on portion $T_{ON}$ of the next time period $T_{PBUS}$).

For instance, using an analog technique, the control circuit may determine a total amount of current $I_{TOTAL}$ that the motor drive unit may draw from the DC power bus at 916, where $I_{TOTAL} = V_{PRAD}/R_{VAR}$. The control circuit may then determine an allocated amount of power $P_{ALLOC}$ at 918 and 920, where $P_{ALLOC} = P_{CAP-NOM} \cdot (P_{REQ}/P_{TOT})$. Finally, the control circuit may determine a magnitude of a power limit control signal $V_{PL}$ that is used to control the magnitude of the input current $I_{IN}$ at 922, where $V_{PL} = K_{PL} \cdot P_{ALLOC}$. Further, using a digital technique and in some examples, the control circuit may sum the required power from all the motor drive units at 916. The control circuit may determine an allocated amount of power $P_{ALLOC}$, where $P_{ALLOC} = P_{REQ}/P_{TOTAL}$ at 918 and 920. And the control circuit may determine a current limit $I_{LIMIT}$ for the input current, where $I_{LIMIT} = P_{ALLOC}/V_{BUS}$, and may control a limiting circuit (e.g., power limiting circuit 552) to limit the input current to the current limit $I_{LIMIT}$ at 922.

Figure 10A:
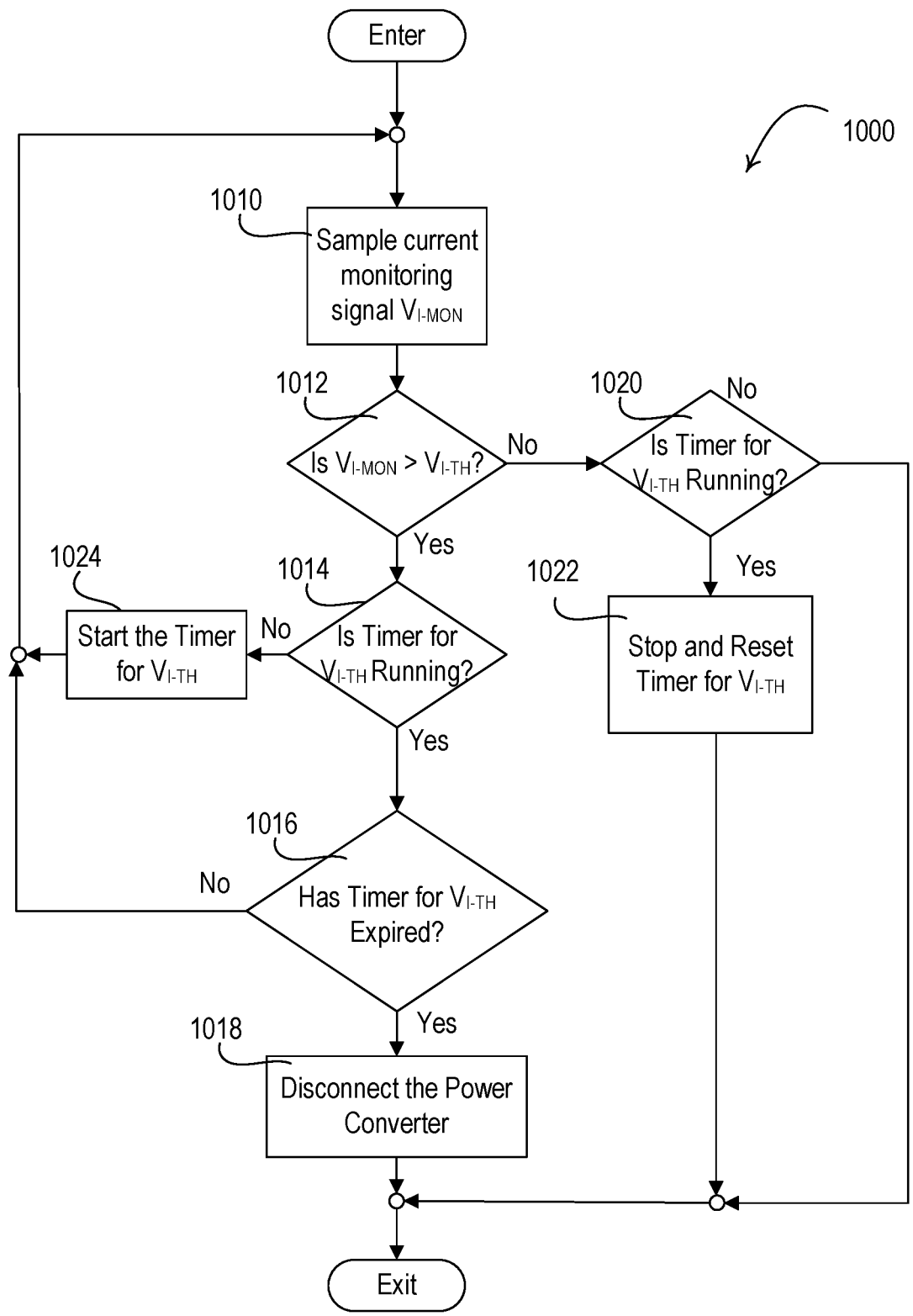
FIG. 10A is a flowchart of an example procedure that may be performed by a bus power supply.

FIG. 10A is a flowchart of an example procedure 1000 that may be performed by a bus power supply, such as an over-power protection circuit (e.g., the over-power protection circuit 430, the over-power protection circuit 450, and/or the over-power protection circuit 460) and/or a power bus management circuit (e.g., the power bus management circuit 440) of the bus power supply. For example, a control circuit of the over-power protection circuit may perform the procedure 1000. Further, in some examples, a control circuit of a power bus management circuit (e.g., the control circuit 448 of the power bus management circuit 440) may perform the procedure 1000. The over-power protection circuit may perform the procedure 1000 periodically. The over-power protection circuit may perform the procedure 1000 to detect and protect against over-power (e.g., over-current) conditions. The over-power protection circuit may perform the procedure 1000 to allow the bus power supply to operate at one or more increased power capabilities that are greater than the nominal power capability $P_{TH-NOM}$ of the bus power supply for up to, but not longer than, respective predetermined increased-power time periods.

The over-power protection circuit may determine a magnitude of a monitored current $I_{MON}$ conducted through the over-power protection circuit by sampling a current monitoring signal (e.g., current monitoring signal $V_{I-MON}$) at 1010. For example, the over-power protection circuit may generate the current monitoring signal $V_{I-MON}$ in response to a sense voltage developed across a sense resistor through which the through which the monitored current $I_{MON}$ is conducted. The magnitude of the current monitoring signal $V_{I-MON}$ may be representative of the magnitude of the monitored current $I_{MON}$ conducted through the over-power protection circuit (e.g., the current flowing from the power converter circuit to a power bus).

At 1012, the over-power protection circuit may determine whether the magnitude of the current monitoring signal $V_{I-MON}$ is greater than a voltage threshold $V_{I-TH}$. For example, the voltage threshold $V_{I-TH}$ may be the first, second, third, or Nth voltage threshold as described herein. The voltage threshold $V_{I-TH}$ may correspond to a current threshold ITH that indicates when the over-power protection circuit is operating at a particular power level that is associated with a respective increased-power time period at which the power converter circuit may operate at or below for the increased-power respective time period. For example, the voltage threshold $V_{I-TH}$ may correspond with an increased-power threshold of the bus power supply, and may be associated with an increased-power time period, as noted herein.

If the magnitude of the current monitoring signal $V_{I-MON}$ is greater than the voltage threshold $V_{I-TH}$ at 1012, the over-power protection circuit may determine if the timer for the voltage threshold $V_{I-TH}$ is running at 1014. The timer may be based on an increased-power time period that may be specific to the voltage threshold $V_{I\text{-}TH}$. For example, as noted herein, a first voltage threshold $V_{I\text{-}TH1}$ may be associated with a first increased-power time period $T_{IP1}$ (e.g., approximately 60 minutes), a second voltage threshold $V_{I\text{-}TH2}$ may be associated with a second increased-power time period $T_{IP2}$ (e.g., approximately 2 minutes), etc. In some examples, the timer may be implemented as a threshold comparison and timing circuit (e.g., the threshold comparison and timing circuits 456a-465n), a timer (e.g., the timer 484, 490), and/or as a timer that is part of a control circuit. If the timer for $V_{I\text{-}TH}$ is not running at 1014, the over-power protection circuit may start (e.g., set) a timer for the voltage threshold $V_{I\text{-}TH}$ at 1024 before returning to 1010. For example, the timer may be configured to start a timer value counting up from zero and run for the increased-power time period associated with the respective power level (e.g., or count down from the increased-power power time period to zero).

If the timer for $V_{I\text{-}TH}$ is running at 1014, the over-power protection circuit may determine if the timer for $V_{I\text{-}TH}$ has expired at 1016 (e.g., if the increased-power time period associated with the respective power level has elapsed). For example, the over-power protection circuitry may compare the timer value to a timer threshold (e.g., which may be the increased-power time period associated with the respective increased-power level) at 1016, and determine that the timer has expired if the timer value of meets or exceeds the timer threshold. Alternatively, the timer may be a timer that counts down, and the over-power protection circuit may determine that the timer has expired when the timer value has reached zero at 1016.

If the timer has expired at 1016, the over-power protection circuit may disconnect the power converter circuit from the power bus at 1018 and exit the procedure 1000, for example, by rendering a controllable switching circuit non-conductive (e.g., by rendering the controllable switching circuit 454 or 464 non-conductive). Therefore, by performing the procedure 1000, the over-power protection circuit is configured to disconnect the power converter circuit from the power bus when the magnitude of the monitored current $I_{MON}$ has exceeded a current threshold for the duration of the increased-power time period associated with respective increased-power threshold.

If, at 1016, the timer has not expired, the over-power protection circuit may return to 1010 to sample the current monitoring signal $V_{I\text{-}MON}$ again. For example, the current monitoring signal $V_{I\text{-}MON}$ may continue exceeding the threshold until the timer expires, or the current monitoring signal $V_{I\text{-}MON}$ may cease to exceed the threshold before the timer expires. If, at 1012, the magnitude of the current monitoring signal $V_{I\text{-}MON}$ is not greater than the voltage threshold $V_{I\text{-}TH}$, then, at 1020, the over-power protection current may determine if the timer is already running. If the timer was already running, the over-power protection circuit may stop and reset the corresponding timer for the voltage threshold $V_{I\text{-}TH}$ and exit the procedure 1000. If, at 1020, the timer for the voltage threshold $V_{I\text{-}TH}$ is not already running, the over-power protection circuit may exit the procedure 1000.

The entire procedure 1000 may be repeated (e.g., concurrently and/or sequentially) for a plurality of increased-power thresholds and/or increased-power time periods. For example, power levels may correspond to various power levels of the bus power supply, and each increased-power threshold may be associated with a respective time period. As such, the procedure 1000 may allow the bus power supply to operate at one or more increased power capabilities that are greater than the nominal power capability $P_{TH\text{-}NOM}$ of the bus power supply for up to, but not longer than, respective predetermined increased-power time periods. Further, the procedure 1000 may allow the over-power protection circuit to evaluate whether the magnitude of the monitored current $I_{MON}$ has operating at or below a variety of different increased-power thresholds (e.g., has exceeded a variety of different respective current thresholds) for respective increased-power time periods.

In some examples, after determining that the magnitude of the current monitoring signal $V_{I\text{-}MON}$ is greater than the voltage threshold $V_{I\text{-}TH}$ at 1012, the over-power protection circuit may send a message (e.g., an analog signal, a digital message, etc.) to the one or more motor drive units indicating that the magnitude of the output power of the bus power supply is exceeding the nominal power capability $P_{TH\text{-}NOM}$ of the bus power supply and/or asking that the one or more motor drive units step down their consumed power to avoid a future trip.

Figure 10B:
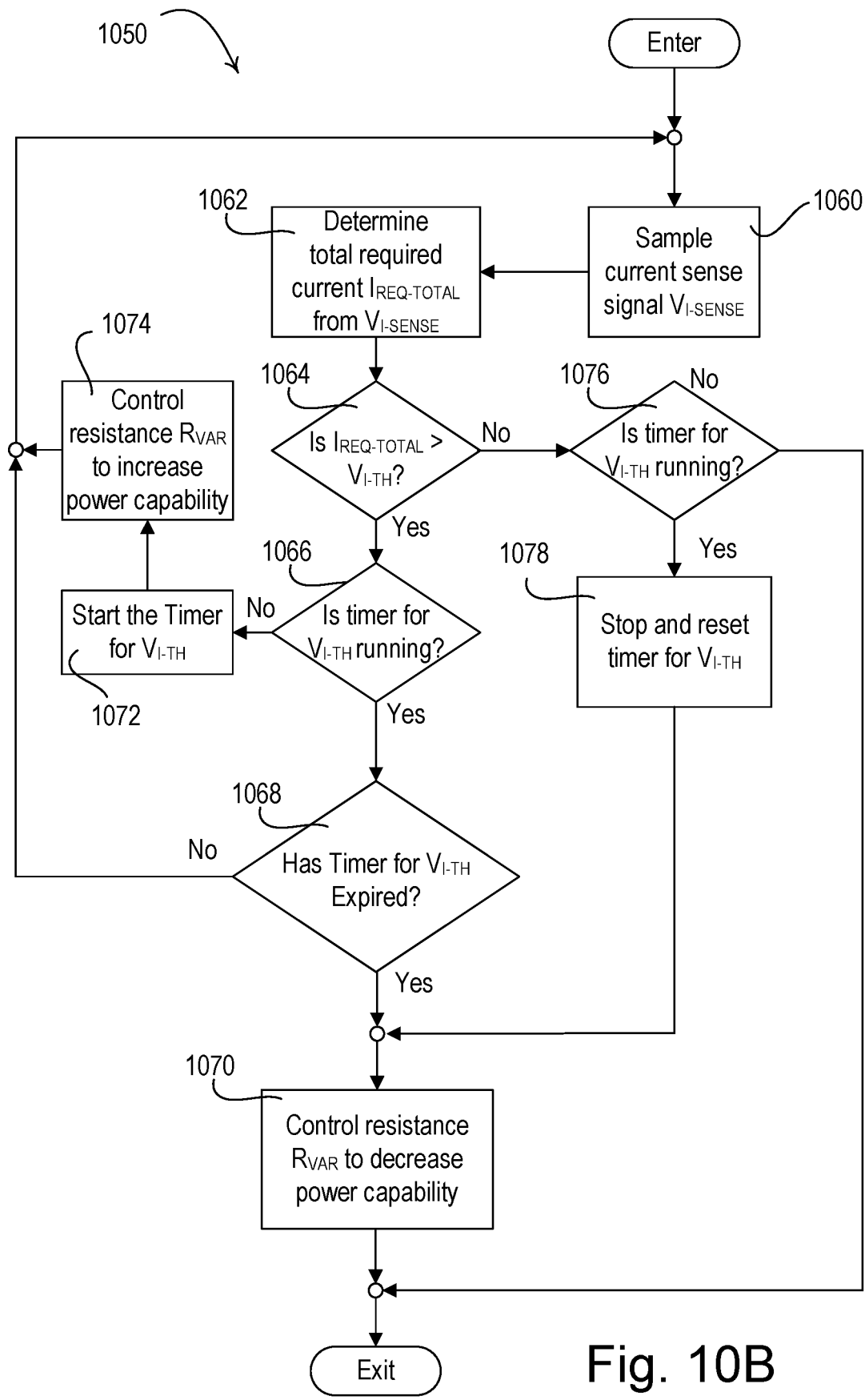
FIG. 10B is a flowchart of an example procedure that may be performed by a bus power supply.

FIG. 10B is a flowchart of an example procedure 1050 that may be performed by a bus power supply, such as a power bus management circuit (e.g., the power bus management circuit 440). For example, a control circuit of the power bus management circuit (e.g., the control circuit 448 of the power bus management circuit 440) may perform the procedure 1050. The control circuit may perform the procedure 1050 periodically. The control circuit may perform the procedure 1050 to allow the bus power supply to operate at one or more increased power capabilities that are greater than the nominal power capability $P_{TH\text{-}NOM}$ of the bus power supply for up to, but not longer than, respective predetermined increased-power time periods. For example, the control circuit may perform the procedure 1050 to adjust a resistance $R_{VAR}$ of a sense resistor (e.g., the variable resistor 446) to, for example, adjust an allocated power $P_{ALLOC}$ determined (e.g., calculated) by each of the motor drive units on the power bus to prevent the output power $P_{OUT}$ of the bus power supply from exceeding an increased-power threshold for more than the respective increased-power time period of that increased-power threshold. The control circuit may be configured to control the resistance $R_{VAR}$ of the variable resistor between a minimum resistance $R_{MIN}$ to a nominal resistance $R_{NOM}$ (e.g., a maximum resistance).

The control circuit may sample a current sense signal $V_{I\text{-}SENSE}$ at 1060. The current sense signal $V_{I\text{-}SENSE}$ may have a magnitude that indicates the magnitude of a sense current $I_{SENSE}$ conducted through a sense resistor of the power bus management circuit (e.g., the variable resistor 446). For example, the current sense signal $V_{I\text{-}SENSE}$ may indicate the total current $I_{TOTAL}$ conducted on the power bus, for example, during the off portion $T_{OFF}$ of the periodic time period (e.g., when the first controllable switching circuit 442 is non-conductive and the second controllable switching circuit 444 is conductive).

At 1062, the control circuit may determine a total required current $I_{REQ\text{-}TOTAL}$ from current sense signal $V_{I\text{-}SENSE}$. The total required current $I_{REQ\text{-}TOTAL}$ may equal the total magnitude of the power-requirement currents $I_{PR}$ conducted onto the power bus by the plurality of motor drive units coupled to the power bus, for example, during the off portion $T_{OFF}$ of the periodic time period. As noted above, the magnitude of the power-requirement current $I_{PR}$ may be dependent upon (e.g., proportional to) the required (e.g., requested)) power $P_{REQ}$ of the motor drive unit, and as such the total required current $I_{REQ\text{-}TOTAL}$ may equal the total required power of all of the motor drive units coupled to the power bus.

At 1064, the control circuit may determine whether the total required current $I_{REQ\text{-}TOTAL}$ is greater than a voltage threshold $V_{I\text{-}TH}$. As described herein, the voltage threshold $V_{I\text{-}TH1}$ may correspond to a current threshold $I_{TH1}$ and/or the power threshold $P_{TH}$. In some examples, the voltage threshold $V_{I\text{-}TH}$ may be the first, second, third, or Nth voltage threshold as described herein. In such examples, the voltage threshold $V_{I\text{-}TH}$ may correspond with an increased-power threshold of the bus power supply, and may be associated with an increased-power time period, as noted herein. However, in other examples, the voltage threshold $V_{I\text{-}TH}$ may be configured to be slightly less than the first, second, third, or Nth voltage threshold.

If the magnitude of the total required current $I_{REQ\text{-}TOTAL}$ is greater than the voltage threshold $V_{I\text{-}TH}$ at 1064, the control circuit may determine if the timer for the voltage threshold $V_{I\text{-}TH}$ is running at 1066. The timer may be specific to the voltage threshold $V_{I\text{-}TH}$. In some examples, the timer may be configured to be slightly less than the timers used for the increased-power time periods. For example, a first voltage threshold $V_{I\text{-}TH1}$ may be associated with a first time period $T_{IP1}$ (e.g., approximately 58 minutes, which is slightly less than 60 minutes), a second voltage threshold $V_{I\text{-}TH2}$ may be associated with a second time period $T_{IP2}$ (e.g., approximately 1 minute and 50 seconds, which may be slightly less than 2 minutes), etc. As such, the timers used in the procedure 1050 may be configured to expire before the timers used in the procedure 1000.

If the timer for $V_{I\text{-}TH}$ is not running at 1066, the control circuit may start (e.g., set) a timer for the voltage threshold $V_{I\text{-}TH}$ at 1072. At 1074, the control circuit may control the resistance $R_{VAR}$ of the variable resistor to increase the power capabilities of the bus power supply. For example, the control circuit may reduce the resistance $R_{VAR}$ of the variable resistor to make it appear to the motor drive units as if the total cumulative required power of all of the motor drive units has decreased, which may cause the allocated power $P_{ALLOC}$ of each motor drive unit to increase during the next on portion of the periodic time period. After controlling the resistance $R_{VAR}$ of the variable resistor at 1074, the control circuit may return to 1060. However, in some examples 1074 may be omitted, and the control circuit may be configured to return to 1060 after starting the timer at 1072.

If the timer for $V_{I\text{-}TH}$ is running at 1066, the control circuit may determine if the timer for $V_{I\text{-}TH}$ has expired at 1068. If the timer has expired at 1068, the control circuit may control the resistance $R_{VAR}$ of the variable resistor to decrease the power capabilities of the bus power supply. For example, the control circuit may induce the resistance $R_{VAR}$ of the variable resistor to make it appear to the motor drive units as if the total cumulative required power of all of the motor drive units has increased, which may cause the allocated power $P_{ALLOC}$ of each motor drive unit to decrease during the next on portion of the periodic time period. Therefore, by performing the procedure 1050, the control circuit may be configured to adjust the resistance $R_{VAR}$ of the variable resistor to adjust the power capabilities of the bus power supply, to for example, adjust the allocated power $P_{ALLOC}$ determined (e.g., calculated) by each of the motor drive units on the power bus to prevent the output power $P_{OUT}$ of the bus power supply from exceeding an increased-power threshold for more than the respective increased-power time period of that increased-power threshold.

If, at 1068, the timer has not expired, the control circuit may return to 1060 to sample the current sense signal $V_{I\text{-}SENSE}$ again. For example, the total required current $I_{REQ\text{-}TOTAL}$ may continue exceeding the voltage threshold $V_{I\text{-}TH}$ until the timer expires, or the total required current $I_{REQ\text{-}TOTAL}$ may cease to exceed the threshold before the timer expires. If, at 1064, the total required current $I_{REQ\text{-}TOTAL}$ is not greater than the voltage threshold $V_{I\text{-}TH}$, then, at 1076, the control current may determine if the timer is already running. If the timer was already running, the control circuit may stop and reset the corresponding timer for the voltage threshold $V_{I\text{-}TH}$ at 1078 and exit the procedure 1050. If, at 1076, the timer for the voltage threshold $V_{I\text{-}TH}$ is not already running, the control circuit may exit the procedure 1050.

The entire procedure 1050 may be repeated (e.g., concurrently and/or sequentially) for a plurality of thresholds and/or time periods, where for example, each of the thresholds and/or time periods may be slighted less than the increased-power thresholds and/or increased-power time periods described herein (e.g., to ensure that the control circuit has the ability to adjust the variable resistance $R_{VAR}$ of the variable resistor before the over-power protection circuit trips).

Figure 11:
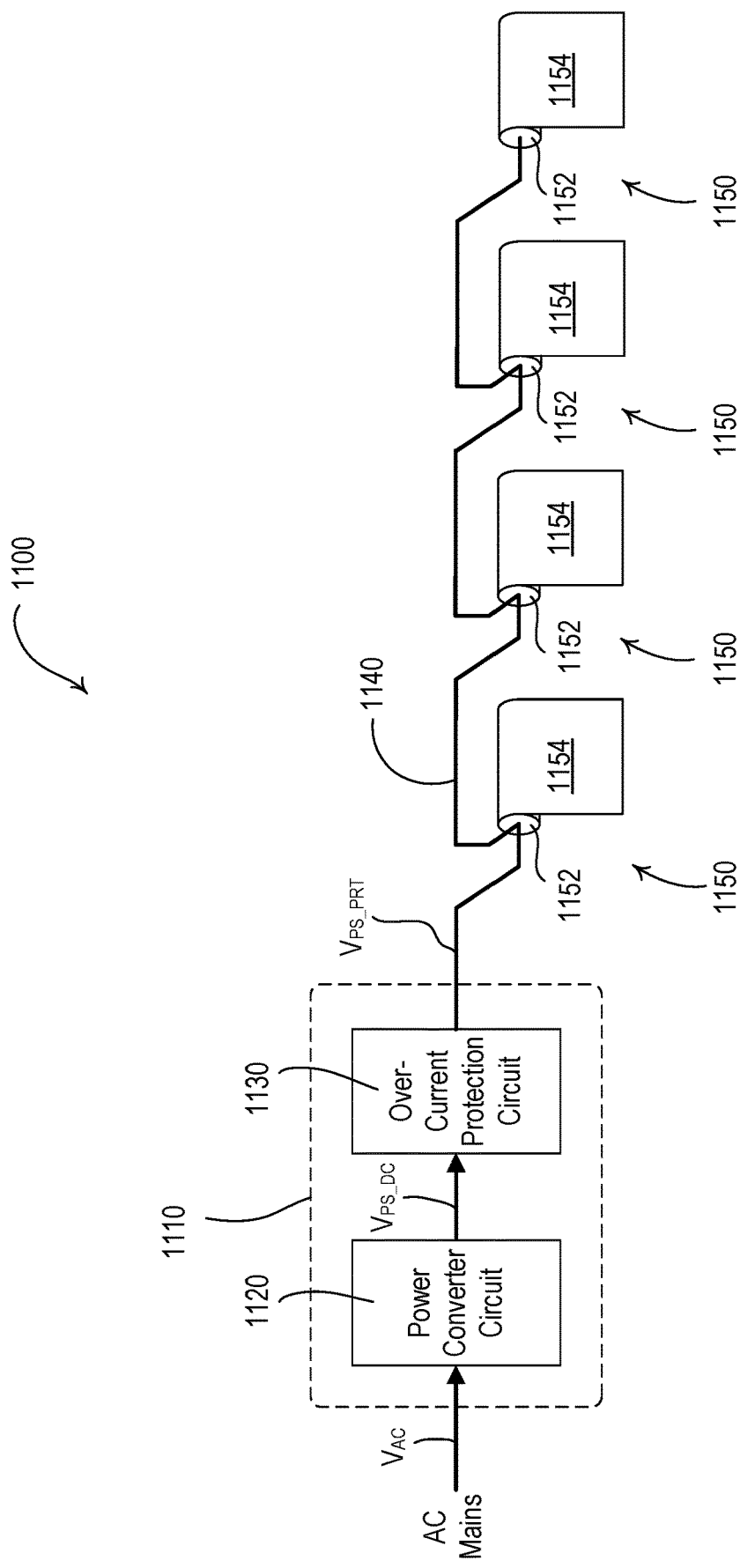
FIG. 11 is a block diagram of an example DC power distribution system.

FIG. 11 is a block diagram of an example DC power distribution system 1100. The DC power distribution system 1100 may comprise one or more motor window treatments 1150 (e.g., of the motorized roller shades 140). For example, the motor window treatments 1150 may each comprise a respective motor drive units 1152 configured to adjust the positions of a respective covering material 1154 to control the amount of daylight entering the building through respective windows.

The DC power distribution system 1100 may comprise a DC power bus 1140 (e.g., a Class 2 power bus) and may be electrically coupled to the motor drive units 1152 in a daisy-chain configuration. The DC power distribution system 1100 may further comprise a bus power supply 1110 (e.g., a Class 2 protected power supply) configured to provide a protected power supply voltage $V_{PS\_PRT}$ to the motor drive units 1152 via the DC power bus 1140. Although illustrated as four motor drive units 1152, in some examples, more or less motor drive units 1152 may be coupled to the DC power bus 1140.

Each motor drive unit 1152 may include one or more power connectors, a diode and bus capacitor, a control circuit, a communication circuit, a user interface, a power supply, a motor drive circuit, a rotational position sensing circuit, and/or a motor. Further, the motor drive units 1152 may include a power converter circuit to convert the protected power supply voltage $V_{PS\_PRT}$ to a motor voltage used to drive the motor. However, the motor drive units 1152 may not include any energy storage elements (e.g., the energy storage element 555, such as one or more supercapacitors, rechargeable batteries, or other suitable energy storage devices) and associated circuitry, such as a power limiting circuit, a charging circuit, a current source, and a controllable switching circuit coupled between the energy storage element and the power connectors. For example, each of the motor drive units 1152 may be similar to the motor drive unit 500 of FIG. 6, but without the inclusion of the power limiting circuit 552, the charging circuit 553, the energy storage element 555, the current source 570, the controllable switching circuit 560, and one or more of the scaling circuits. Accordingly, without the energy storage element 555, the motor drive units 1150 may be forced to consume all the power required to drive its internal motor from the bus power supply 1110 at the time of movement (e.g., may lack the ability to consume the necessary power to power a predetermined number of full movements, such as less than or equal to 10 full movements).

The bus power supply 1110 may be electrically coupled to one or more of the motor drive units 1152 via the DC power bus 1140. For example, the bus power supply 1110 may comprise one or more power connectors (e.g., the power connector 410, which may include two power terminals, such as a positive terminal and a negative terminal) for receiving an input voltage from an external power supply, such as an AC mains supply for receiving an AC mains line voltage $V_{AC}$. The bus power supply 1110 may also comprise a power connector (e.g., the power connector 412) that is connected to the DC power bus 1140 that is electrically coupled to the one or more motor drive units 1152. The bus power supply 1110 may be configured to generate the protected power supply voltage $W_{PS\_PRT}$, and the power connector 412 may provide the protected power supply voltage $V_{PS\_PRT}$ to the DC power bus 1140. The motor drive units 1152 connected to the DC power bus 1140 may conduct an output current from the bus power supply 1110 through output the power connector of the bus power supply 1110.

The bus power supply 1110 may include a power converter circuit 1120 that is coupled to the input power connector for receiving the input voltage (e.g., the AC main line voltage $V_{AC}$), and for generating a direct-current (DC) power supply voltage $V_{PS\_DC}$. The power converter circuit 1120 may be an example of the power converter circuit 420 of the bus power supply 400. The power converter circuit 1120 may be an AC/DC converter or a DC/DC converter, for example, depending on whether the bus power supply 1110 is connected to an AC power source or a DC power source.

The bus power supply 1110 may include an over-power protection circuit 1130 that is configured to receive the DC power supply voltage $V_{PS\_DC}$ and output the protected power supply voltage $V_{PS\_PRT}$ under normal conditions. The bus power supply 1110 may also disconnect the power converter 1120 from the DC power bus 1140 (e.g., disable the bus power supply 1110) in response to the output power of the power converter 1120 exceeding a threshold. The over-power protection circuit 1130 may be an example of the over-power protection circuit 430 of the bus power supply 400.

As noted above with respect to the over current protection circuit 430, the over-power protection circuit 1130 may monitor the output power of the bus power supply 1110 by monitoring a current (e.g., a monitored current $I_{MON}$) conducted through the over-power protection circuit 1130 (e.g., since the protected power supply voltage $V_{PS\_PRT}$ has a DC magnitude). For example, the over-power protection circuit 1130 may have multiple, timed thresholds, where each threshold is associated with a different power level and a respective amount of time. In some examples, the over-power protection circuit 1130 may be configured to disconnect the power converter circuit 1120 from the DC power bus 1140 by opening a switch (e.g., a controllable conductive switching circuit). Further, the over-power protection circuit 1110 may be configured to keep the power converter circuit 1120 disconnected from the DC power bus until, for example, power to the bus power supply 1110 is fully cycled (e.g., the bus power supply 1110 has been turned both on and back off again) or power to the bus power supply 1110 has been removed (e.g., the bus power supply 1110 has been turned off) and then restored again.

Notably, the bus power supply 1110 may not include a power bus management circuit, such as the power bus management circuit 440 of the bus power supply 400. As such, the bus power supply 1110 may be identical to the bus power supply 400, with the exception that the bus power supply 1110 does not include the power bus management circuit 440.

Figure 12:
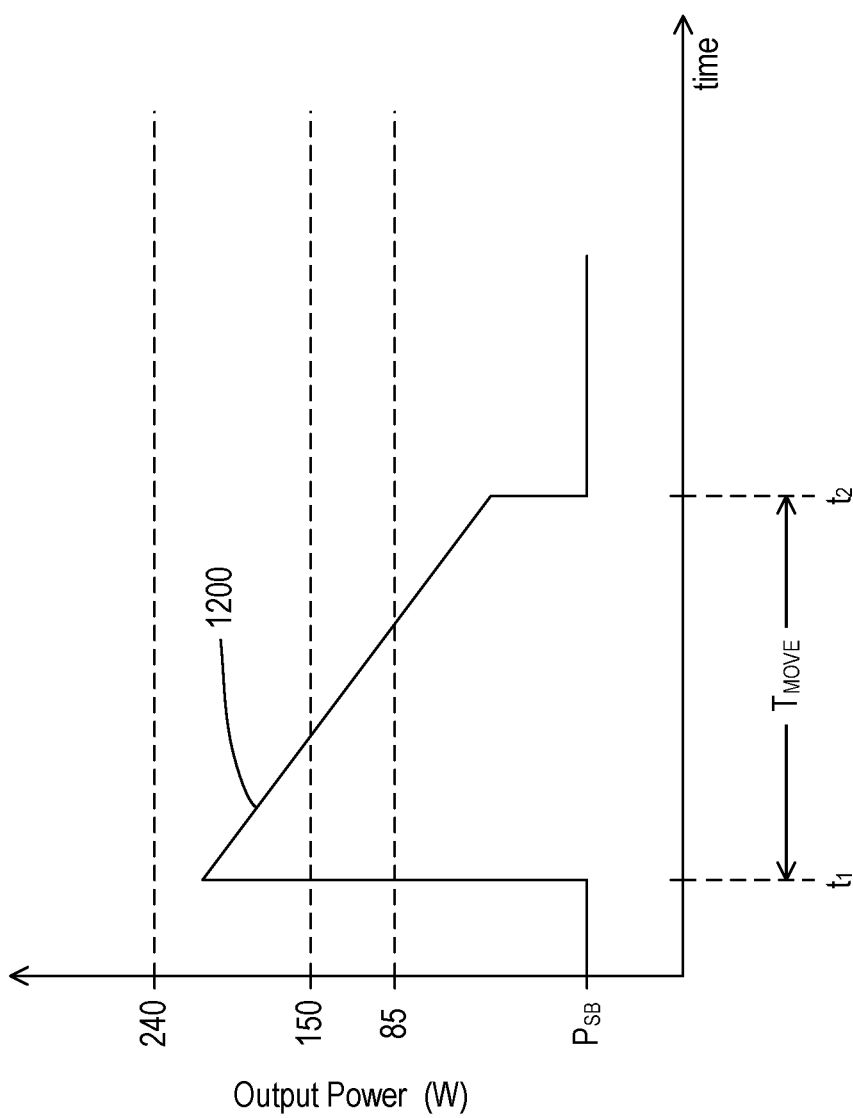
FIG. 12 is an example waveform that illustrates an output power of a bus power supply.

FIG. 12 is an example waveform 1200 that illustrates an output power of the bus power supply 1110, when connected to the DC power bus 1140 in the DC power distribution system 1100 that includes the multiple (e.g., four) motor drive units 1152. As noted above, the motor drive units 1152 may not be capable of storing enough power for multiple full operations of the motor without drawing higher amounts of current directly from the DC power bus 1140. And, as also noted above, the bus power supply 1110 may include the over-power protection circuit 1130. During instances where none of the motor drive units 1152 are driving their internal motors, the output power of the bus power supply may reside at a standby power $P_{SB}$ level (e.g., 0.5 watts or 1 watt per motor drive unit, 1.6 watts, 2 watts, or 4 watts in total). The standby power $P_{SB}$ may represent a combined nominal or standby power consumed by the motor drive units 1152 connected to the DC power bus 1140 when the motor drive units 1152 are not driving their internal motors.

When all of the motor drive units 1152 each receive a command to raise the respective covering materials 1154 from a fully-lowered position to a fully-raised position, the motor drive units 1152 may be configured to move the covering materials 1154 in unison. The period of time that it takes for all the motor drive units 1150 to fully raise their motorized window treatments from the fully-lowered position to the fully-raised position may be represented by a movement time period $T_{MOVE}$ (e.g., approximately 60 seconds). For example, at the time $t_1$, the motorized window treatment of each of the motor drive units 1150 may be in the fully-lowered position, and all of the motor drive units 1150 may begin to drive their motors in response to receiving a command. And, at the time $t_2$, all of the motor drive units 1150 may stop driving their motor and the motorized window treatments may be in the fully-raised position.

As illustrated by the graph 1200, during the movement time period $T_{MOVE}$, the output power of the bus power supply 1110 may exceed a nominal power level, but may be maintained lower than a maximum increased-power threshold of the bus power supply 1110 (e.g., 240 watts). It should be noted that this is the case even though the motor drive units 1150 do not include an internal energy storage element that is capable of storing enough power for multiple full operations of the motor, and, as such, the bus power supply 1110 supplies the full power to drive the respective motors of the motor drive units 1150 connected to the DC power bus. Further, it should be appreciated that the output power of the bus power supply 1110 is highest when the motorized window treatments are near the fully-lowered position, and decreases as they raise towards the fully-raised position. As such, during the movement time period $T_{MOVE}$, the output power of the bus power supply 1110 may not exceed the nominal power level of the bus power supply 1110 (e.g., 85 watts) for more than a first increased-power period of time (e.g., 60 minutes), and also does not exceed a first increased-power threshold (e.g., 150 watts) for more than a second increased-power period of time (e.g., 2 minutes). Accordingly, even though multiple (e.g., four) motor drive units 1150 are all driving their motors simultaneously, the over-power protection circuit 1130 of the bus power supply 1110 does not trip.

Although not illustrated, the combined power needed to lower the motorized window treatments of all of the motor drive units 1150 simultaneously is smaller than the combined power needed to raise the motorized window treatments of all of the motor drive units 1150. For example, when lowering the motorized window treatment, the motor drive unit 1150 may drive the motor to slow down the speed at which the motorized window treatment lowers due to the force of gravity. That is, the force of gravity would cause the motorized window treatment to lower faster but for the use of the motor to break and maintain the lowering to be a more constant motion. As such, the output power of the bus power supply 1110 is less when lowering all of the motorized window treatments simultaneously than when raising them. Accordingly, even if the motorized window treatments of all of the motor drive units 1152 were to be raised and lowered in a consistent, repeated manner, the output power of the bus power supply 1110 may not exceed the maximum increased-power threshold (e.g., 240 watts), may not exceed the nominal power level of the bus power supply (e.g., 85 watts) for more than the first increased-power period of time (e.g., 60 minutes), and also may not exceed the first increased-power threshold (e.g., 150 watts) for more than the second increased-power period of time (e.g., 2 minutes). Further, the average output power to complete a raise, followed by a lower may be (e.g., may always be) lower than the nominal continuous power level of the bus power supply 1110 (e.g., 85 watts.)

Although described with the motor drive units 1152 of the motorized window treatments 1150, the bus power supply 1110 of the DC power distribution system 1100 shown in FIG. 11 may be configured to power other types of periodic loads, such as a high powered sensor comprising a sensing circuit (e.g. an occupancy sensing circuit with higher power processing, such as radar), a periodic light source, such as an LED driver and lighting load, a light source that consumes high power for a short period of time (e.g., a ballast that requires more power when striking the lamp than during steady-state operation, a lighting load located in a seldomly frequented location, such as a closet, a lighting load on a short time clock or timer, such as an exterior lighting loads that are triggered by motion, an event, or at a predetermined time of day, etc.), a motorized room divider, a camera (e.g., that is configured to detect glare at window(s), detect occupants, etc.) and/or the like. Further, the motor drive units 1152 may each drive any sort of motor for any purpose, such as a motor for condenser, a burner for a furnace, etc.

What is claimed is:

1. A method comprising:
generating a bus voltage on a power bus using a bus power supply, wherein a plurality of drive units are coupled to the power bus;
determining an allocated amount of power that a drive unit of the plurality of drive units can consume from the power bus based on an amount of power required by the drive unit, a cumulative total power required by the plurality of drive units, and the power capability of the bus power supply; and
conducting the allocated amount of power from the power bus.

2. The method of claim 1, further comprising:
determining a proportional amount of power for the drive unit based on the amount of power required by the drive unit and the cumulative total power required by the plurality of drive units; and
determining the allocated amount of power based on the proportional amount of power for the drive unit and the power capability of the bus power supply.

3. The method of claim 1, further comprising:
determining the cumulative total power required by the plurality of drive units based on a magnitude of a current conducted by the plurality of drive units onto the power bus.

4. The method of claim 1, further comprising:
providing the bus voltage on the power bus during an on portion of a periodic time period, and not providing the bus voltage on the power bus during an off portion of the periodic time period.

5. The method of claim 4, further comprising:
measuring a magnitude of the bus voltage across the power bus during the off portion of the periodic time period, wherein the magnitude of the bus voltage across the power bus indicates the cumulative total power required by the plurality of drive units.

6. The method of claim 4, further comprising:
receiving messages from each of the plurality of drive units over the power bus during the off portion of the periodic time period, wherein each message indicates a power required by one of the plurality of drive units.

7. The method of claim 4, further comprising:
conducting a power-requirement current onto the power bus during the off portion of the periodic time period, wherein a magnitude of the power-requirement current is proportional to the amount of power required by the drive unit;
measuring a magnitude of the bus voltage across the power bus during the off portion of the periodic time period;
calculating a proportionate amount of the power capability of the bus power supply that the drive unit can consume during the next on portion of the periodic time period based on the power required by the drive unit and the magnitude of the bus voltage across the power bus during the off portion of the periodic time period; and
consuming the allocated amount of power from the power bus during the next on portion of the periodic time period, wherein the allocated amount of power is determined based on the proportionate amount that the drive unit can consume multiplied by the power capability of the bus power supply.

8. The method of claim 7, further comprising:
determining the amount of power required by the drive unit based on a power required by the drive unit to power at least one electrical load, a charge of an internal energy storage element of the drive unit, and a standby power consumption of the drive unit.

9. The method of claim 1, further comprising:
disconnecting a power converter circuit from the power bus in response to a magnitude of a bus current of the power bus exceeding a first current threshold for a first time period or exceeding a second current threshold for a second time period.

10. The method of claim 1, further comprising:
signaling the required amount of power of the drive unit to the bus power supply prior to conducting the allocated amount of power from the power bus.

11. The method of claim 1, further comprising:
determining the cumulative total power required by the plurality of drive units based on one or more received digital messages.

12. The method of claim 1, further comprising:
controlling movement of a covering material of a motorized window treatment using the allocated amount of power from the power bus to control an amount of daylight entering a space.

13. The method of claim 1, wherein the bus power supply is characterized by a nominal power capability that defines a nominal power threshold at or below which the bus power supply may supply power indefinitely to the plurality of drive units, wherein the nominal power threshold is less than a maximum amount of power defined by the power capability of the bus power supply.

14. The method of claim 13, further comprising:
continuously supplying power to the power bus at or below the nominal power threshold without interruption or disconnection by an over-power protection circuit of the bus power supply.

15. The method of claim 13, further comprising:
supplying power to the plurality of drive units at one or more increased power capabilities that are greater than the nominal power capability for up to, but not longer than, respective predetermined increased-power time periods.

16. The method of claim 15, further comprising:
disconnecting the bus voltage from the power bus in response to a magnitude of an output power of a power converter circuit of the bus power supply exceeding a first increased-power threshold for more than a first increased-power time period.

17. The method of claim 15, further comprising:
disconnecting the bus voltage from the power bus in response to the magnitude of the output power of a power converter circuit of the bus power supply exceeding a second increased-power threshold for more than a second increased-power time period.

18. The method of claim 15, further comprising:
adjusting a variable resistance of a variable resistor of the bus power supply to adjust the allocated power calculated by each of the plurality of drive units on the power bus.

19. The method of claim 1, wherein each of the plurality of drive units is a motor drive unit for a motorized window treatment;
wherein each of the plurality of drive units comprises a motor drive circuit for a motor that is configured to control movement of a covering material of the motorized window treatment to control the amount of daylight entering a space.

20. The method of claim 1, wherein each of the plurality of drive units further comprises an internal energy storage element configured to store enough power for multiple operations of a load circuit of the drive unit; and
wherein the amount of power required by the drive unit is based on an amount of power required by the load circuit to power at least one electrical load and a voltage across the internal energy storage element.

* * * * *